United States Patent
Benishti et al.

(10) Patent No.: US 12,063,345 B2
(45) Date of Patent: Aug. 13, 2024

(54) SYSTEMS FOR FACILITATING AUGMENTED REALITY-ASSISTED MEDICAL PROCEDURES

(71) Applicant: Augmedics Ltd., Yokneam Illit (IL)

(72) Inventors: Nessi Benishti, Kfar Saba (IL); Nissan Elimelech, Beerotaim (IL); Stuart Wolf, Yokneam (IL); Elazar Gerland, Hinanit (IL)

(73) Assignee: Augmedics Ltd., Yokneam Illit (IL)

( * ) Notice: Subject to any disclaimer, the term of this patent is extended or adjusted under 35 U.S.C. 154(b) by 0 days.

(21) Appl. No.: 18/365,650

(22) Filed: Aug. 4, 2023

(65) Prior Publication Data

US 2023/0379449 A1 Nov. 23, 2023

Related U.S. Application Data

(63) Continuation of application No. 16/419,023, filed on May 22, 2019, now Pat. No. 11,750,794, which is a (Continued)

(30) Foreign Application Priority Data

Mar. 24, 2015 (GB) ..................... 1504935

(51) Int. Cl.
*G06F 3/01* (2006.01)
*G02B 27/01* (2006.01)
(Continued)

(52) U.S. Cl.
CPC ....... *H04N 13/383* (2018.05); *G02B 27/0172* (2013.01); *G06F 3/013* (2013.01);
(Continued)

(58) Field of Classification Search
None
See application file for complete search history.

(56) References Cited

U.S. PATENT DOCUMENTS

| 3,101,715 A | 8/1963 | Glassman |
| 3,690,776 A | 9/1972 | Zaporoshan |

(Continued)

FOREIGN PATENT DOCUMENTS

| CA | 3022448 A1 | 2/2018 |
| CA | 3034314 A1 | 2/2018 |

(Continued)

OTHER PUBLICATIONS

U.S. Appl. No. 16/419,023 (U.S. Pat. No. 11,750,794), filed May 22, 2019, Combining Video-Based and Optic-Based Augmented Reality in a Near Eye Display.

(Continued)

*Primary Examiner* — David H Chu
(74) *Attorney, Agent, or Firm* — KNOBBE, MARTENS, OLSON & BEAR, LLP

(57) ABSTRACT

Disclosed herein is a near eye assembly having a retaining structure (e.g., a spectacle frame or head up display mounted on a helmet) that is configured to be positioned in proximity to the eye of a user of the assembly. An optical combiner may be mounted on the retaining structure in front of the user eye. The optical combiner may at least partially transmit elements of a scene in front of the assembly through the combiner. In addition, the optical combiner may receive a visible radiation transmission derived from a scene, and/or a visual transmission such as a presentation of data or a marker, and redirect the transmission back to the user's eye.

19 Claims, 14 Drawing Sheets

Related U.S. Application Data continuation of application No. 16/159,740, filed on Oct. 15, 2018, now Pat. No. 10,382,748, which is a continuation of application No. 15/896,102, filed on Feb. 14, 2018, now Pat. No. 10,134,166, which is a continuation of application No. 15/127,423, filed as application No. PCT/IB2016/051642 on Mar. 23, 2016, now Pat. No. 9,928,629.

(51) Int. Cl.
| | | |
|---|---|---|
| *G06T 19/00* | (2011.01) | |
| *G06V 10/60* | (2022.01) | |
| *G06V 40/18* | (2022.01) | |
| *H04N 7/18* | (2006.01) | |
| *H04N 13/344* | (2018.01) | |
| *H04N 13/383* | (2018.01) | |
| *H04N 23/11* | (2023.01) | |
| *G02B 27/00* | (2006.01) | |

(52) U.S. Cl.
CPC ............ *G06F 3/017* (2013.01); *G06T 19/006* (2013.01); *G06V 10/60* (2022.01); *G06V 40/193* (2022.01); *H04N 7/181* (2013.01); *H04N 13/344* (2018.05); *H04N 23/11* (2023.01); *G02B 27/0093* (2013.01); *G02B 2027/0134* (2013.01); *G02B 2027/0138* (2013.01); *G02B 2027/0178* (2013.01); *G02B 2027/0187* (2013.01)

(56) References Cited

U.S. PATENT DOCUMENTS

| | | | |
|---|---|---|---|
| 4,459,358 A | 7/1984 | Berke | |
| 4,711,512 A | 12/1987 | Upatnieks | |
| 4,863,238 A | 9/1989 | Brewster | |
| 4,944,739 A | 7/1990 | Torre | |
| 5,147,365 A | 9/1992 | Whitlock et al. | |
| 5,357,292 A | 10/1994 | Wiedner | |
| 5,441,042 A | 8/1995 | Putman | |
| 5,442,146 A | 8/1995 | Bell et al. | |
| 5,510,832 A | 4/1996 | Garcia | |
| D370,309 S | 5/1996 | Stucky | |
| 5,636,255 A | 6/1997 | Ellis | |
| 5,665,092 A | 9/1997 | Mangiardi et al. | |
| 5,771,121 A | 6/1998 | Hentschke | |
| 5,792,046 A | 8/1998 | Dobrovolny | |
| 5,841,507 A | 11/1998 | Barnes | |
| 6,006,126 A | 12/1999 | Cosman | |
| 6,038,467 A | 3/2000 | De Bliek et al. | |
| 6,125,164 A | 9/2000 | Murphy et al. | |
| 6,147,805 A | 11/2000 | Fergason | |
| 6,227,667 B1 | 5/2001 | Halldorsson et al. | |
| 6,256,529 B1 | 7/2001 | Holupka et al. | |
| 6,285,505 B1 | 9/2001 | Melville et al. | |
| 6,314,310 B1 | 11/2001 | Ben-Haim et al. | |
| 6,349,001 B1 | 2/2002 | Spitzer | |
| 6,444,192 B1 | 9/2002 | Mattrey | |
| 6,447,503 B1 | 9/2002 | Wynne et al. | |
| 6,449,090 B1 | 9/2002 | Omar et al. | |
| 6,456,405 B2 | 9/2002 | Horikoshi et al. | |
| 6,456,868 B2 | 9/2002 | Saito et al. | |
| 6,474,159 B1 | 11/2002 | Foxlin et al. | |
| 6,518,939 B1 | 2/2003 | Kikuchi | |
| 6,527,777 B2 | 3/2003 | Justin | |
| 6,529,331 B2 | 3/2003 | Massof et al. | |
| 6,549,645 B1 | 4/2003 | Oikawa et al. | |
| 6,578,962 B1 | 6/2003 | Amir et al. | |
| 6,609,022 B2 | 8/2003 | Vilsmeier et al. | |
| 6,610,009 B2 | 8/2003 | Person | |
| D480,476 S | 10/2003 | Martinson et al. | |
| 6,659,611 B2 | 12/2003 | Amir et al. | |
| 6,675,040 B1 | 1/2004 | Cosman | |
| 6,683,584 B2 | 1/2004 | Ronzani et al. | |
| 6,690,964 B2 | 2/2004 | Bieger et al. | |
| 6,714,810 B2 | 3/2004 | Grzeszczuk et al. | |
| 6,737,425 B1 | 5/2004 | Yamamoto et al. | |
| 6,740,882 B2 | 5/2004 | Weinberg | |
| 6,757,068 B2 | 6/2004 | Foxlin | |
| 6,759,200 B1 | 7/2004 | Stanton, Jr. | |
| 6,847,336 B1 | 1/2005 | Lemelson et al. | |
| 6,856,324 B2 | 2/2005 | Sauer et al. | |
| 6,856,826 B2 | 2/2005 | Seeley et al. | |
| 6,891,518 B2 | 5/2005 | Sauer et al. | |
| 6,900,777 B1 | 5/2005 | Hebert et al. | |
| 6,919,867 B2 | 7/2005 | Sauer | |
| 6,921,167 B2 | 7/2005 | Nagata | |
| 6,966,668 B2 | 11/2005 | Cugini et al. | |
| 6,980,849 B2 | 12/2005 | Sasso | |
| 6,993,374 B2 | 1/2006 | Sasso | |
| 6,997,552 B1 | 2/2006 | Hung | |
| 6,999,239 B1 | 2/2006 | Martins et al. | |
| 7,000,262 B2 | 2/2006 | Bielefeld | |
| 7,035,371 B2 | 4/2006 | Boese et al. | |
| 7,043,961 B2 | 5/2006 | Pandey et al. | |
| 7,072,435 B2 | 7/2006 | Metz et al. | |
| 7,103,233 B2 | 9/2006 | Stearns | |
| 7,107,091 B2 | 9/2006 | Jutras et al. | |
| 7,112,656 B2 | 9/2006 | Desnoyers et al. | |
| 7,141,812 B2 | 11/2006 | Appleby et al. | |
| 7,157,459 B2 | 1/2007 | Ohta et al. | |
| 7,169,785 B2 | 1/2007 | Timmer et al. | |
| 7,171,255 B2 | 1/2007 | Holupka et al. | |
| 7,176,936 B2 | 2/2007 | Sauer et al. | |
| 7,187,792 B2 | 3/2007 | Fu et al. | |
| 7,190,331 B2 | 3/2007 | Genc et al. | |
| 7,194,295 B2 | 3/2007 | Stefan | |
| 7,215,322 B2 | 5/2007 | Genc et al. | |
| 7,229,078 B2 | 6/2007 | Lechot | |
| 7,231,076 B2 | 6/2007 | Fu et al. | |
| 7,235,076 B2 | 6/2007 | Pacheco | |
| 7,239,330 B2 | 7/2007 | Sauer et al. | |
| 7,241,292 B2 | 7/2007 | Hooven | |
| 7,259,266 B2 | 8/2007 | Carter et al. | |
| 7,260,426 B2 | 8/2007 | Schweikard et al. | |
| 7,269,192 B2 | 9/2007 | Hayashi | |
| 7,281,826 B2 | 10/2007 | Huang | |
| 7,315,636 B2 | 1/2008 | Kuduvalli | |
| 7,320,556 B2 | 1/2008 | Vagn-Erik | |
| 7,330,578 B2 | 2/2008 | Wang et al. | |
| 7,359,535 B2 | 4/2008 | Salla et al. | |
| 7,364,314 B2 | 4/2008 | Nilsen et al. | |
| 7,366,934 B1 | 4/2008 | Narayan et al. | |
| 7,379,077 B2 | 5/2008 | Bani-Hashemi et al. | |
| 7,431,453 B2 | 10/2008 | Hogan | |
| 7,435,219 B2 | 10/2008 | Kim | |
| 7,450,743 B2 | 11/2008 | Sundar et al. | |
| 7,458,977 B2 | 12/2008 | McGinley et al. | |
| 7,462,852 B2 | 12/2008 | Appleby et al. | |
| 7,493,153 B2 | 2/2009 | Ahmed et al. | |
| 7,505,617 B2 | 3/2009 | Fu et al. | |
| 7,507,968 B2 | 3/2009 | Wollenweber et al. | |
| 7,518,136 B2 | 4/2009 | Appleby et al. | |
| 7,525,735 B2 | 4/2009 | Sottilare et al. | |
| D592,691 S | 5/2009 | Chang | |
| D592,692 S | 5/2009 | Chang | |
| D592,693 S | 5/2009 | Chang | |
| 7,536,216 B2 | 5/2009 | Geiger et al. | |
| 7,542,791 B2 | 6/2009 | Mire et al. | |
| 7,556,428 B2 | 7/2009 | Sukovic et al. | |
| 7,557,824 B2 | 7/2009 | Holliman | |
| 7,563,228 B2 | 7/2009 | Ma et al. | |
| 7,567,834 B2 | 7/2009 | Clayton et al. | |
| 7,570,791 B2 | 8/2009 | Frank et al. | |
| 7,586,686 B1 | 9/2009 | Hall | |
| D602,620 S | 10/2009 | Cristoforo | |
| 7,605,826 B2 | 10/2009 | Sauer | |
| 7,606,613 B2 | 10/2009 | Simon et al. | |
| 7,607,775 B2 | 10/2009 | Hermanson et al. | |
| 7,620,223 B2 | 11/2009 | Xu et al. | |
| 7,623,902 B2 | 11/2009 | Pacheco | |
| 7,627,085 B2 | 12/2009 | Boyden et al. | |

(56) References Cited

U.S. PATENT DOCUMENTS

| | | |
|---|---|---|
| 7,630,753 B2 | 12/2009 | Simon et al. |
| 7,633,501 B2 | 12/2009 | Wood et al. |
| 7,645,050 B2 | 1/2010 | Wilt et al. |
| 7,653,226 B2 | 1/2010 | Guhring et al. |
| 7,657,075 B2 | 2/2010 | Mswanathan |
| 7,689,019 B2 | 3/2010 | Boese et al. |
| 7,689,042 B2 | 3/2010 | Brunner et al. |
| 7,689,320 B2 | 3/2010 | Prisco et al. |
| 7,699,486 B1 | 4/2010 | Beiner |
| 7,699,793 B2 | 4/2010 | Goette et al. |
| 7,719,769 B2 | 5/2010 | Sugihara et al. |
| D617,825 S | 6/2010 | Chang |
| 7,734,327 B2 | 6/2010 | Colquhoun |
| D619,285 S | 7/2010 | Cristoforo |
| 7,751,865 B2 | 7/2010 | Jascob et al. |
| 7,758,204 B2 | 7/2010 | Klipstein et al. |
| 7,768,702 B2 | 8/2010 | Hirose et al. |
| 7,769,236 B2 | 8/2010 | Fiala |
| 7,773,074 B2 | 8/2010 | Arenson et al. |
| 7,774,044 B2 | 8/2010 | Sauer et al. |
| 7,822,483 B2 | 10/2010 | Stone et al. |
| D628,307 S | 11/2010 | Krause-Bonte |
| 7,826,902 B2 | 11/2010 | Stone et al. |
| 7,831,073 B2 | 11/2010 | Fu et al. |
| 7,831,096 B2 | 11/2010 | Williamson, Jr. |
| 7,835,778 B2 | 11/2010 | Foley et al. |
| 7,835,784 B2 | 11/2010 | Mire et al. |
| 7,837,987 B2 | 11/2010 | Shi et al. |
| 7,840,093 B2 | 11/2010 | Fu et al. |
| 7,840,253 B2 | 11/2010 | Tremblay et al. |
| 7,840,256 B2 | 11/2010 | Lakin et al. |
| 7,853,305 B2 | 12/2010 | Simon et al. |
| 7,854,705 B2 | 12/2010 | Pawluczyk et al. |
| 7,857,271 B2 | 12/2010 | Lees |
| 7,860,282 B2 | 12/2010 | Boese et al. |
| D630,766 S | 1/2011 | Harbin |
| 7,865,269 B2 | 1/2011 | Prisco et al. |
| 7,874,686 B2 | 1/2011 | Rossner et al. |
| 7,881,770 B2 | 2/2011 | Melkent et al. |
| 7,893,413 B1 | 2/2011 | Appleby et al. |
| 7,894,649 B2 | 2/2011 | Fu et al. |
| 7,920,162 B2 | 4/2011 | Masini et al. |
| 7,922,391 B2 | 4/2011 | Essenreiter et al. |
| 7,938,553 B1 | 5/2011 | Beiner |
| 7,945,310 B2 | 5/2011 | Gattani et al. |
| 7,953,471 B2 | 5/2011 | Clayton et al. |
| 7,969,383 B2 | 6/2011 | Eberl et al. |
| 7,974,677 B2 | 7/2011 | Mire et al. |
| 7,985,756 B2 | 7/2011 | Barlow et al. |
| 7,991,557 B2 | 8/2011 | Liew et al. |
| 7,993,353 B2 | 8/2011 | Roner et al. |
| 7,996,064 B2 | 8/2011 | Simon et al. |
| 8,004,524 B2 | 8/2011 | Deinzer |
| 8,021,300 B2 | 9/2011 | Ma et al. |
| 8,022,984 B2 | 9/2011 | Cheong et al. |
| 8,045,266 B2 | 10/2011 | Nakamura |
| 8,060,181 B2 | 11/2011 | Rodriguez et al. |
| 8,068,581 B2 | 11/2011 | Boese et al. |
| 8,068,896 B2 | 11/2011 | Daghighian et al. |
| 8,077,943 B2 | 12/2011 | Williams et al. |
| 8,079,957 B2 | 12/2011 | Ma et al. |
| 8,081,812 B2 | 12/2011 | Kreiser |
| 8,085,075 B2 | 12/2011 | Huffman et al. |
| 8,085,897 B2 | 12/2011 | Morton |
| 8,090,175 B2 | 1/2012 | Fu et al. |
| 8,092,400 B2 | 1/2012 | Warkentine et al. |
| 8,108,072 B2 | 1/2012 | Zhao et al. |
| 8,112,292 B2 | 2/2012 | Simon |
| 8,116,847 B2 | 2/2012 | Gattani et al. |
| 8,120,847 B2 | 2/2012 | Chang |
| 8,121,255 B2 | 2/2012 | Sugiyama |
| 8,155,479 B2 | 4/2012 | Hoffman et al. |
| 8,180,132 B2 | 5/2012 | Gorges et al. |
| 8,180,429 B2 | 5/2012 | Sasso |
| 8,208,599 B2 | 6/2012 | Ye et al. |
| 8,216,211 B2 | 7/2012 | Mathis et al. |
| 8,221,402 B2 | 7/2012 | Francischelli et al. |
| 8,239,001 B2 | 8/2012 | Verard et al. |
| 8,244,012 B2 | 8/2012 | Liang et al. |
| 8,253,778 B2 | 8/2012 | Atsushi |
| 8,271,069 B2 | 9/2012 | Jascob et al. |
| 8,280,491 B2 | 10/2012 | Kuduvalli et al. |
| 8,285,021 B2 | 10/2012 | Boese et al. |
| 8,300,315 B2 | 10/2012 | Kobayashi |
| 8,305,685 B2 | 11/2012 | Heine et al. |
| 8,306,305 B2 | 11/2012 | Porat et al. |
| 8,309,932 B2 | 11/2012 | Haselman et al. |
| 8,317,320 B2 | 11/2012 | Huang |
| 8,328,815 B2 | 12/2012 | Farr et al. |
| 8,335,553 B2 | 12/2012 | Rubner et al. |
| 8,335,557 B2 | 12/2012 | Maschke |
| 8,340,379 B2 | 12/2012 | Razzaque et al. |
| 8,369,925 B2 | 2/2013 | Giesel et al. |
| 8,386,022 B2 | 2/2013 | Jutras et al. |
| 8,394,144 B2 | 3/2013 | Zehavi et al. |
| 8,398,541 B2 | 3/2013 | Dimaio et al. |
| 8,444,266 B2 | 5/2013 | Waters |
| 8,457,719 B2 | 6/2013 | Moctezuma De La Barrera et al. |
| 8,467,851 B2 | 6/2013 | Mire et al. |
| 8,469,902 B2 | 6/2013 | Dick et al. |
| 8,475,470 B2 | 7/2013 | Von Jako |
| 8,494,612 B2 | 7/2013 | Vetter et al. |
| 8,509,503 B2 | 8/2013 | Nahum et al. |
| 8,511,827 B2 | 8/2013 | Hua et al. |
| 8,531,394 B2 | 9/2013 | Maltz |
| 8,540,364 B2 | 9/2013 | Waters |
| 8,545,012 B2 | 10/2013 | Waters |
| 8,548,567 B2 | 10/2013 | Maschke et al. |
| 8,556,883 B2 | 10/2013 | Saleh |
| 8,559,596 B2 | 10/2013 | Thomson et al. |
| 8,567,945 B2 | 10/2013 | Waters |
| 8,571,353 B2 | 10/2013 | Watanabe |
| 8,585,598 B2 | 11/2013 | Razzaque et al. |
| 8,600,001 B2 | 12/2013 | Schweizer |
| 8,600,477 B2 | 12/2013 | Beyar et al. |
| 8,605,199 B2 | 12/2013 | Imai |
| 8,611,988 B2 | 12/2013 | Miyamoto |
| 8,612,024 B2 | 12/2013 | Stone et al. |
| 8,634,897 B2 | 1/2014 | Simon et al. |
| 8,641,621 B2 | 2/2014 | Razzaque et al. |
| 8,643,950 B2 | 2/2014 | Jens |
| 8,644,907 B2 | 2/2014 | Hartmann et al. |
| 8,674,902 B2 | 3/2014 | Park et al. |
| 8,686,923 B2 | 4/2014 | Eberl et al. |
| 8,690,581 B2 | 4/2014 | Ruf et al. |
| 8,690,776 B2 | 4/2014 | Razzaque et al. |
| 8,692,845 B2 | 4/2014 | Fedorovskaya et al. |
| 8,693,632 B2 | 4/2014 | Allison |
| 8,694,075 B2 | 4/2014 | Groszmann et al. |
| 8,699,765 B2 | 4/2014 | Hao et al. |
| 8,705,829 B2 | 4/2014 | Frank et al. |
| 8,737,708 B2 | 5/2014 | Hartmann et al. |
| 8,746,887 B2 | 6/2014 | Shestak et al. |
| 8,784,450 B2 | 7/2014 | Moskowitz et al. |
| 8,786,689 B1 | 7/2014 | Liu |
| D710,545 S | 8/2014 | Wu |
| D710,546 S | 8/2014 | Wu |
| 8,827,934 B2 | 9/2014 | Chopra et al. |
| 8,831,706 B2 | 9/2014 | Fu et al. |
| 8,836,768 B1 | 9/2014 | Rafii et al. |
| 8,838,199 B2 | 9/2014 | Simon et al. |
| 8,848,977 B2 | 9/2014 | Bammer et al. |
| 8,855,395 B2 | 10/2014 | Baturin et al. |
| 8,878,900 B2 | 11/2014 | Yang et al. |
| 8,879,815 B2 | 11/2014 | Miao et al. |
| 8,885,177 B2 | 11/2014 | Ben-Yishai et al. |
| 8,890,772 B2 | 11/2014 | Woo et al. |
| 8,890,773 B1 | 11/2014 | Pederson |
| 8,890,943 B2 | 11/2014 | Lee et al. |
| 8,897,514 B2 | 11/2014 | Feikas et al. |
| 8,900,131 B2 | 12/2014 | Chopra et al. |
| 8,903,150 B2 | 12/2014 | Star-Lack et al. |
| 8,908,952 B2 | 12/2014 | Isaacs et al. |
| 8,911,358 B2 | 12/2014 | Koninckx et al. |

(56) References Cited

U.S. PATENT DOCUMENTS

| | | |
|---|---|---|
| 8,917,268 B2 | 12/2014 | Johnsen et al. |
| 8,920,776 B2 | 12/2014 | Gaiger et al. |
| 8,922,589 B2 | 12/2014 | Laor |
| 8,941,559 B2 | 1/2015 | Bar-Zeev et al. |
| 8,942,455 B2 | 1/2015 | Chou et al. |
| 8,950,877 B2 | 2/2015 | Northey et al. |
| 8,953,246 B2 | 2/2015 | Koenig |
| 8,965,583 B2 | 2/2015 | Ortmaier et al. |
| 8,969,829 B2 | 3/2015 | Wollenweber et al. |
| 8,989,349 B2 | 3/2015 | Thomson et al. |
| 8,992,580 B2 | 3/2015 | Bar et al. |
| 8,994,729 B2 | 3/2015 | Nakamura |
| 8,994,795 B2 | 3/2015 | Oh |
| 9,004,711 B2 | 4/2015 | Gerolemou |
| 9,005,211 B2 | 4/2015 | Brundobler et al. |
| 9,011,441 B2 | 4/2015 | Bertagnoli et al. |
| 9,057,759 B2 | 6/2015 | Klingenbeck et al. |
| 9,060,757 B2 | 6/2015 | Lawson et al. |
| 9,066,751 B2 | 6/2015 | Sasso |
| 9,081,436 B1 | 7/2015 | Berme et al. |
| 9,084,635 B2 | 7/2015 | Nuckley et al. |
| 9,085,643 B2 | 7/2015 | Svanborg et al. |
| 9,087,471 B2 | 7/2015 | Miao |
| 9,100,643 B2 | 8/2015 | McDowall et al. |
| 9,101,394 B2 | 8/2015 | Arata et al. |
| 9,104,902 B2 | 8/2015 | Xu et al. |
| 9,111,175 B2 | 8/2015 | Strommer et al. |
| 9,123,155 B2 | 9/2015 | Cunningham et al. |
| 9,125,556 B2 | 9/2015 | Zehavi et al. |
| 9,129,054 B2 | 9/2015 | Nawana et al. |
| 9,129,372 B2 | 9/2015 | Kriston et al. |
| 9,132,361 B2 | 9/2015 | Smithwick |
| 9,135,706 B2 | 9/2015 | Zagorchev et al. |
| 9,141,873 B2 | 9/2015 | Takemoto |
| 9,142,020 B2 | 9/2015 | Deguise et al. |
| 9,149,317 B2 | 10/2015 | Arthur et al. |
| 9,165,203 B2 | 10/2015 | McCarthy |
| 9,165,362 B2 | 10/2015 | Siewerdsen et al. |
| 9,179,984 B2 | 11/2015 | Teichman et al. |
| D746,354 S | 12/2015 | Chang |
| 9,208,916 B2 | 12/2015 | Appleby et al. |
| 9,220,573 B2 | 12/2015 | Kendrick et al. |
| 9,225,895 B2 | 12/2015 | Kozinski |
| 9,232,982 B2 | 1/2016 | Soler et al. |
| 9,235,934 B2 | 1/2016 | Mandella et al. |
| 9,240,046 B2 | 1/2016 | Carrell et al. |
| 9,244,278 B2 | 1/2016 | Sugiyama et al. |
| 9,247,240 B2 | 1/2016 | Park et al. |
| 9,259,192 B2 | 2/2016 | Ishihara |
| 9,265,572 B2 | 2/2016 | Fuchs et al. |
| 9,269,192 B2 | 2/2016 | Kobayashi |
| 9,283,052 B2 | 3/2016 | Rodriguez Ponce |
| 9,286,730 B2 | 3/2016 | Bar-Zeev et al. |
| 9,289,267 B2 | 3/2016 | Sauer et al. |
| 9,294,222 B2 | 3/2016 | Proctor, Jr. |
| 9,300,949 B2 | 3/2016 | Ahearn |
| 9,310,591 B2 | 4/2016 | Hua et al. |
| 9,320,474 B2 | 4/2016 | Demri et al. |
| 9,323,055 B2 | 4/2016 | Baillot |
| 9,330,477 B2 | 5/2016 | Rappel |
| 9,335,547 B2 | 5/2016 | Takano et al. |
| 9,335,567 B2 | 5/2016 | Nakamura |
| 9,341,704 B2 | 5/2016 | Picard et al. |
| 9,344,686 B2 | 5/2016 | Moharir |
| 9,349,066 B2 | 5/2016 | Koo et al. |
| 9,349,520 B2 | 5/2016 | Demetriou et al. |
| 9,364,294 B2 | 6/2016 | Razzaque et al. |
| 9,370,332 B2 | 6/2016 | Paladini et al. |
| 9,373,166 B2 | 6/2016 | Azar |
| 9,375,639 B2 | 6/2016 | Kobayashi et al. |
| 9,378,558 B2 | 6/2016 | Kajiwara et al. |
| 9,380,287 B2 | 6/2016 | Nistico et al. |
| 9,387,008 B2 | 7/2016 | Sarvestani et al. |
| 9,392,129 B2 | 7/2016 | Simmons |
| 9,395,542 B2 | 7/2016 | Tilleman et al. |
| 9,398,936 B2 | 7/2016 | Razzaque et al. |
| 9,400,384 B2 | 7/2016 | Griffith |
| 9,414,041 B2 | 8/2016 | Ko et al. |
| 9,424,611 B2 | 8/2016 | Kanjirathinkal et al. |
| 9,424,641 B2 | 8/2016 | Wiemker et al. |
| 9,427,286 B2 | 8/2016 | Siewerdsen et al. |
| 9,438,894 B2 | 9/2016 | Park et al. |
| 9,443,488 B2 | 9/2016 | Borenstein et al. |
| 9,453,804 B2 | 9/2016 | Tahtali |
| 9,456,878 B2 | 10/2016 | MacFarlane et al. |
| 9,465,235 B2 | 10/2016 | Chang |
| 9,468,373 B2 | 10/2016 | Larsen |
| 9,470,908 B1 | 10/2016 | Frankel et al. |
| 9,473,766 B2 | 10/2016 | Douglas et al. |
| 9,492,222 B2 | 11/2016 | Singh |
| 9,495,585 B2 | 11/2016 | Bicer et al. |
| 9,498,132 B2 | 11/2016 | Maier-Hein et al. |
| 9,498,231 B2 | 11/2016 | Haider et al. |
| 9,499,999 B2 | 11/2016 | Nanqing |
| 9,507,155 B2 | 11/2016 | Morimoto |
| 9,513,495 B2 | 12/2016 | Waters |
| 9,521,966 B2 | 12/2016 | Schwartz |
| 9,526,443 B1 | 12/2016 | Berme et al. |
| 9,530,382 B2 | 12/2016 | Simmons |
| 9,532,846 B2 | 1/2017 | Nakamura |
| 9,532,849 B2 | 1/2017 | Anderson et al. |
| 9,538,962 B1 | 1/2017 | Hannaford et al. |
| 9,545,233 B2 | 1/2017 | Sirpad et al. |
| 9,546,779 B2 | 1/2017 | Rementer |
| 9,547,174 B2 | 1/2017 | Gao et al. |
| 9,547,940 B1 | 1/2017 | Sun et al. |
| 9,557,566 B2 | 1/2017 | Fujimaki |
| 9,560,318 B2 | 1/2017 | Reina et al. |
| 9,561,095 B1 | 2/2017 | Nguyen et al. |
| 9,561,446 B2 | 2/2017 | Brecher |
| 9,565,415 B2 | 2/2017 | Zhang et al. |
| 9,572,661 B2 | 2/2017 | Robin et al. |
| 9,576,556 B2 | 2/2017 | Simmons |
| 9,581,822 B2 | 2/2017 | Morimoto |
| 9,610,056 B2 | 4/2017 | Lavallee et al. |
| 9,612,657 B2 | 4/2017 | Bertram et al. |
| 9,629,595 B2 | 4/2017 | Walker et al. |
| 9,633,431 B2 | 4/2017 | Merlet |
| 9,645,395 B2 | 5/2017 | Bolas et al. |
| 9,646,423 B1 | 5/2017 | Sun et al. |
| 9,672,597 B2 | 6/2017 | Amiot et al. |
| 9,672,607 B2 | 6/2017 | Demri et al. |
| 9,672,640 B2 | 6/2017 | Kleiner |
| 9,675,306 B2 | 6/2017 | Morton |
| 9,675,319 B1 | 6/2017 | Razzaque et al. |
| 9,684,980 B2 | 6/2017 | Royalty et al. |
| 9,690,119 B2 | 6/2017 | Garofolo et al. |
| RE46,463 E | 7/2017 | Fienbloom et al. |
| 9,693,748 B2 | 7/2017 | Rai et al. |
| 9,710,968 B2 | 7/2017 | Dillavou et al. |
| 9,713,502 B2 | 7/2017 | Finkman et al. |
| 9,724,119 B2 | 8/2017 | Hissong et al. |
| 9,724,165 B2 | 8/2017 | Arata et al. |
| 9,726,888 B2 | 8/2017 | Giartosio et al. |
| 9,728,006 B2 | 8/2017 | Varga |
| 9,729,831 B2 | 8/2017 | Birnkrant et al. |
| 9,757,034 B2 | 9/2017 | Desjardins et al. |
| 9,757,087 B2 | 9/2017 | Simon et al. |
| 9,766,441 B2 | 9/2017 | Rappel |
| 9,767,608 B2 | 9/2017 | Lee et al. |
| 9,770,203 B1 | 9/2017 | Berme et al. |
| 9,772,102 B1 | 9/2017 | Ferguson |
| 9,772,495 B2 | 9/2017 | Tam et al. |
| 9,791,138 B1 | 10/2017 | Feinbloom et al. |
| 9,800,995 B2 | 10/2017 | Libin et al. |
| 9,805,504 B2 | 10/2017 | Zhang et al. |
| 9,808,148 B2 | 11/2017 | Miller et al. |
| 9,839,448 B2 | 12/2017 | Reckling et al. |
| 9,844,413 B2 | 12/2017 | Daon et al. |
| 9,851,080 B2 | 12/2017 | Wilt et al. |
| 9,858,663 B2 | 1/2018 | Penney et al. |
| 9,861,446 B2 | 1/2018 | Lang |
| 9,864,214 B2 | 1/2018 | Fass |
| 9,872,733 B2 | 1/2018 | Shoham et al. |

(56) References Cited

U.S. PATENT DOCUMENTS

| | | |
|---|---|---|
| 9,875,544 B2 | 1/2018 | Rai et al. |
| 9,877,642 B2 | 1/2018 | Duret |
| 9,885,465 B2 | 2/2018 | Nguyen |
| 9,886,552 B2 | 2/2018 | Dillavou et al. |
| 9,886,760 B2 | 2/2018 | Liu et al. |
| 9,892,564 B1 | 2/2018 | Cvetko et al. |
| 9,898,866 B2 | 2/2018 | Fuchs et al. |
| 9,901,414 B2 | 2/2018 | Lively et al. |
| 9,911,187 B2 | 3/2018 | Steinle et al. |
| 9,927,611 B2 | 3/2018 | Rudy et al. |
| 9,928,629 B2 | 3/2018 | Benishti et al. |
| 9,940,750 B2 | 4/2018 | Dillavou et al. |
| 9,943,374 B2 | 4/2018 | Merritt et al. |
| 9,947,110 B2 | 4/2018 | Haimerl |
| 9,956,054 B2 | 5/2018 | Aguirre-Valencia |
| 9,958,674 B2 | 5/2018 | Border |
| 9,959,620 B2 | 5/2018 | Merlet |
| 9,959,629 B2 | 5/2018 | Dillavou et al. |
| 9,965,681 B2 | 5/2018 | Border et al. |
| 9,968,297 B2 | 5/2018 | Connor |
| 9,980,780 B2 | 5/2018 | Lang |
| 9,986,228 B2 | 5/2018 | Woods |
| D824,523 S | 7/2018 | Paoli et al. |
| 10,010,379 B1 | 7/2018 | Gibby et al. |
| 10,013,531 B2 | 7/2018 | Richards et al. |
| 10,015,243 B2 | 7/2018 | Kazerani et al. |
| 10,016,243 B2 | 7/2018 | Esterberg |
| 10,022,064 B2 | 7/2018 | Kim et al. |
| 10,022,065 B2 | 7/2018 | Ben-Yishai et al. |
| 10,022,104 B2 | 7/2018 | Sell et al. |
| 10,023,615 B2 | 7/2018 | Bonny |
| 10,026,015 B2 | 7/2018 | Cavusoglu et al. |
| 10,034,713 B2 | 7/2018 | Yang et al. |
| 10,046,165 B2 | 8/2018 | Frewin et al. |
| 10,055,838 B2 | 8/2018 | Elenbaas et al. |
| 10,066,816 B2 | 9/2018 | Chang |
| 10,073,515 B2 | 9/2018 | Awdeh |
| 10,080,616 B2 | 9/2018 | Wilkinson et al. |
| 10,082,680 B2 | 9/2018 | Chung |
| 10,085,709 B2 | 10/2018 | Lavallee et al. |
| 10,105,187 B2 | 10/2018 | Corndorf et al. |
| 10,107,483 B2 | 10/2018 | Oren |
| 10,108,833 B2 | 10/2018 | Hong et al. |
| 10,123,840 B2 | 11/2018 | Dorman |
| 10,130,378 B2 | 11/2018 | Bryan |
| 10,132,483 B1 | 11/2018 | Feinbloom et al. |
| 10,134,166 B2 | 11/2018 | Benishti et al. |
| 10,134,194 B2 | 11/2018 | Kepner et al. |
| 10,139,652 B2 | 11/2018 | Windham |
| 10,139,920 B2 | 11/2018 | Isaacs et al. |
| 10,142,496 B1 | 11/2018 | Rao et al. |
| 10,151,928 B2 | 12/2018 | Ushakov |
| 10,154,239 B2 | 12/2018 | Casas |
| 10,159,530 B2 | 12/2018 | Lang |
| 10,163,207 B2 | 12/2018 | Merlet |
| 10,166,079 B2 | 1/2019 | McLachlin et al. |
| 10,175,507 B2 | 1/2019 | Nakamura |
| 10,175,753 B2 | 1/2019 | Boesen |
| 10,181,361 B2 | 1/2019 | Dillavou et al. |
| 10,186,055 B2 | 1/2019 | Takahashi et al. |
| 10,188,672 B2 | 1/2019 | Wagner |
| 10,194,131 B2 | 1/2019 | Casas |
| 10,194,990 B2 | 2/2019 | Amanatullah et al. |
| 10,194,993 B2 | 2/2019 | Roger et al. |
| 10,195,076 B2 | 2/2019 | Fateh |
| 10,197,803 B2 | 2/2019 | Badiali et al. |
| 10,197,816 B2 | 2/2019 | Waisman et al. |
| 10,207,315 B2 | 2/2019 | Appleby et al. |
| 10,212,517 B1 | 2/2019 | Beltran et al. |
| 10,230,719 B2 | 3/2019 | Vaughn et al. |
| 10,231,893 B2 | 3/2019 | Lei et al. |
| 10,235,606 B2 | 3/2019 | Miao et al. |
| 10,240,769 B1 | 3/2019 | Braganca et al. |
| 10,247,965 B2 | 4/2019 | Ton |
| 10,251,724 B2 | 4/2019 | McLachlin et al. |
| 10,261,324 B2 | 4/2019 | Chuang et al. |
| 10,262,424 B2 | 4/2019 | Ketcha et al. |
| 10,274,731 B2 | 4/2019 | Maimone |
| 10,278,777 B1 | 5/2019 | Lang |
| 10,292,768 B2 | 5/2019 | Lang |
| 10,296,805 B2 | 5/2019 | Yang et al. |
| 10,319,154 B1 | 6/2019 | Chakravarthula et al. |
| 10,326,975 B2 | 6/2019 | Casas |
| 10,332,267 B2 | 6/2019 | Rai et al. |
| 10,339,719 B2 | 7/2019 | Jagga et al. |
| 10,352,543 B1 | 7/2019 | Braganca et al. |
| 10,357,146 B2 | 7/2019 | Fiebel et al. |
| 10,357,574 B2 | 7/2019 | Hilderbrand et al. |
| 10,366,489 B2 | 7/2019 | Boettger et al. |
| 10,368,947 B2 | 8/2019 | Lang |
| 10,368,948 B2 | 8/2019 | Tripathi |
| 10,382,748 B2 | 8/2019 | Benishti et al. |
| 10,383,654 B2 | 8/2019 | Yilmaz et al. |
| 10,386,645 B2 | 8/2019 | Abou Shousha |
| 10,398,514 B2 | 9/2019 | Ryan et al. |
| 10,405,825 B2 | 9/2019 | Rai et al. |
| 10,405,927 B1 | 9/2019 | Lang |
| 10,413,752 B2 | 9/2019 | Berlinger et al. |
| 10,419,655 B2 | 9/2019 | Sivan |
| 10,420,626 B2 | 9/2019 | Tokuda et al. |
| 10,420,813 B2 | 9/2019 | Newell-Rogers et al. |
| 10,424,115 B2 | 9/2019 | Ellerbrock |
| D862,469 S | 10/2019 | Sadot et al. |
| 10,426,554 B2 | 10/2019 | Siewerdsen et al. |
| 10,429,675 B2 | 10/2019 | Greget |
| 10,431,008 B2 | 10/2019 | Djajadiningrat et al. |
| 10,433,814 B2 | 10/2019 | Razzaque et al. |
| 10,434,335 B2 | 10/2019 | Takahashi et al. |
| 10,441,236 B2 | 10/2019 | Bar-Tal et al. |
| 10,444,514 B2 | 10/2019 | Abou Shousha et al. |
| 10,447,947 B2 | 10/2019 | Liu |
| 10,448,003 B2 | 10/2019 | Grafenberg |
| 10,449,040 B2 | 10/2019 | Lashinski et al. |
| 10,453,187 B2 | 10/2019 | Peterson et al. |
| 10,463,434 B2 | 11/2019 | Siegler et al. |
| 10,465,892 B1 | 11/2019 | Feinbloom et al. |
| 10,466,487 B2 | 11/2019 | Blum et al. |
| 10,470,732 B2 | 11/2019 | Baumgart et al. |
| 10,473,314 B1 | 11/2019 | Braganca et al. |
| 10,485,989 B2 | 11/2019 | Jordan et al. |
| 10,488,663 B2 | 11/2019 | Choi |
| D869,772 S | 12/2019 | Gand |
| D870,977 S | 12/2019 | Berggren et al. |
| 10,492,755 B2 | 12/2019 | Lin et al. |
| 10,499,997 B2 | 12/2019 | Weinstein et al. |
| 10,504,231 B2 | 12/2019 | Fiala |
| 10,507,066 B2 | 12/2019 | Dimaio et al. |
| 10,511,822 B2 | 12/2019 | Casas |
| 10,517,544 B2 | 12/2019 | Taguchi et al. |
| 10,537,395 B2 | 1/2020 | Perez |
| 10,540,780 B1 | 1/2020 | Cousins et al. |
| 10,543,485 B2 | 1/2020 | Ismagilov et al. |
| 10,546,423 B2 | 1/2020 | Jones et al. |
| 10,548,557 B2 | 2/2020 | Lim et al. |
| 10,555,775 B2 | 2/2020 | Hoffman et al. |
| 10,568,535 B2 | 2/2020 | Roberts et al. |
| 10,571,696 B2 | 2/2020 | Urey et al. |
| 10,571,716 B2 | 2/2020 | Chapiro |
| 10,573,087 B2 | 2/2020 | Gallop et al. |
| 10,577,630 B2 | 3/2020 | Zhang et al. |
| 10,586,400 B2 | 3/2020 | Douglas |
| 10,591,737 B2 | 3/2020 | Yildiz et al. |
| 10,592,748 B1 | 3/2020 | Cousins et al. |
| 10,594,998 B1 | 3/2020 | Casas |
| 10,595,716 B2 | 3/2020 | Nazareth et al. |
| 10,601,950 B2 | 3/2020 | Devam et al. |
| 10,602,114 B2 | 3/2020 | Casas |
| 10,603,113 B2 | 3/2020 | Lang |
| 10,603,133 B2 | 3/2020 | Wang et al. |
| 10,606,085 B2 | 3/2020 | Toyama |
| 10,610,172 B2 | 4/2020 | Hummel et al. |
| 10,610,179 B2 | 4/2020 | Altmann |
| 10,613,352 B2 | 4/2020 | Knoll |
| 10,617,566 B2 | 4/2020 | Esmonde |

(56) References Cited

U.S. PATENT DOCUMENTS

| | | |
|---|---|---|
| 10,620,460 B2 | 4/2020 | Carabin |
| 10,621,738 B2 | 4/2020 | Miao et al. |
| 10,625,099 B2 | 4/2020 | Takahashi et al. |
| 10,626,473 B2 | 4/2020 | Mariani et al. |
| 10,631,905 B2 | 4/2020 | Asfora et al. |
| 10,631,907 B2 | 4/2020 | Zucker et al. |
| 10,634,331 B1 | 4/2020 | Feinbloom et al. |
| 10,634,921 B2 | 4/2020 | Blum et al. |
| 10,638,080 B2 | 4/2020 | Ovchinnikov et al. |
| 10,646,285 B2 | 5/2020 | Siemionow et al. |
| 10,650,513 B2 | 5/2020 | Penney et al. |
| 10,650,594 B2 | 5/2020 | Jones et al. |
| 10,652,525 B2 | 5/2020 | Woods |
| 10,653,495 B2 | 5/2020 | Gregerson et al. |
| 10,660,715 B2 | 5/2020 | Dozeman |
| 10,663,738 B2 | 5/2020 | Carlvik et al. |
| 10,672,145 B2 | 6/2020 | Albiol et al. |
| 10,682,112 B2 | 6/2020 | Pizaine et al. |
| 10,682,767 B2 | 6/2020 | Grafenberg et al. |
| 10,687,901 B2 | 6/2020 | Thomas |
| 10,691,397 B1 | 6/2020 | Clements |
| 10,702,713 B2 | 7/2020 | Mori et al. |
| 10,706,540 B2 | 7/2020 | Merlet |
| 10,709,398 B2 | 7/2020 | Schweizer |
| 10,713,801 B2 | 7/2020 | Jordan et al. |
| 10,716,643 B2 | 7/2020 | Justin et al. |
| 10,722,733 B2 | 7/2020 | Takahashi |
| 10,725,535 B2 | 7/2020 | Yu |
| 10,731,832 B2 | 8/2020 | Koo |
| 10,732,721 B1 | 8/2020 | Clements |
| 10,742,949 B2 | 8/2020 | Casas |
| 10,743,939 B1 | 8/2020 | Lang |
| 10,743,943 B2 | 8/2020 | Razeto et al. |
| 10,747,315 B2 | 8/2020 | Tungare et al. |
| 10,748,319 B1 | 8/2020 | Tao et al. |
| 10,758,315 B2 | 9/2020 | Johnson et al. |
| 10,777,094 B1 | 9/2020 | Rao et al. |
| 10,777,315 B2 | 9/2020 | Zehavi et al. |
| 10,781,482 B2 | 9/2020 | Gubatayao et al. |
| 10,792,110 B2 | 10/2020 | Leung et al. |
| 10,799,145 B2 | 10/2020 | West et al. |
| 10,799,296 B2 | 10/2020 | Lang |
| 10,799,298 B2 | 10/2020 | Crawford et al. |
| 10,799,316 B2 | 10/2020 | Sela et al. |
| 10,810,799 B2 | 10/2020 | Tepper et al. |
| 10,818,019 B2 | 10/2020 | Piat et al. |
| 10,818,101 B2 | 10/2020 | Gallop et al. |
| 10,818,199 B2 | 10/2020 | Buras et al. |
| 10,825,563 B2 | 11/2020 | Gibby et al. |
| 10,831,943 B2 | 11/2020 | Santarone et al. |
| 10,835,296 B2 | 11/2020 | Elimelech et al. |
| 10,838,206 B2 | 11/2020 | Fortin-Deschnes et al. |
| 10,839,629 B2 | 11/2020 | Jones et al. |
| 10,839,956 B2 | 11/2020 | Beydoun et al. |
| 10,841,556 B2 | 11/2020 | Casas |
| 10,842,002 B2 | 11/2020 | Chang |
| 10,842,461 B2 | 11/2020 | Johnson et al. |
| 10,849,691 B2 | 12/2020 | Zucker et al. |
| 10,849,693 B2 | 12/2020 | Lang |
| 10,849,710 B2 | 12/2020 | Liu |
| 10,861,236 B2 | 12/2020 | Geri et al. |
| 10,865,220 B2 | 12/2020 | Ebetino et al. |
| 10,869,517 B1 | 12/2020 | Halpern |
| 10,869,727 B2 | 12/2020 | Yanof et al. |
| 10,872,472 B2 | 12/2020 | Watola et al. |
| 10,877,262 B1 | 12/2020 | Luxembourg |
| 10,877,296 B2 | 12/2020 | Lindsey et al. |
| 10,878,639 B2 | 12/2020 | Douglas et al. |
| 10,893,260 B2 | 1/2021 | Trail et al. |
| 10,895,742 B2 | 1/2021 | Schneider et al. |
| 10,895,743 B2 | 1/2021 | Dausmann |
| 10,895,906 B2 | 1/2021 | West et al. |
| 10,898,151 B2 | 1/2021 | Harding et al. |
| 10,921,595 B2 | 2/2021 | Rakshit et al. |
| 10,921,613 B2 | 2/2021 | Gupta et al. |
| 10,928,321 B2 | 2/2021 | Rawle |
| 10,928,638 B2 | 2/2021 | Ninan et al. |
| 10,929,670 B1 | 2/2021 | Troy et al. |
| 10,935,815 B1 | 3/2021 | Cesar |
| 10,935,816 B2 | 3/2021 | Ban et al. |
| 10,936,537 B2 | 3/2021 | Huston |
| 10,939,973 B2 | 3/2021 | Dimaio et al. |
| 10,939,977 B2 | 3/2021 | Messinger et al. |
| 10,941,933 B2 | 3/2021 | Ferguson |
| 10,946,108 B2 | 3/2021 | Zhang et al. |
| 10,950,338 B2 | 3/2021 | Douglas |
| 10,951,872 B2 | 3/2021 | Casas |
| 10,964,095 B1 | 3/2021 | Douglas |
| 10,964,124 B1 | 3/2021 | Douglas |
| 10,966,768 B2 | 4/2021 | Poulos |
| 10,993,754 B2 | 5/2021 | Kuntz et al. |
| 11,000,335 B2 | 5/2021 | Dorman |
| 11,006,093 B1 | 5/2021 | Hegyi |
| 11,013,550 B2 | 5/2021 | Rioux et al. |
| 11,013,560 B2 | 5/2021 | Lang |
| 11,013,562 B2 | 5/2021 | Marti et al. |
| 11,013,573 B2 | 5/2021 | Chang |
| 11,013,900 B2 | 5/2021 | Malek et al. |
| 11,019,988 B2 | 6/2021 | Fiebel et al. |
| 11,027,027 B2 | 6/2021 | Manning et al. |
| 11,029,147 B2 | 6/2021 | Abovitz et al. |
| 11,030,809 B2 | 6/2021 | Wang |
| 11,041,173 B2 | 6/2021 | Zhang et al. |
| 11,045,663 B2 | 6/2021 | Mori et al. |
| 11,049,293 B2 | 6/2021 | Chae et al. |
| 11,049,476 B2 | 6/2021 | Fuchs et al. |
| 11,050,990 B2 | 6/2021 | Casas |
| 11,057,505 B2 | 7/2021 | Dharmatilleke |
| 11,058,390 B1 | 7/2021 | Douglas |
| 11,061,257 B1 | 7/2021 | Hakim |
| 11,064,904 B2 | 7/2021 | Kay et al. |
| 11,065,062 B2 | 7/2021 | Frushour et al. |
| 11,067,387 B2 | 7/2021 | Marell et al. |
| 11,071,497 B2 | 7/2021 | Hallack et al. |
| 11,079,596 B2 | 8/2021 | Arizona |
| 11,087,039 B2 | 8/2021 | Duff et al. |
| 11,090,019 B2 | 8/2021 | Siemionow et al. |
| 11,097,129 B2 | 8/2021 | Sakata et al. |
| 11,099,376 B1 | 8/2021 | Steier et al. |
| 11,103,320 B2 | 8/2021 | Leboeuf et al. |
| D930,162 S | 9/2021 | Cremer et al. |
| 11,109,762 B1 | 9/2021 | Steier et al. |
| 11,112,611 B1 | 9/2021 | Kessler et al. |
| 11,122,164 B2 | 9/2021 | Gigante |
| 11,123,604 B2 | 9/2021 | Fung |
| 11,129,562 B2 | 9/2021 | Roberts et al. |
| 11,132,055 B2 | 9/2021 | Jones et al. |
| 11,135,015 B2 | 10/2021 | Crawford et al. |
| 11,135,016 B2 | 10/2021 | Frielinghaus et al. |
| 11,137,610 B1 | 10/2021 | Kessler et al. |
| 11,141,221 B2 | 10/2021 | Hobeika et al. |
| 11,153,549 B2 | 10/2021 | Casas |
| 11,153,555 B1 | 10/2021 | Healy et al. |
| 11,163,176 B2 | 11/2021 | Karafin et al. |
| 11,164,324 B2 | 11/2021 | Liu et al. |
| 11,166,006 B2 | 11/2021 | Hegyi |
| 11,172,990 B2 | 11/2021 | Lang |
| 11,179,136 B2 | 11/2021 | Kohli et al. |
| 11,180,557 B2 | 11/2021 | Noelle |
| 11,181,747 B1 | 11/2021 | Kessler et al. |
| 11,185,891 B2 | 11/2021 | Cousins et al. |
| 11,202,682 B2 | 12/2021 | Staunton et al. |
| 11,207,150 B2 | 12/2021 | Healy et al. |
| 11,217,028 B2 | 1/2022 | Jones et al. |
| 11,224,483 B2 | 1/2022 | Steinberg et al. |
| 11,224,763 B2 | 1/2022 | Takahashi et al. |
| 11,227,417 B2 | 1/2022 | Berlinger et al. |
| 11,231,787 B2 | 1/2022 | Isaacs et al. |
| 11,244,508 B2 | 2/2022 | Kazanzides et al. |
| 11,253,216 B2 | 2/2022 | Crawford et al. |
| 11,253,323 B2 | 2/2022 | Hughes et al. |
| 11,257,190 B2 | 2/2022 | Mao et al. |
| 11,257,241 B2 | 2/2022 | Tao |
| 11,263,772 B2 | 3/2022 | Siemionow et al. |

(56) References Cited

U.S. PATENT DOCUMENTS

| | | |
|---|---|---|
| 11,269,401 B2 | 3/2022 | West et al. |
| 11,272,151 B2 | 3/2022 | Casas |
| 11,278,359 B2 | 3/2022 | Siemionow et al. |
| 11,278,413 B1 | 3/2022 | Lang |
| 11,280,480 B2 | 3/2022 | Wilt et al. |
| 11,284,846 B2 | 3/2022 | Graumann et al. |
| 11,291,521 B2 | 4/2022 | Im |
| 11,294,167 B2 | 4/2022 | Ishimoda |
| 11,297,285 B2 | 4/2022 | Pierce |
| 11,300,252 B2 | 4/2022 | Nguyen |
| 11,300,790 B2 | 4/2022 | Cheng et al. |
| 11,304,621 B2 | 4/2022 | Merschon et al. |
| 11,304,759 B2 | 4/2022 | Kovtun et al. |
| 11,307,402 B2 | 4/2022 | Steier et al. |
| 11,308,663 B2 | 4/2022 | Alhrishy et al. |
| 11,311,341 B2 | 4/2022 | Lang |
| 11,317,973 B2 | 5/2022 | Calloway et al. |
| 11,337,763 B2 | 5/2022 | Choi |
| 11,348,257 B2 | 5/2022 | Lang |
| 11,350,072 B1 | 5/2022 | Quiles Casas |
| 11,350,965 B2 | 6/2022 | Yilmaz et al. |
| 11,351,006 B2 | 6/2022 | Aferzon et al. |
| 11,354,813 B2 | 6/2022 | Piat et al. |
| 11,360,315 B2 | 6/2022 | Tu et al. |
| 11,382,699 B2 | 7/2022 | Wassall et al. |
| 11,382,700 B2 | 7/2022 | Calloway et al. |
| 11,382,712 B2 | 7/2022 | Elimelech et al. |
| 11,382,713 B2 | 7/2022 | Healy et al. |
| 11,389,252 B2 | 7/2022 | Gera et al. |
| 11,399,895 B2 | 8/2022 | Soper et al. |
| 11,402,524 B2 | 8/2022 | Song et al. |
| 11,406,338 B2 | 8/2022 | Tolkowsky |
| 11,423,554 B2 | 8/2022 | Borsdorf et al. |
| 11,432,828 B1 | 9/2022 | Lang |
| 11,432,931 B2 | 9/2022 | Lang |
| 11,452,568 B2 | 9/2022 | Lang |
| 11,460,915 B2 | 10/2022 | Frielinghaus et al. |
| 11,461,983 B2 | 10/2022 | Jones et al. |
| 11,464,581 B2 | 10/2022 | Calloway |
| 11,478,214 B2 | 10/2022 | Siewerdsen et al. |
| 11,483,532 B2 | 10/2022 | Quiles Casas |
| 11,490,986 B2 | 11/2022 | Ben-Yishai |
| 11,527,002 B2 | 12/2022 | Govari |
| 11,528,393 B2 | 12/2022 | Garofolo et al. |
| 11,627,924 B2 | 4/2023 | Alexandroni et al. |
| 11,648,016 B2 | 5/2023 | Hathaway et al. |
| 11,657,518 B2 | 5/2023 | Ketcha et al. |
| 11,666,458 B2 | 6/2023 | Kim et al. |
| 11,669,984 B2 | 6/2023 | Siewerdsen et al. |
| 11,712,582 B2 | 8/2023 | Miyazaki et al. |
| 11,750,794 B2 | 9/2023 | Benishti et al. |
| 11,766,296 B2 | 9/2023 | Wolf et al. |
| 11,798,178 B2 | 10/2023 | Merlet |
| 11,801,097 B2 | 10/2023 | Crawford et al. |
| 11,801,115 B2 | 10/2023 | Elimelech et al. |
| 11,826,111 B2 | 11/2023 | Mahfouz |
| 11,839,501 B2 | 12/2023 | Takahashi et al. |
| 11,885,752 B2 | 1/2024 | St-Aubin et al. |
| 11,896,445 B2 | 2/2024 | Gera et al. |
| 2002/0082498 A1 | 6/2002 | Wendt et al. |
| 2003/0059097 A1 | 3/2003 | Abovitz et al. |
| 2003/0117393 A1 | 6/2003 | Sauer et al. |
| 2003/0130576 A1 | 7/2003 | Seeley et al. |
| 2003/0156144 A1 | 8/2003 | Morita |
| 2003/0210812 A1 | 11/2003 | Khamene et al. |
| 2003/0225329 A1 | 12/2003 | Rossner et al. |
| 2004/0019263 A1 | 1/2004 | Jutras et al. |
| 2004/0030237 A1 | 2/2004 | Lee et al. |
| 2004/0138556 A1 | 7/2004 | Cosman |
| 2004/0238732 A1 | 12/2004 | State et al. |
| 2005/0017972 A1 | 1/2005 | Poole et al. |
| 2005/0024586 A1 | 2/2005 | Teiwes et al. |
| 2005/0119639 A1 | 6/2005 | McCombs et al. |
| 2005/0203367 A1 | 9/2005 | Ahmed et al. |
| 2005/0203380 A1 | 9/2005 | Sauer et al. |
| 2005/0215879 A1 | 9/2005 | Chuanggui |
| 2006/0072124 A1 | 4/2006 | Smetak et al. |
| 2006/0134198 A1 | 6/2006 | Tawa et al. |
| 2006/0176242 A1 | 8/2006 | Jaramaz et al. |
| 2007/0018975 A1 | 1/2007 | Chuanggui et al. |
| 2007/0058261 A1 | 3/2007 | Sugihara et al. |
| 2007/0183041 A1 | 8/2007 | McCloy et al. |
| 2007/0233371 A1 | 10/2007 | Stoschek et al. |
| 2007/0273610 A1 | 11/2007 | Baillot |
| 2008/0002809 A1 | 1/2008 | Bodduluri |
| 2008/0007645 A1 | 1/2008 | McCutchen |
| 2008/0035266 A1 | 2/2008 | Danziger |
| 2008/0085033 A1 | 4/2008 | Haven et al. |
| 2008/0159612 A1 | 7/2008 | Fu et al. |
| 2008/0183065 A1 | 7/2008 | Goldbach |
| 2008/0221625 A1 | 9/2008 | Hufner et al. |
| 2008/0253527 A1 | 10/2008 | Boyden et al. |
| 2008/0262812 A1 | 10/2008 | Arata et al. |
| 2008/0287728 A1 | 11/2008 | Mostafavi et al. |
| 2009/0018437 A1 | 1/2009 | Cooke |
| 2009/0024127 A1 | 1/2009 | Lechner et al. |
| 2009/0036902 A1 | 2/2009 | Dimaio et al. |
| 2009/0062869 A1 | 3/2009 | Claverie et al. |
| 2009/0099445 A1 | 4/2009 | Burger |
| 2009/0123452 A1 | 5/2009 | Madison |
| 2009/0227847 A1 | 9/2009 | Tepper et al. |
| 2009/0285366 A1 | 11/2009 | Essenreiter et al. |
| 2009/0300540 A1 | 12/2009 | Russell |
| 2010/0076305 A1 | 3/2010 | Maier-Hein et al. |
| 2010/0094308 A1 | 4/2010 | Tatsumi et al. |
| 2010/0106010 A1 | 4/2010 | Rubner et al. |
| 2010/0114110 A1 | 5/2010 | Taft et al. |
| 2010/0138939 A1 | 6/2010 | Bentzon et al. |
| 2010/0149073 A1 | 6/2010 | Chaum et al. |
| 2010/0172567 A1 | 7/2010 | Prokoski |
| 2010/0210939 A1 | 8/2010 | Hartmann et al. |
| 2010/0266220 A1 | 10/2010 | Zagorchev et al. |
| 2010/0274124 A1 | 10/2010 | Jascob et al. |
| 2011/0004259 A1 | 1/2011 | Stallings et al. |
| 2011/0098553 A1 | 4/2011 | Robbins et al. |
| 2011/0105895 A1 | 5/2011 | Kornblau et al. |
| 2011/0216060 A1 | 9/2011 | Weising et al. |
| 2011/0245625 A1 | 10/2011 | Trovato et al. |
| 2011/0248064 A1 | 10/2011 | Marczyk |
| 2011/0254922 A1 | 10/2011 | Schaerer et al. |
| 2011/0306873 A1 | 12/2011 | Shenai et al. |
| 2012/0014608 A1 | 1/2012 | Watanabe |
| 2012/0068913 A1* | 3/2012 | Bar-Zeev ............ G02B 27/017 |
| | | 345/8 |
| 2012/0078236 A1 | 3/2012 | Schoepp |
| 2012/0109151 A1 | 5/2012 | Maier-Hein et al. |
| 2012/0143050 A1 | 6/2012 | Heigl |
| 2012/0155064 A1 | 6/2012 | Waters |
| 2012/0162452 A1 | 6/2012 | Liu |
| 2012/0182605 A1 | 7/2012 | Hall et al. |
| 2012/0201421 A1 | 8/2012 | Hartmann et al. |
| 2012/0216411 A1 | 8/2012 | Wevers et al. |
| 2012/0224260 A1 | 9/2012 | Healy et al. |
| 2012/0238609 A1 | 9/2012 | Srivastava et al. |
| 2012/0289777 A1 | 11/2012 | Chopra et al. |
| 2012/0306850 A1* | 12/2012 | Balan .................. G06F 3/0304 |
| | | 345/419 |
| 2012/0320100 A1 | 12/2012 | Machida et al. |
| 2013/0002928 A1 | 1/2013 | Imai |
| 2013/0009853 A1 | 1/2013 | Hesselink et al. |
| 2013/0038632 A1 | 2/2013 | Dillavou et al. |
| 2013/0050258 A1 | 2/2013 | Liu et al. |
| 2013/0050833 A1 | 2/2013 | Lewis et al. |
| 2013/0057581 A1 | 3/2013 | Meier |
| 2013/0083009 A1 | 4/2013 | Geisner et al. |
| 2013/0106833 A1 | 5/2013 | Fun |
| 2013/0135734 A1 | 5/2013 | Shafer et al. |
| 2013/0135738 A1 | 5/2013 | Shafer et al. |
| 2013/0190602 A1 | 7/2013 | Liao et al. |
| 2013/0195338 A1 | 8/2013 | Xu et al. |
| 2013/0209953 A1 | 8/2013 | Arlinsky et al. |
| 2013/0234914 A1 | 9/2013 | Fujimaki |
| 2013/0234935 A1 | 9/2013 | Griffith |
| 2013/0237811 A1 | 9/2013 | Mihailescu et al. |

(56) References Cited

U.S. PATENT DOCUMENTS

| | | |
|---|---|---|
| 2013/0245461 A1 | 9/2013 | Maier-Hein et al. |
| 2013/0249787 A1 | 9/2013 | Morimoto |
| 2013/0249945 A1 | 9/2013 | Kobayashi |
| 2013/0265623 A1 | 10/2013 | Sugiyama et al. |
| 2013/0267838 A1* | 10/2013 | Fronk .................... A61B 5/064 600/424 |
| 2013/0278635 A1 | 10/2013 | Maggiore |
| 2013/0300637 A1 | 11/2013 | Smits et al. |
| 2013/0300760 A1 | 11/2013 | Sugano et al. |
| 2013/0342571 A1 | 12/2013 | Kinnebrew et al. |
| 2014/0031668 A1 | 1/2014 | Mobasser et al. |
| 2014/0049629 A1 | 2/2014 | Siewerdsen et al. |
| 2014/0088402 A1 | 3/2014 | Xu |
| 2014/0088990 A1 | 3/2014 | Nawana et al. |
| 2014/0104505 A1 | 4/2014 | Koenig |
| 2014/0105912 A1 | 4/2014 | Noelle |
| 2014/0114173 A1 | 4/2014 | Bar-Tal et al. |
| 2014/0142426 A1 | 5/2014 | Razzaque et al. |
| 2014/0168261 A1 | 6/2014 | Margolis et al. |
| 2014/0176661 A1 | 6/2014 | Smurro et al. |
| 2014/0177023 A1 | 6/2014 | Gao et al. |
| 2014/0189508 A1 | 7/2014 | Granchi et al. |
| 2014/0198129 A1 | 7/2014 | Liu et al. |
| 2014/0218291 A1* | 8/2014 | Kirk .......................... G06T 7/70 345/158 |
| 2014/0240484 A1 | 8/2014 | Kodama et al. |
| 2014/0243614 A1 | 8/2014 | Rothberg et al. |
| 2014/0256429 A1 | 9/2014 | Kobayashi et al. |
| 2014/0266983 A1 | 9/2014 | Christensen |
| 2014/0268356 A1 | 9/2014 | Bolas et al. |
| 2014/0270505 A1 | 9/2014 | McCarthy |
| 2014/0275760 A1 | 9/2014 | Lee et al. |
| 2014/0285404 A1 | 9/2014 | Takano et al. |
| 2014/0285429 A1 | 9/2014 | Simmons |
| 2014/0300632 A1 | 10/2014 | Laor |
| 2014/0300967 A1 | 10/2014 | Tilleman et al. |
| 2014/0301624 A1 | 10/2014 | Barckow et al. |
| 2014/0303491 A1 | 10/2014 | Shekhar et al. |
| 2014/0320399 A1 | 10/2014 | Kim et al. |
| 2014/0333899 A1 | 11/2014 | Smithwick |
| 2014/0336461 A1 | 11/2014 | Reiter et al. |
| 2014/0340286 A1 | 11/2014 | Machida et al. |
| 2014/0361956 A1 | 12/2014 | Mikhailov et al. |
| 2015/0005772 A1 | 1/2015 | Anglin et al. |
| 2015/0018672 A1 | 1/2015 | Blumhofer et al. |
| 2015/0031985 A1 | 1/2015 | Reddy et al. |
| 2015/0043798 A1 | 2/2015 | Carrell et al. |
| 2015/0070347 A1 | 3/2015 | Hofmann et al. |
| 2015/0084990 A1 | 3/2015 | Laor |
| 2015/0150641 A1 | 6/2015 | Daon et al. |
| 2015/0182293 A1 | 7/2015 | Yang et al. |
| 2015/0192776 A1 | 7/2015 | Lee et al. |
| 2015/0209119 A1 | 7/2015 | Theodore et al. |
| 2015/0261922 A1 | 9/2015 | Nawana et al. |
| 2015/0277123 A1 | 10/2015 | Chaum et al. |
| 2015/0282735 A1 | 10/2015 | Rossner |
| 2015/0287188 A1 | 10/2015 | Gazit et al. |
| 2015/0287236 A1 | 10/2015 | Winne et al. |
| 2015/0297314 A1 | 10/2015 | Fowler et al. |
| 2015/0305828 A1 | 10/2015 | Park et al. |
| 2015/0310668 A1 | 10/2015 | Ellerbrock |
| 2015/0338652 A1 | 11/2015 | Lim et al. |
| 2015/0350517 A1 | 12/2015 | Duret et al. |
| 2015/0351863 A1 | 12/2015 | Plassky et al. |
| 2015/0363978 A1 | 12/2015 | Maimone et al. |
| 2015/0366620 A1 | 12/2015 | Cameron et al. |
| 2016/0022287 A1 | 1/2016 | Nehls |
| 2016/0030131 A1 | 2/2016 | Yang et al. |
| 2016/0054571 A1 | 2/2016 | Tazbaz et al. |
| 2016/0086380 A1 | 3/2016 | Vayser et al. |
| 2016/0103318 A1 | 4/2016 | Du et al. |
| 2016/0125603 A1 | 5/2016 | Tanji |
| 2016/0133051 A1 | 5/2016 | Aonuma et al. |
| 2016/0143699 A1 | 5/2016 | Tanji |
| 2016/0153004 A1 | 6/2016 | Zhang et al. |
| 2016/0163045 A1 | 6/2016 | Penney et al. |
| 2016/0175064 A1 | 6/2016 | Steinle et al. |
| 2016/0178910 A1 | 6/2016 | Giudicelli et al. |
| 2016/0191887 A1 | 6/2016 | Casas |
| 2016/0223822 A1 | 8/2016 | Harrison et al. |
| 2016/0228033 A1 | 8/2016 | Rossner |
| 2016/0246059 A1 | 8/2016 | Halpin et al. |
| 2016/0249989 A1 | 9/2016 | Devam et al. |
| 2016/0256223 A1 | 9/2016 | Haimerl et al. |
| 2016/0275684 A1 | 9/2016 | Elenbaas et al. |
| 2016/0302870 A1 | 10/2016 | Wilkinson et al. |
| 2016/0324580 A1 | 11/2016 | Esterberg |
| 2016/0324583 A1 | 11/2016 | Kheradpir et al. |
| 2016/0339337 A1 | 11/2016 | Ellsworth et al. |
| 2017/0014119 A1 | 1/2017 | Capote et al. |
| 2017/0024634 A1 | 1/2017 | Miao et al. |
| 2017/0027650 A1 | 2/2017 | Merck et al. |
| 2017/0031163 A1 | 2/2017 | Gao et al. |
| 2017/0031179 A1* | 2/2017 | Guillot ................. G02C 13/005 |
| 2017/0045742 A1 | 2/2017 | Greenhalgh et al. |
| 2017/0068119 A1 | 3/2017 | Antaki et al. |
| 2017/0076501 A1 | 3/2017 | Jagga et al. |
| 2017/0086941 A1 | 3/2017 | Marti et al. |
| 2017/0112586 A1 | 4/2017 | Dhupar |
| 2017/0164919 A1 | 6/2017 | Lavallee et al. |
| 2017/0164920 A1 | 6/2017 | Lavallee et al. |
| 2017/0178375 A1 | 6/2017 | Benishti et al. |
| 2017/0220224 A1 | 8/2017 | Kodali et al. |
| 2017/0239015 A1 | 8/2017 | Sela et al. |
| 2017/0245944 A1 | 8/2017 | Crawford et al. |
| 2017/0251900 A1 | 9/2017 | Hansen et al. |
| 2017/0252109 A1 | 9/2017 | Yang et al. |
| 2017/0258526 A1 | 9/2017 | Lang |
| 2017/0281283 A1 | 10/2017 | Siegler et al. |
| 2017/0312032 A1 | 11/2017 | Amanatullah et al. |
| 2017/0348055 A1 | 12/2017 | Salcedo et al. |
| 2017/0348061 A1 | 12/2017 | Joshi et al. |
| 2017/0366773 A1 | 12/2017 | Kiraly et al. |
| 2017/0367766 A1 | 12/2017 | Mahfouz |
| 2017/0367771 A1 | 12/2017 | Tako et al. |
| 2017/0372477 A1 | 12/2017 | Penney et al. |
| 2018/0003981 A1 | 1/2018 | Urey |
| 2018/0018791 A1 | 1/2018 | Guoyi |
| 2018/0021597 A1 | 1/2018 | Berlinger et al. |
| 2018/0028266 A1 | 2/2018 | Barnes et al. |
| 2018/0036884 A1 | 2/2018 | Chen et al. |
| 2018/0049622 A1 | 2/2018 | Ryan et al. |
| 2018/0055579 A1 | 3/2018 | Daon et al. |
| 2018/0078316 A1 | 3/2018 | Schaewe et al. |
| 2018/0082480 A1 | 3/2018 | White et al. |
| 2018/0092667 A1 | 4/2018 | Heigl et al. |
| 2018/0092698 A1 | 4/2018 | Chopra et al. |
| 2018/0092699 A1 | 4/2018 | Finley |
| 2018/0116732 A1 | 5/2018 | Lin et al. |
| 2018/0117150 A1 | 5/2018 | O'Dwyer et al. |
| 2018/0133871 A1 | 5/2018 | Farmer |
| 2018/0153626 A1 | 6/2018 | Yang et al. |
| 2018/0182150 A1 | 6/2018 | Benishti et al. |
| 2018/0185100 A1 | 7/2018 | Weinstein et al. |
| 2018/0185113 A1 | 7/2018 | Gregerson et al. |
| 2018/0193097 A1 | 7/2018 | McLachlin et al. |
| 2018/0200002 A1 | 7/2018 | Kostrzewski et al. |
| 2018/0247128 A1 | 8/2018 | Alvi et al. |
| 2018/0262743 A1 | 9/2018 | Casas |
| 2018/0303558 A1 | 10/2018 | Thomas |
| 2018/0311011 A1 | 11/2018 | Van et al. |
| 2018/0317803 A1 | 11/2018 | Ben-Yishai et al. |
| 2018/0318035 A1 | 11/2018 | McLachlin et al. |
| 2018/0368898 A1 | 12/2018 | Divincenzo et al. |
| 2019/0000372 A1 | 1/2019 | Gullotti et al. |
| 2019/0000564 A1 | 1/2019 | Navab et al. |
| 2019/0015163 A1 | 1/2019 | Abhari et al. |
| 2019/0018235 A1 | 1/2019 | Ouderkirk et al. |
| 2019/0038362 A1 | 2/2019 | Nash et al. |
| 2019/0038365 A1 | 2/2019 | Soper et al. |
| 2019/0043238 A1 | 2/2019 | Benishti et al. |
| 2019/0046272 A1 | 2/2019 | Zoabi et al. |
| 2019/0046276 A1 | 2/2019 | Inglese et al. |
| 2019/0053851 A1 | 2/2019 | Siemionow et al. |

(56) References Cited

U.S. PATENT DOCUMENTS

| | | |
|---|---|---|
| 2019/0069971 A1 | 3/2019 | Tripathi et al. |
| 2019/0080515 A1 | 3/2019 | Geri et al. |
| 2019/0105116 A1 | 4/2019 | Johnson et al. |
| 2019/0130792 A1 | 5/2019 | Rios et al. |
| 2019/0142519 A1 | 5/2019 | Siemionow et al. |
| 2019/0144443 A1 | 5/2019 | Jackson et al. |
| 2019/0175228 A1 | 6/2019 | Elimelech et al. |
| 2019/0192230 A1 | 6/2019 | Siemionow et al. |
| 2019/0200894 A1 | 7/2019 | Jung et al. |
| 2019/0201106 A1 | 7/2019 | Siemionow et al. |
| 2019/0216537 A1 | 7/2019 | Eltorai et al. |
| 2019/0254753 A1 | 8/2019 | Johnson et al. |
| 2019/0273916 A1 | 9/2019 | Benishti et al. |
| 2019/0310481 A1 | 10/2019 | Blum et al. |
| 2019/0333480 A1 | 10/2019 | Lang |
| 2019/0369717 A1 | 12/2019 | Frielinghaus et al. |
| 2019/0387351 A1 | 12/2019 | Lyren et al. |
| 2020/0015895 A1 | 1/2020 | Frielinghaus et al. |
| 2020/0019364 A1 | 1/2020 | Pond |
| 2020/0020249 A1 | 1/2020 | Jarc et al. |
| 2020/0038112 A1 | 2/2020 | Amanatullah et al. |
| 2020/0043160 A1 | 2/2020 | Mizukura et al. |
| 2020/0078100 A1 | 3/2020 | Weinstein et al. |
| 2020/0085511 A1 | 3/2020 | Oezbek et al. |
| 2020/0088997 A1 | 3/2020 | Lee et al. |
| 2020/0100847 A1 | 4/2020 | Siegler et al. |
| 2020/0117025 A1 | 4/2020 | Sauer |
| 2020/0129058 A1 | 4/2020 | Li et al. |
| 2020/0129136 A1 | 4/2020 | Harding et al. |
| 2020/0129262 A1 | 4/2020 | Verard et al. |
| 2020/0129264 A1 | 4/2020 | Oativia et al. |
| 2020/0133029 A1 | 4/2020 | Yonezawa |
| 2020/0138518 A1 | 5/2020 | Lang |
| 2020/0138618 A1 | 5/2020 | Roszkowiak et al. |
| 2020/0143594 A1 | 5/2020 | Lal et al. |
| 2020/0146546 A1 | 5/2020 | Chene et al. |
| 2020/0151507 A1 | 5/2020 | Siemionow et al. |
| 2020/0156259 A1 | 5/2020 | Ruiz et al. |
| 2020/0159313 A1 | 5/2020 | Gibby et al. |
| 2020/0163723 A1 | 5/2020 | Wolf et al. |
| 2020/0163739 A1 | 5/2020 | Messinger et al. |
| 2020/0178916 A1 | 6/2020 | Lalys et al. |
| 2020/0184638 A1 | 6/2020 | Meglan et al. |
| 2020/0186786 A1 | 6/2020 | Gibby et al. |
| 2020/0188028 A1 | 6/2020 | Feiner et al. |
| 2020/0188034 A1 | 6/2020 | Lequette et al. |
| 2020/0201082 A1 | 6/2020 | Carabin |
| 2020/0229877 A1 | 7/2020 | Siemionow et al. |
| 2020/0237256 A1 | 7/2020 | Farshad et al. |
| 2020/0237459 A1 | 7/2020 | Racheli et al. |
| 2020/0237880 A1 | 7/2020 | Kent et al. |
| 2020/0242280 A1 | 7/2020 | Pavloff et al. |
| 2020/0246074 A1 | 8/2020 | Lang |
| 2020/0246081 A1 | 8/2020 | Johnson et al. |
| 2020/0264451 A1 | 8/2020 | Blum et al. |
| 2020/0265273 A1 | 8/2020 | Wei et al. |
| 2020/0275988 A1 | 9/2020 | Johnson et al. |
| 2020/0281554 A1 | 9/2020 | Trini et al. |
| 2020/0286222 A1 | 9/2020 | Essenreiter et al. |
| 2020/0288075 A1 | 9/2020 | Bonin et al. |
| 2020/0294233 A1 | 9/2020 | Merlet |
| 2020/0297427 A1 | 9/2020 | Cameron et al. |
| 2020/0305980 A1 | 10/2020 | Lang |
| 2020/0315734 A1 | 10/2020 | El Amm |
| 2020/0321099 A1 | 10/2020 | Holladay et al. |
| 2020/0323460 A1 | 10/2020 | Busza et al. |
| 2020/0323609 A1 | 10/2020 | Johnson et al. |
| 2020/0327721 A1 | 10/2020 | Siemionow et al. |
| 2020/0330179 A1 | 10/2020 | Ton |
| 2020/0337780 A1 | 10/2020 | Winkler et al. |
| 2020/0341283 A1 | 10/2020 | McCracken et al. |
| 2020/0352655 A1 | 11/2020 | Freese |
| 2020/0355927 A1 | 11/2020 | Marcellin-Dibon et al. |
| 2020/0360091 A1 | 11/2020 | Murray et al. |
| 2020/0375666 A1 | 12/2020 | Stephen |
| 2020/0377493 A1 | 12/2020 | Heiser et al. |
| 2020/0377956 A1 | 12/2020 | Vogelstein et al. |
| 2020/0388075 A1 | 12/2020 | Kazanzides et al. |
| 2020/0389425 A1 | 12/2020 | Bhatia et al. |
| 2020/0390502 A1 | 12/2020 | Holthuizen et al. |
| 2020/0390503 A1 | 12/2020 | Casas et al. |
| 2020/0402647 A1 | 12/2020 | Domracheva et al. |
| 2020/0409306 A1 | 12/2020 | Gelman et al. |
| 2020/0410687 A1 | 12/2020 | Siemionow et al. |
| 2020/0413031 A1 | 12/2020 | Khani et al. |
| 2021/0004956 A1 | 1/2021 | Book et al. |
| 2021/0009339 A1 | 1/2021 | Morrison et al. |
| 2021/0015560 A1 | 1/2021 | Boddington et al. |
| 2021/0015583 A1 | 1/2021 | Avisar et al. |
| 2021/0022599 A1 | 1/2021 | Freeman et al. |
| 2021/0022808 A1 | 1/2021 | Lang |
| 2021/0022811 A1 | 1/2021 | Mahfouz |
| 2021/0022828 A1 | 1/2021 | Elimelech et al. |
| 2021/0029804 A1 | 1/2021 | Chang |
| 2021/0030374 A1 | 2/2021 | Takahashi et al. |
| 2021/0030511 A1 | 2/2021 | Wolf et al. |
| 2021/0038339 A1 | 2/2021 | Yu et al. |
| 2021/0049825 A1 | 2/2021 | Wheelwright et al. |
| 2021/0052348 A1 | 2/2021 | Stifter et al. |
| 2021/0065911 A1 | 3/2021 | Goel et al. |
| 2021/0077195 A1 | 3/2021 | Saeidi et al. |
| 2021/0077210 A1 | 3/2021 | Itkowitz et al. |
| 2021/0080751 A1 | 3/2021 | Lindsey et al. |
| 2021/0090344 A1 | 3/2021 | Geri et al. |
| 2021/0093391 A1 | 4/2021 | Poltaretskyi et al. |
| 2021/0093392 A1 | 4/2021 | Poltaretskyi et al. |
| 2021/0093400 A1 | 4/2021 | Quaid et al. |
| 2021/0093417 A1 | 4/2021 | Liu |
| 2021/0104055 A1 | 4/2021 | Ni et al. |
| 2021/0107923 A1 | 4/2021 | Jackson et al. |
| 2021/0109349 A1 | 4/2021 | Schneider et al. |
| 2021/0109373 A1 | 4/2021 | Loo et al. |
| 2021/0110517 A1 | 4/2021 | Flohr et al. |
| 2021/0113269 A1 | 4/2021 | Mlsmeier et al. |
| 2021/0113293 A9 | 4/2021 | Silva et al. |
| 2021/0121238 A1 | 4/2021 | Palushi et al. |
| 2021/0137634 A1 | 5/2021 | Lang |
| 2021/0141887 A1 | 5/2021 | Kim et al. |
| 2021/0150702 A1 | 5/2021 | Claessen et al. |
| 2021/0157544 A1 | 5/2021 | Denton |
| 2021/0160472 A1 | 5/2021 | Casas |
| 2021/0161614 A1 | 6/2021 | Elimelech et al. |
| 2021/0162287 A1 | 6/2021 | Xing et al. |
| 2021/0165207 A1 | 6/2021 | Peyman |
| 2021/0169504 A1 | 6/2021 | Brown |
| 2021/0169578 A1 | 6/2021 | Calloway et al. |
| 2021/0169581 A1 | 6/2021 | Calloway et al. |
| 2021/0169605 A1 | 6/2021 | Calloway et al. |
| 2021/0186647 A1 | 6/2021 | Elimelech et al. |
| 2021/0196404 A1 | 7/2021 | Wang |
| 2021/0223577 A1 | 7/2021 | Zhang et al. |
| 2021/0227791 A1 | 7/2021 | De et al. |
| 2021/0235061 A1 | 7/2021 | Hegyi |
| 2021/0248822 A1 | 8/2021 | Choi et al. |
| 2021/0274281 A1 | 9/2021 | Zhang et al. |
| 2021/0278675 A1 | 9/2021 | Klug et al. |
| 2021/0282887 A1 | 9/2021 | Wiggermann |
| 2021/0290046 A1 | 9/2021 | Nazareth et al. |
| 2021/0290336 A1 | 9/2021 | Wang |
| 2021/0290394 A1 | 9/2021 | Mahfouz |
| 2021/0295512 A1 | 9/2021 | Knoplioch et al. |
| 2021/0298835 A1 | 9/2021 | Wang |
| 2021/0306599 A1 | 9/2021 | Pierce |
| 2021/0311322 A1 | 10/2021 | Belanger et al. |
| 2021/0314502 A1 | 10/2021 | Liu |
| 2021/0315636 A1 | 10/2021 | Akbarian et al. |
| 2021/0315662 A1 | 10/2021 | Freeman et al. |
| 2021/0325684 A1 | 10/2021 | Ninan et al. |
| 2021/0332447 A1 | 10/2021 | Lubelski et al. |
| 2021/0333561 A1 | 10/2021 | Oh et al. |
| 2021/0346115 A1 | 11/2021 | Dulin et al. |
| 2021/0349677 A1 | 11/2021 | Baldev et al. |
| 2021/0369226 A1 | 12/2021 | Siemionow et al. |
| 2021/0371413 A1 | 12/2021 | Thurston et al. |

(56) References Cited

U.S. PATENT DOCUMENTS

| | | |
|---|---|---|
| 2021/0373333 A1 | 12/2021 | Moon |
| 2021/0373344 A1 | 12/2021 | Loyola et al. |
| 2021/0378757 A1 | 12/2021 | Bay et al. |
| 2021/0386482 A1 | 12/2021 | Gera et al. |
| 2021/0389590 A1 | 12/2021 | Freeman et al. |
| 2021/0400247 A1 | 12/2021 | Casas |
| 2021/0401533 A1 | 12/2021 | Im |
| 2021/0402255 A1 | 12/2021 | Fung |
| 2021/0405369 A1 | 12/2021 | King |
| 2022/0003992 A1 | 1/2022 | Ahn |
| 2022/0007006 A1 | 1/2022 | Healy et al. |
| 2022/0008135 A1 | 1/2022 | Frielinghaus et al. |
| 2022/0038675 A1 | 2/2022 | Hegyi |
| 2022/0039873 A1 | 2/2022 | Harris |
| 2022/0051484 A1 | 2/2022 | Jones et al. |
| 2022/0054199 A1 | 2/2022 | Sivaprakasam et al. |
| 2022/0061921 A1 | 3/2022 | Crawford et al. |
| 2022/0071712 A1 | 3/2022 | Wolf et al. |
| 2022/0079675 A1 | 3/2022 | Lang |
| 2022/0087746 A1 | 3/2022 | Lang |
| 2022/0113810 A1 | 4/2022 | Isaacs et al. |
| 2022/0117669 A1 | 4/2022 | Nikou et al. |
| 2022/0121041 A1 | 4/2022 | Hakim |
| 2022/0133484 A1 | 5/2022 | Lang |
| 2022/0142730 A1 | 5/2022 | Wolf et al. |
| 2022/0155861 A1 | 5/2022 | Myung et al. |
| 2022/0159227 A1 | 5/2022 | Quiles Casas |
| 2022/0179209 A1 | 6/2022 | Cherukuri |
| 2022/0192776 A1 | 6/2022 | Gibby et al. |
| 2022/0193453 A1 | 6/2022 | Miyazaki et al. |
| 2022/0201274 A1 | 6/2022 | Achilefu et al. |
| 2022/0245400 A1 | 8/2022 | Siemionow et al. |
| 2022/0245821 A1 | 8/2022 | Ouzounis |
| 2022/0270263 A1 | 8/2022 | Junio |
| 2022/0287676 A1 | 9/2022 | Steines et al. |
| 2022/0292786 A1 | 9/2022 | Pelzl et al. |
| 2022/0295033 A1 | 9/2022 | Quiles Casas |
| 2022/0304768 A1 | 9/2022 | Elimelech et al. |
| 2022/0351385 A1 | 11/2022 | Finley et al. |
| 2022/0358759 A1 | 11/2022 | Cork et al. |
| 2022/0392085 A1 | 12/2022 | Finley et al. |
| 2022/0405935 A1 | 12/2022 | Flossmann et al. |
| 2023/0009793 A1 | 1/2023 | Gera et al. |
| 2023/0027801 A1 | 1/2023 | Qian et al. |
| 2023/0034189 A1 | 2/2023 | Gera et al. |
| 2023/0073041 A1 | 3/2023 | Samadani et al. |
| 2023/0149083 A1 | 5/2023 | Lin et al. |
| 2023/0290037 A1 | 9/2023 | Tasse et al. |
| 2023/0295302 A1 | 9/2023 | Bhagavatheeswaran et al. |
| 2023/0316550 A1 | 10/2023 | Hiasa |
| 2023/0329799 A1 | 10/2023 | Gera et al. |
| 2023/0329801 A1 | 10/2023 | Elimelech et al. |
| 2023/0371984 A1 | 11/2023 | Leuthardt et al. |
| 2023/0372053 A1 | 11/2023 | Elimelech et al. |
| 2023/0372054 A1 | 11/2023 | Elimelech et al. |
| 2023/0377175 A1 | 11/2023 | Seok |
| 2023/0379448 A1 | 11/2023 | Benishti et al. |
| 2023/0386153 A1 | 11/2023 | Rybnikov et al. |
| 2023/0397349 A1 | 12/2023 | Capelli et al. |
| 2023/0397957 A1 | 12/2023 | Crawford et al. |
| 2023/0410445 A1 | 12/2023 | Elimelech et al. |
| 2024/0008935 A1 | 1/2024 | Wolf et al. |
| 2024/0016549 A1 | 1/2024 | Johnson et al. |
| 2024/0016572 A1 | 1/2024 | Elimelech et al. |
| 2024/0020831 A1 | 1/2024 | Johnson et al. |
| 2024/0020840 A1 | 1/2024 | Johnson et al. |
| 2024/0020862 A1 | 1/2024 | Johnson et al. |
| 2024/0022704 A1 | 1/2024 | Benishti et al. |
| 2024/0023946 A1 | 1/2024 | Wolf et al. |
| 2024/0041558 A1 | 2/2024 | Siewerdsen et al. |

FOREIGN PATENT DOCUMENTS

| | | |
|---|---|---|
| CN | 101379412 A | 3/2009 |
| CN | 103106348 A | 5/2013 |
| CN | 111915696 A | 11/2020 |
| CN | 112489047 A | 3/2021 |
| DE | 202004011567 U1 | 11/2004 |
| DE | 102004011567 A1 | 9/2005 |
| DE | 102014008153 A1 | 10/2014 |
| DE | 202022103168 U1 | 6/2022 |
| EP | 0933096 A2 | 8/1999 |
| EP | 1640750 A1 | 3/2006 |
| EP | 1757974 A1 | 2/2007 |
| EP | 2119397 A1 | 11/2009 |
| EP | 2134847 A2 | 12/2009 |
| EP | 2557998 A1 | 2/2013 |
| EP | 2823463 A1 | 1/2015 |
| EP | 2868277 A1 | 5/2015 |
| EP | 2891966 A1 | 7/2015 |
| EP | 2963616 A2 | 1/2016 |
| EP | 3028258 A1 | 6/2016 |
| EP | 3034607 A1 | 6/2016 |
| EP | 3037038 A1 | 6/2016 |
| EP | 3069318 A1 | 9/2016 |
| EP | 3076660 A1 | 10/2016 |
| EP | 3121789 A1 | 1/2017 |
| EP | 3123970 A1 | 2/2017 |
| EP | 2654749 B1 | 5/2017 |
| EP | 3175815 A1 | 6/2017 |
| EP | 3216416 A1 | 9/2017 |
| EP | 2032039 B1 | 10/2017 |
| EP | 3224376 A1 | 10/2017 |
| EP | 3247297 A1 | 11/2017 |
| EP | 3256213 A1 | 12/2017 |
| EP | 3306567 A1 | 4/2018 |
| EP | 2030193 B1 | 7/2018 |
| EP | 2225723 B1 | 2/2019 |
| EP | 2892558 B1 | 4/2019 |
| EP | 2635299 B1 | 7/2019 |
| EP | 3505050 A1 | 7/2019 |
| EP | 2875149 B1 | 12/2019 |
| EP | 3593227 A1 | 1/2020 |
| EP | 3634294 A1 | 4/2020 |
| EP | 3206583 B1 | 9/2020 |
| EP | 3711700 A1 | 9/2020 |
| EP | 2625845 B1 | 3/2021 |
| EP | 3789965 A1 | 3/2021 |
| EP | 3858280 A1 | 8/2021 |
| EP | 3913423 A1 | 11/2021 |
| EP | 3952331 A1 | 2/2022 |
| EP | 3960235 A1 | 3/2022 |
| EP | 4173590 A1 | 5/2023 |
| EP | 4252695 A1 | 10/2023 |
| EP | 4270313 A1 | 11/2023 |
| EP | 4287120 A1 | 12/2023 |
| GB | 2507314 A | 4/2014 |
| KR | 10-2014-0120155 A | 10/2014 |
| WO | 03/34705 A2 | 4/2003 |
| WO | 2006/002559 A1 | 1/2006 |
| WO | 2007/051304 A1 | 5/2007 |
| WO | 2007/115826 A2 | 10/2007 |
| WO | 2008/103383 A1 | 8/2008 |
| WO | 2010/067267 A1 | 6/2010 |
| WO | 2010/074747 A1 | 7/2010 |
| WO | 2012/061537 A2 | 5/2012 |
| WO | 2012/101286 A1 | 8/2012 |
| WO | 2013/112554 A1 | 8/2013 |
| WO | 2014/014498 A1 | 1/2014 |
| WO | 2014/024188 A1 | 2/2014 |
| WO | 2014/037953 A2 | 3/2014 |
| WO | 2014/113455 A1 | 7/2014 |
| WO | 2014/125789 A1 | 8/2014 |
| WO | 2014/167563 A1 | 10/2014 |
| WO | 2014/174067 A1 | 10/2014 |
| WO | 2015/058816 A1 | 4/2015 |
| WO | 2015/061752 A1 | 4/2015 |
| WO | 2015/109145 A1 | 7/2015 |
| WO | 2016/151506 A1 | 9/2016 |
| WO | 2018/052966 A1 | 3/2018 |
| WO | 2018/073452 A1 | 4/2018 |
| WO | 2018/200767 A1 | 11/2018 |
| WO | 2018/206086 A1 | 11/2018 |
| WO | 2019/083431 A1 | 5/2019 |

(56) References Cited

FOREIGN PATENT DOCUMENTS

| | | |
|---|---|---|
| WO | 2019/135209 A1 | 7/2019 |
| WO | 2019/161477 A1 | 8/2019 |
| WO | 2019/195926 A1 | 10/2019 |
| WO | 2019/210353 A1 | 11/2019 |
| WO | 2019/211741 A1 | 11/2019 |
| WO | 2020/109903 A1 | 6/2020 |
| WO | 2020/109904 A1 | 6/2020 |
| WO | 2021/017019 A1 | 2/2021 |
| WO | 2021/019369 A1 | 2/2021 |
| WO | 2021/021979 A2 | 2/2021 |
| WO | 2021/023574 A1 | 2/2021 |
| WO | 2021/046455 A1 | 3/2021 |
| WO | 2021/048158 A1 | 3/2021 |
| WO | 2021/061459 A1 | 4/2021 |
| WO | 2021/062375 A1 | 4/2021 |
| WO | 2021/073743 A1 | 4/2021 |
| WO | 2021/087439 A1 | 5/2021 |
| WO | 2021/091980 A1 | 5/2021 |
| WO | 2021/112918 A1 | 6/2021 |
| WO | 2021/130564 A1 | 7/2021 |
| WO | 2021/137752 A1 | 7/2021 |
| WO | 2021/141887 A1 | 7/2021 |
| WO | 2021/145584 A1 | 7/2021 |
| WO | 2021/154076 A1 | 8/2021 |
| WO | 2021/183318 A2 | 9/2021 |
| WO | 2021/188757 A1 | 9/2021 |
| WO | 2021/255627 A1 | 12/2021 |
| WO | 2021/257897 A1 | 12/2021 |
| WO | 2021/258078 A1 | 12/2021 |
| WO | 2022/009233 A1 | 1/2022 |
| WO | 2022/053923 A1 | 3/2022 |
| WO | 2022/079565 A1 | 4/2022 |
| WO | 2023/281395 A1 | 1/2023 |
| WO | 2023/007418 A1 | 2/2023 |
| WO | 2023/011924 A1 | 2/2023 |
| WO | 2023/021448 A1 | 2/2023 |
| WO | 2023/021450 A1 | 2/2023 |
| WO | 2023/021451 A1 | 2/2023 |
| WO | 2023/026229 A1 | 3/2023 |
| WO | 2023/047355 A1 | 3/2023 |
| WO | 2023/072887 A1 | 5/2023 |
| WO | 2023/088986 A1 | 5/2023 |
| WO | 2023/163933 A1 | 8/2023 |
| WO | 2023/186996 A1 | 10/2023 |
| WO | 2023/205212 A1 | 10/2023 |
| WO | 2023/209014 A1 | 11/2023 |
| WO | 2023/232492 A1 | 12/2023 |
| WO | 2023/240912 A1 | 12/2023 |
| WO | 2024/013642 A2 | 1/2024 |
| WO | 2024/018368 A2 | 1/2024 |

OTHER PUBLICATIONS

U.S. Appl. No. 18/352,158, filed Jul. 13, 2023, Comibining Video-Based and Optic-Based Augmented Reality in a Near Eye Display.
U.S. Appl. No. 17/827,710, filed May 29, 2022, Mirroring in Image Guided Surgery.
U.S. Appl. No. 16/200,144, filed Nov. 26, 2018, Tracking System for Image-Guided Surgery.
U.S. Appl. No. 17/368,859, filed Jul. 7, 2021, Iliac Pin and Adapter.
U.S. Appl. No. 35/508,942 (U.S. Pat. No. D. 930,162), filed Feb. 13, 2020 (Sep. 7, 2021), Medical Headset.
International Search Report and Written Opinion received for PCT Patent Application No. PCT/IB2016/051642, mailed on Jul. 10, 2016, 6 pages.
IPEA/409—International Preliminary Report on Patentability Mailed on Oct. 5, 2017 for WO Application No. PCT/IB16/051642, 5 page(s).
16 Augmented Reality Glasses of 2021 (with Features), in Back to News, Dated May 6, 2022, accessed at https://web.archive.org/web/20221127195438/https://circuitstream.com/blog/16-augmented-reality-glasses-of-2021-with-features-breakdowns/.
Vuzix Blades, Prescription Lens Installation Guide, copyright 2020.
Frames Direct, InSpatialRx Prescription Insert, Prescription Insert for Magic Leap 1, accessed Mar. 8, 2024 at https://www.framesdirect.com/inspatialrx-prescription-insert.html.
Everysight, Installing your RX Adaptor, accessed Mar. 13, 2024 at https://support.everysight.com/hc/en-us/articles/115000984571-Installing-your-RX-Adaptor.
Reddit, Notice on Prescription Lenses for Nreal Glasses, accessed Mar. 13, 2024 at https://www.reddit.com/r/nreal/comments/x1fte5/notice_on_prescription_lenses_for_nreal_glasses/.
Everysight, Raptor User Manual, copyright 2017, in 46 pages.
U.S. Appl. No. 15/896,102, U.S. Pat. No. 10,134,166 filed Feb. 14, 2018, Nov. 20, 2018, Combining Video-Based And Optic-Based Augmented Reality In A Near Eye Display.
U.S. Appl. No. 16/159,740, U.S. Pat. No. 10,382,748, filed Oct. 15, 2018, Aug. 13, 2019, Combining Video-Based and Optic-Based Augmented Reality in a Near Eye Display.
U.S. Appl. No. 16/419,023, U.S. Pat. No. 11,750,794, filed May 22, 2019, Sep. 5, 2023, Combining Video-Based and Optic-Based Augmented Reality in a Near Eye Display.
U.S. Appl. No. 18/352,158, filed Jul. 13, 2023, Combining Video-Based and Optic-Based Augmented Reality in a Near Eye Display.
U.S. Appl. No. 18/365,643, filed Aug. 4, 2023, Head-Mounted Augmented Reality Near Eye Display Device.
U.S. Appl. No. 18/365,650, filed Aug. 4, 2023, Systems For Facilitating Augmented Reality-Assisted Medical Procedures.
U.S. Appl. No. 15/127,423, U.S. Pat. No. 9,928,629, filed Sep. 20, 2016, Mar. 27, 2018, Combining Video-Based and Optic-Based Augmented Reality in a Near Eye Display.
U.S. Appl. No. 16/120,480, U.S. Pat. No. 10,835,296, filed Sep. 4, 2018, Nov. 17, 2020. Spinous Process Clamp.
U.S. Appl. No. 17/067,831, filed Oct. 12, 2020, Spinous Process Clamp.
U.S. Appl. No. 18/030,072, filed Apr. 4, 2023, Spinous Process Clamp.
U.S. Appl. No. 18/365,590, filed Aug. 4, 2023, Registration of a Fiducial Marker for an Augmented Reality System
U.S. Appl. No. 18/365,571, filed Aug. 4, 2023, Registration Marker for an Augmented Reality System.
U.S. Appl. No. 18/632,588, filed Apr. 11, 2024, Registration of a Fiducial Marker for an Augmented Reality System.
U.S. Appl. No. 17/045,766, filed Oct. 7, 2020, Registration of a Fiducial Marker for an Augmented Reality System.
U.S. Appl. No. 16/199,281, U.S. Pat. No. 10,939,977, filed Nov. 26, 2018, Mar. 9, 2021, Positioning Marker.
U.S. Appl. No. 16/524,258, filed Jul. 29, 2019, Fiducial Marker.
U.S. Appl. No. 17/585,629, filed Jan. 27, 2022, Fiducial Marker.
U.S. Appl. No. 18/631,804, filed Apr. 10, 2024, Fiducial Marker.
U.S. Appl. No. 16/724,297, U.S. Pat. No. 11,382,712, filed Dec. 22, 2019, Jul. 12, 2022, Mirroring in Image Guided Surgery.
U.S. Appl. No. 17/827,710, U.S. Pat. No. 11,801,115, filed May 29, 2022, Oct. 31, 2023, Mirroring in Image Guided Surgery.
U.S. Appl. No. 18/352,181, filed Jul. 13, 2023, Mirroring in Image Guided Surgery.
U.S. Appl. No. 18/400,739, filed Dec. 29, 2023, Mirroring in Image Guided Surgery.
U.S. Appl. No. 16/200,144, U.S. Pat. No. 11,766,296, filed Nov. 26, 2018, Sep. 26, 2023, Tracking System for Image-Guided Surgery.
U.S. Appl. No. 18/470,809, filed Sep. 20, 2023, Tracking Methods for Image-Guided Surgery.
U.S. Appl. No. 18/631,877, filed Apr. 10, 2024, Tracking Systems and Methods for Image-Guided Surgery.
U.S. Appl. No. 17/015,199, filed Sep. 9, 2020, Universal Tool Adapter.
U.S. Appl. No. 18/598,965, filed Mar. 7, 2024, Universal Tool Adapter for Image-Guided Surgery.
U.S. Appl. No. 18/044,380, filed Mar. 8, 2023, Universal Tool Adapter for Image-Guided Surgery.
U.S. Appl. No. 16/901,026, U.S. Pat. No. 11,389,252, filed Jun. 15, 2020, Jul. 19, 2022, Rotating Marker for Image Guided Surgery.
U.S. Appl. No. 18/008,980, filed Dec. 8, 2022, Rotating Marker.
U.S. Appl. No. 17/368,859, U.S. Pat. No. 11,896,445, filed Jul. 7, 2021, Feb. 13, 2024, Iliac Pin and Adapter.

(56) References Cited

OTHER PUBLICATIONS

U.S. Appl. No. 18/437,898, filed Feb. 9, 2024, Iliac Pin and Adapter.
U.S. Appl. No. 18/576,516, filed Jan. 4, 2024, Iliac Pin and Adapter.
U.S. Appl. No. 17/388,064, filed Jul. 29, 2021, Rotating Marker and Adapter for Image-Guided Surgery.
U.S. Appl. No. 18/291,731, filed Jan. 24, 2024, Rotating Marker and Adapter for Image-Guided Surgery.
U.S. Appl. No. 18/365,844, filed Aug. 4, 2023, Augmented-Reality Surgical System Using Depth Sensing.
U.S. Appl. No. 18/683,676, filed Feb. 14, 2024, Stereoscopic Display and Digital Loupe for Augmented-Reality Near-Eye Display.
U.S. App. No. 18/683,680, filed Feb. 14, 2024, Augmented Reality Assistance for Osteotomy and Discectomy.
U.S. Appl. No. 18/684,756, filed Feb. 19, 2024, Registration and Registration Validation in Image-Guided Surgery.
U.S. Appl. No. 18/693,338, filed Mar, 19, 2024, Surgical Planning and Display.
U.S. Appl. No. 18/365,566, filed Aug. 4, 2023, Systems for Medical Image Visualization.
U.S. Appl. No. 18/399,253, filed Dec. 28, 2023, Methods for Medical Image Visualization.
U.S. Appl. No. 18/398,837, filed Dec. 28, 2023, Adjustable Augmented Reality Eyewear for Image-Guided Medical Intervention.
U.S. Appl. No. 18/399,433, filed Dec. 28, 2023, Configurable Augmented Reality Eyewear for Image-Guided Medical Intervention.
U.S. Appl. No. 35/508,942, D. 930162, filed Feb. 13, 2020, Sep. 7, 2021, Medical Headset.

\* cited by examiner

SYSTEMS FOR FACILITATING AUGMENTED REALITY-ASSISTED MEDICAL PROCEDURES

CROSS-REFERENCE TO RELATED APPLICATIONS

This application is a continuation of U.S. patent application Ser. No. 16/419,023, filed May 22, 2019, which is a continuation of U.S. patent application Ser. No. 16/159,740, filed Oct. 15, 2018 (now U.S. Pat. No. 10,382,748), which is a continuation of U.S. patent application Ser. No. 15/896, 102, filed Feb. 14, 2018 (now U.S. Pat. No. 10,134,166), which is a continuation of U.S. patent application Ser. No. 15/127,423, filed Sep. 20, 2016 (now U.S. Pat. No. 9,928, 629), which is a national stage entry of PCT Patent Application PCT/IB2016/051642, filed Mar. 23, 2016, which claims the benefit of U.K. Patent Application GB1504935.6, filed Mar. 24, 2015, each of which is incorporated herein by reference in its entirety.

FIELD OF THE INVENTION

The present invention relates generally to a near eye display system, and specifically to a display able to combine video-based and optic-based augmented reality.

BACKGROUND OF THE INVENTION

A near eye display system may be used in an augmented reality situation, where a scene that is being viewed by a user of the assembly is altered, typically by being augmented or supplemented. The alteration is computer processor generated, and typically involves presenting real time video, and/or non-real time images, to the user while the user is gazing at the scene.

U. S. Patent Application 2010/0149073, to Chaum et al., whose disclosure is incorporated herein by reference, describes a near eye display system. The system includes a source of modulated light, and a "proximal optic" positionable adjacent to an eye of a system user to receive the modulated light. The proximal optic has a plurality of groups of optically redirecting regions.

U. S. Patent Application 2012/0068913, to Bar-Zeev et al., whose disclosure is incorporated herein by reference, describes an optical see-through head-mounted display device. The device includes a see-through lens which combines an augmented reality image with light from a real-world scene, while an opacity filter is used to selectively block portions of the real-world scene so that the augmented reality image appears more distinctly.

U. S. Patent Application 2013/0050258, to Liu et al., whose disclosure is incorporated herein by reference, describes a see-through head-mounted display device that provides an augmented reality image which is associated with a real-world object. Initially, the object is identified by a user, e.g., based on the user gazing at the object for a period of time, making a gesture such as pointing at the object and/or providing a verbal command.

Documents incorporated by reference in the present patent application are to be considered an integral part of the application except that, to the extent that any terms are defined in these incorporated documents in a manner that conflicts with definitions made explicitly or implicitly in the present specification, only the definitions in the present specification should be considered.

SUMMARY OF THE INVENTION

An embodiment of the present invention provides apparatus, including:

a retaining structure, configured to be positioned in proximity to an eye of a subject, the eye of the subject having a pupil with a pupil diameter;

an optical combiner mounted on the structure in front of the eye;

a pixelated screen, having an array of variably transparent pixels, coating the optical combiner;

at least one image capturing device mounted on the structure configured to capture an image of a scene viewed by the eye;

a projector mounted on the structure and configured to project at least one of a portion of the captured image and a stored image onto a section of the screen at a selected location thereof; and a processor, configured to render the section of the screen at least partially opaque, to select the location of the section in response to a region of interest in the scene identified by analysis of the captured image, and to determine a dimension of the section in response to the pupil diameter.

The processor may be configured to identify the region of interest in response to radiation received by the image capturing device from at least one marker located at the region of interest.

The apparatus may include a further image capturing device configured to identify the region of interest in response to received radiation from at least one marker located at the region of interest. The at least one image capturing device may be configured to operate in the visible spectrum, and the further image capturing device may be configured to operate in the non-visible spectrum. The apparatus may include a radiator configured to radiate radiation in the non-visible spectrum towards the region of interest.

In a disclosed embodiment the apparatus includes at least one marker positioned in proximity to the region of interest, and wherein the processor is configured to detect the marker in the captured image so as to identify the region of interest.

In a further disclosed embodiment the processor is configured to determine an initial pupil diameter in response to the dimension of the section being set by the subject to occlude an object of known size while the subject gazes at the object in a known ambient light brightness. Typically, the processor is configured to determine a brightness of the scene in response to the captured image of the scene, and the processor is configured to determine the pupil diameter in response to the initial pupil diameter and the brightness of the scene.

In a yet further disclosed embodiment the processor is configured to determine an initial pupil diameter in response to analysis of a reflected image of the subject while the subject gazes into a mirror in a known ambient light brightness. Typically, the processor is configured to determine a brightness of the scene in response to the captured image of the scene, and the processor is configured to determine the pupil diameter in response to the initial pupil diameter and the brightness of the scene.

In an alternative embodiment the dimension of the section is determined so that the region of interest is occluded. Typically, a region surrounding the region of interest is partially occluded. A fraction of occlusion in the region surrounding the region of interest may be determined in response to the pupil diameter. The processor may be configured to derive from the captured image an image corresponding to the region surrounding the region of interest, and the projector may be configured to project the derived image onto an area of the screen surrounding the at least partially opaque section of the screen. An intensity of the projected derived image may be determined in response to the fraction of occlusion.

In a further alternative embodiment the dimension of the section is determined in response to a size of the region of interest.

The dimension of the section may be determined so that an area greater than the region of interest is occluded. Alternatively, the dimension of the section may be determined so that an area less than the region of interest is occluded.

In a yet further alternative embodiment the retaining structure is a spectacle frame. Alternatively, the retaining structure is a helmet having a head-up display.

Typically, the at least one image capturing device includes two image capturing devices capturing respective images of the scene, and the processor is configured to identify the region of interest by analysis of the respective images.

There is further provided, according to an embodiment of the present invention, a method, including:
  positioning a retaining structure in proximity to an eye of a subject, the eye of the subject having a pupil with a pupil diameter;
  mounting an optical combiner on the structure in front of the eye;
  coating the optical combiner with a pixelated screen, having an array of variably transparent pixels;
  mounting at least one image capturing device on the structure so as to capture an image of a scene viewed by the eye;
  mounting a projector on the structure the projector being configured to project at least one of a portion of the captured image and a stored image onto a section of the screen at a selected location thereof;
  rendering the section of the screen at least partially opaque;
  selecting the location of the section in response to a region of interest in the scene identified by analysis of the captured image; and
  determining a dimension of the section in response to the pupil diameter.

There is further provided, according to an embodiment of the present invention, apparatus, including:
  a retaining structure, configured to be positioned in proximity to an eye of a subject;
  an optical combiner mounted on the structure in front of the eye;
  a pixelated screen, having an array of variably transparent pixels, coating the optical combiner;
  at least one image capturing device mounted on the structure configured to capture an image of a scene viewed by the eye;
  a processor, configured to render a section of the screen at least partially opaque, and
  a projector mounted on the structure and configured to project at least one of a portion of the captured image and a stored image onto the section of the screen so that there is misalignment between the scene viewed by the eye through the combiner and the at least one portion of the captured image and the stored image.

Typically, for a scene at 50 cm from the eye, the misalignment is no more than 2 cm.

The projector may be configured to project the portion of the captured image and the stored image, in registration with each other, onto the section of the screen.

There is further provided, according to an embodiment of the present invention, apparatus, including:
  a retaining structure, configured to be positioned in proximity to an eye of a subject;
  an optical combiner mounted on the structure in front of the eye;
  a rotator connected to the optical combiner and configured to rotate the optical combiner about an axis;
  a pixelated screen, having an array of variably transparent pixels, coating the optical combiner;
  at least one image capturing device mounted on the structure configured to capture an image of a scene viewed by the eye; and
  a processor, configured to render a section of the screen at least partially opaque, and to activate the rotator so that the optical combiner is oriented to be orthogonal to a region of interest in the scene.

The processor is typically configured to select the section of the screen so as to occlude the region of interest.

The axis may be a vertical axis.

There is further provided, according to an embodiment of the present invention, a method, including:
  positioning a retaining structure in proximity to an eye of a subject;
  mounting an optical combiner on the structure in front of the eye;
  coating the optical combiner with a pixelated screen comprising an array of variably transparent pixels;
  mounting at least one image capturing device on the structure, the device being configured to capture an image of a scene viewed by the eye;
  rendering a section of the screen at least partially opaque;
  mounting a projector on the structure; and
  configuring the projector to project at least one of a portion of the captured image and a stored image onto the section of the screen so that there is misalignment between the scene viewed by the eye through the combiner and the at least one portion of the captured image and the stored image.

There is further provided, according to an embodiment of the present invention, a method, including:
  positioning a retaining structure in proximity to an eye of a subject;
  mounting an optical combiner on the structure in front of the eye;
  connecting a rotator to the optical combiner, the rotator being configured to rotate the optical combiner about an axis;
  coating the optical combiner with a pixelated screen having an array of variably transparent pixels;
  mounting at least one image capturing device on the structure, the device being configured to capture an image of a scene viewed by the eye;
  rendering a section of the screen at least partially opaque; and
  activating the rotator so that the optical combiner is oriented to be orthogonal to a region of interest in the scene.

The present disclosure will be more fully understood from the following detailed description of the embodiments thereof, taken together with the drawings, in which:

DETAILED DESCRIPTION OF EMBODIMENTS

Overview

Figure 1:
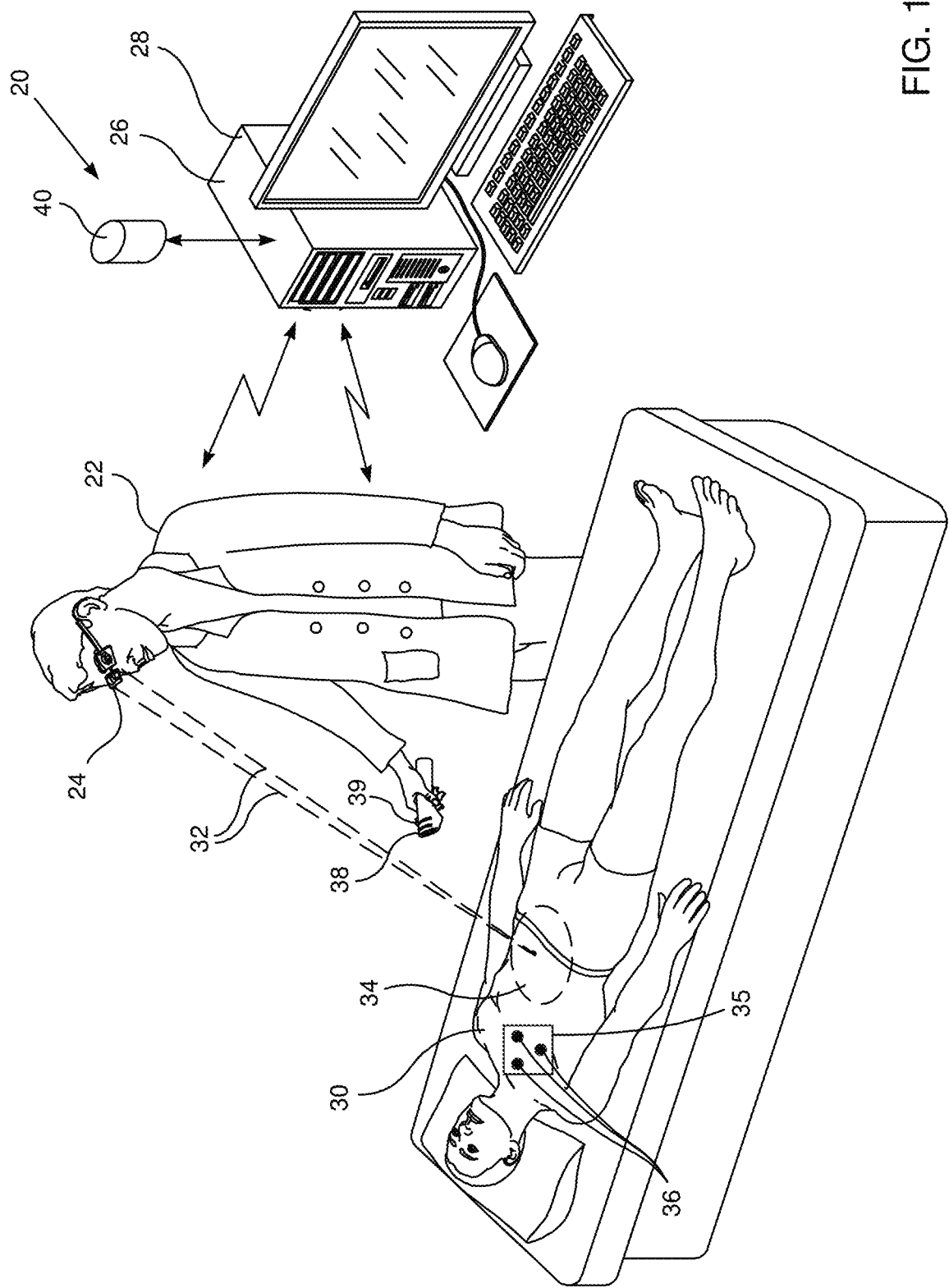
FIG. 1 schematically illustrates use of an augmented reality system, according to an embodiment of the present invention.

An embodiment of the present invention provides a near eye assembly having a retaining structure that is configured to be positioned in proximity to the eye of a user of the assembly. Typically, the retaining structure comprises a spectacle frame. Alternatively, the retaining structure comprises a head up-display which may be mounted on a helmet worn by the assembly user.

An optical combiner is mounted on the structure in front of the user eye. Typically, two combiners are mounted, one in front of each eye. The optical combiner at least partially transmits elements of a scene in front of the assembly through the combiner. In addition, the optical combiner may receive a visible radiation transmission derived from a scene, and/or a visual transmission such as a presentation of data or a marker, and redirects the transmission back to the user's eye.

A pixelated screen, comprising an array of variably transparent pixels, coats the optical combiner. Typically, the pixels are liquid crystal display (LCD) pixels.

There is at least one image capturing device, typically two such devices, one for each eye, mounted on the structure. The capturing device is typically a visible spectrum camera that is configured to capture an image of a scene viewed by the user's eye.

A projector, typically a micro-projector, is mounted on the structure. Typically two projectors, one for each eye, are mounted on the structure. The projector is configured to project at least one of a portion of the captured image as a video, as well as a stored image, onto a section of the screen that a processor renders at least partially opaque. The at least partially opaque section is also referred to herein as an occlusion mask, or just as a mask.

The processor is configured to select the location of the section in response to a region of interest in the scene identified by analysis of the captured image. Typically, at least one marker is positioned near the region of interest, and the processor analyzes the captured image to locate the marker and so identify the region of interest. Rendering the section opaque occludes the region of interest from the user's eye.

In addition, the processor determines a dimension of the section, typically, in the case of the section being circular, the diameter of the section. The dimension is determined in response to the pupil diameter.

By setting the dimension of the section according to the pupil diameter, embodiments of the present invention more exactly control the area of the region of interest that is occluded. In addition, because of the finite size of the pupil, there is a region surrounding region of interest that is partially occluded. In some embodiments the processor operates the micro-projector to overlay relevant portions of the captured image on the partially occluded region, so as to compensate for the partial occlusion.

As stated above, a portion of the captured image may be projected as a video onto the occlusion mask. In some embodiments the captured image portion video corresponds to the occluded region of interest. There is a non-occluded region surrounding the occluded region of interest, and this non-occluded region is visible to the user through the combiner. In embodiments of the invention the video and the visible non-occluded region are typically not in accurate registration, due to slight inevitable movements of the display relative to the user's eye.

In some embodiments a stored image, such as an image of a tool, is overlaid on, and in accurate registration with, the occluded region video.

The inventors have found that registering the stored image with the video, even though the video is not fully registered with the surrounding visible region, provides an acceptable image for the user. The inventors have found that for a non-occluded region that appears to be 50 cm from the user's eye, the video and the non-occluded region may be out of registration by up to 2 cm, while still being acceptable to the user.

Thus, in contrast to prior art augmented reality systems, embodiments of the present invention are configured to operate with mis-alignment between the visible portion of a scene and an augmented reality portion of the scene. However, there is no mis-alignment between elements within the augmented reality video, i.e., the elements projected onto the occlusion mask.

In some embodiments, the optical combiner may be rotated about an axis by the processor. In the case of two combiners, they may be independently rotated about respective axes. The independent rotations may be used to orient both combiners so that each is orthogonal to the direction of gaze of the user's eyes.

System Description

Reference is now made to FIG. 1, which schematically illustrates use of an augmented reality system 20, according to an embodiment of the present invention. By way of example and for simplicity, in the following description system 20 is assumed to be used in a medical procedure during part of which the user of the system is being mentored. However, it will be understood that embodiments of the present invention may be used in non-medical and/or non-mentoring situations, such as in operating a video game, in simulating a real-world event, or in providing an aid to navigation.

System 20 is operated by a medical professional 22, who wears an augmented reality assembly 24, described in more detail below with respect to FIGS. 2A-2D. While assembly 24 may be incorporated for wearing into a number of different retaining structures on professional 22, in the present description the retaining structure is assumed to be similar to a pair of spectacles. Those having ordinary skill in the augmented reality art will be aware of other possible structures, such as incorporation of the augmented reality assembly into a head-up display that is integrated into a helmet worn by the user of system 20, and all such structures are assumed to be comprised within the scope of the present invention.

System 20 comprises and is under overall control of a processor 26. In one embodiment processor 26 is assumed to be incorporated within a stand-alone computer 28, and the processor typically communicates with other elements of the system, including assembly 24, wirelessly, as is illustrated in FIG. 1. Alternatively or additionally, processor 26 may use optical and/or conducting cables for communication. In further alternative embodiments processor 26 is integrated within assembly 24, or in the mounting of the assembly. Processor 26 is typically able to access a database 40, wherein are stored images and other visual elements used by system 20. Software enabling processor 26 to operate system 20 may be downloaded to the processor in electronic form, over a network, for example. Alternatively or additionally, the software may be provided on non-transitory tangible media, such as optical, magnetic, or electronic storage media.

The medical procedure exemplified here is on a patient 30, and during the procedure professional 22 gazes along gaze directions 32 at a region of interest (ROI) 34. ROI 34 typically, but not necessarily, comprises a portion of the patient. In some embodiments one or more ROI acquisition markers 35, comprising marker elements 36, are positioned in, and/or in proximity to, ROI 34, and the functions of such markers are described below. Typically there are at least three marker elements 36 for a given marker 35. In a disclosed embodiment the size of ROI 34 may be predefined by professional 22, for example based on a computerized tomography (CT) image of the patient, and the position of the ROI may also be a predefined distance to the right and a predefined distance below the marker. In an alternative embodiment marker elements 36 of marker define ROI 34 to be a region within a surface having elements 36 in the perimeter of the surface. Typically, a margin in an approximate range of 1-5 cm is added to ROI 34 to compensate for mis-alignment between a video projection and a directly viewed scene, described in more detail below.

During the procedure professional 22 may use a surgical device 38, such as a surgical knife, to perform part of the procedure. Typically device 38 comprises one or more identifying elements 39 which may be used to track the device.

Figure 2A:
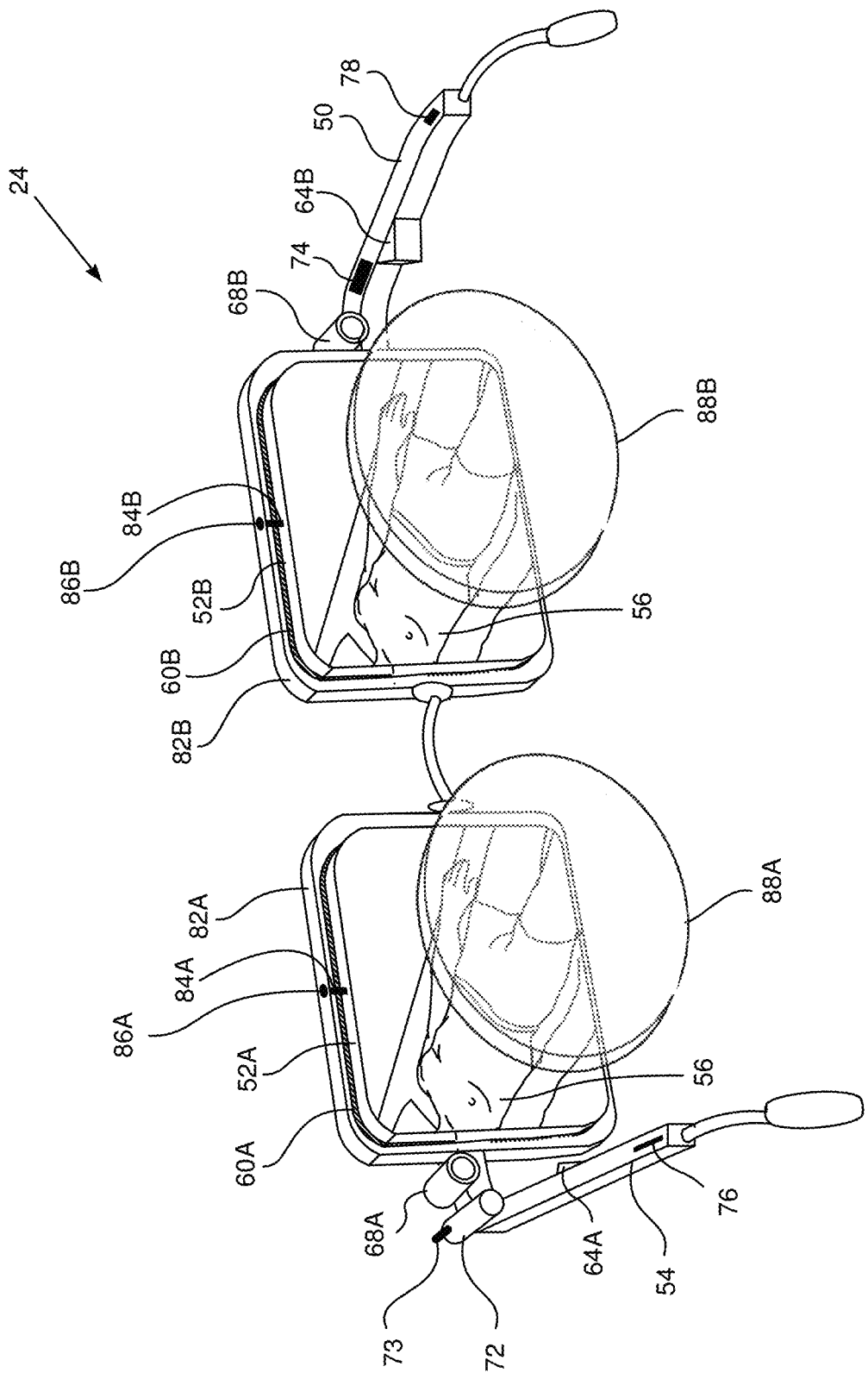
FIGS. 2A-2E are schematic diagrams illustrating an augmented reality assembly, as well as functions that may be implemented in the assembly, according to an embodiment of the present invention.

FIGS. 2A-2E are schematic diagrams illustrating assembly 24, as well as functions that may be implemented in the assembly, according to an embodiment of the present invention. FIG. 2A illustrates assembly 24 with none of the active elements of the assembly, i.e., those elements requiring power, operating. As stated above, assembly 24 is configured, by way of example, as a pair of spectacles 50. Similar elements of each "half" of the pair of spectacles are referred to generically by an identifying numeral, and the similar elements are differentiated as necessary by adding a letter to the numeral. Thus spectacles 50 comprise planar optical combiners 52, comprising combiners 52A and 52B in front of, respectively, the left and right eyes of professional 22. Optical combiners 52 are mounted on a retaining structure 54 which holds elements of assembly 24, and which is herein assumed to comprise a spectacle frame, so that structure 54 is also referred to herein as frame 54.

In some embodiments, combiner frames 82A and 82B are fixed to retaining structure 54 and vertical retaining rods 84A and 84B attached to the combiner frames support the optical combiners, so that the combiners are able to rotate about vertical axes defined by the rods. Retaining rods 84A and 84B, and thus combiners 52A and 52B, may be rotated independently of each other about their vertical axes by respective motors 86A and 86B, fixed to frames 82A and 82B. Motors 86, typically stepper motors, are controlled by processor 26 so as to rotate their attached combiners to known, typically different, fixed orientations with respect to their respective combiner frames.

Each optical combiner 52 is configured to at least partially transmit elements of a scene through the combiner, so that a portion 56 of patient 30 (FIG. 1) is assumed to be directly visible through each combiner 52. In addition, each optical combiner 52 is configured to receive a visible radiation transmission derived from a scene, and/or a visual transmission such as a presentation of data or a marker, and to redirect or reflect the transmission back to the eye of professional 22. The redirection is such that the scene and/or data or marker presented to the professional appears to be at a distance between the near and far points of vision of the professional. Thus, any given section of the optical combiner may combine directly visible material with redirected or reflected material, and provide this combined material to the eye of the user. More detail of the functioning of combiners 52 is provided below.

Optical combiners of various types are known in the art. One known type uses a semi reflective surface which transmits an image from an image source after it has passed through a set of lenses which correct deformations caused by the semi reflective surface of the combiner. Another known type uses a waveguide which projects the image directly to the eye of the viewer. Herein, by way of example, combiners 52 are assumed to be of the waveguide type.

In one embodiment, combiners 52 comprise LUMUS DK 32 see through glasses, produced by Lumus Optical of Rechovot, Israel.

Generally similar pixelated variable transparency screens 60A and 60B respectively coat a rear side, i.e., the side away from the eyes of professional 22, of combiners 52A, 52B. Screens 60 are active elements of system 20 and are formed of an array of pixels, the opacity of each of the pixels being controlled by processor 26.

Screens 60 are typically, but not necessarily, liquid crystal displays (LCDs) formed of a rectangular array of liquid crystal pixels. Alternatively, screens 60 are formed of MEMS (microelectromechanical systems). Further alternatively, screens 60 are formed of polymer dispersed liquid crystals (PDLCs). In the following description, by way of example, screens 60 are assumed to be formed of LCDs. LCD display pixels can typically be switched between an opaque state, where approximately 95% of the incoming light is blocked and 5% is transmitted, and a transparent state where approximately 60% of the incoming light is blocked and 40% is transmitted. The LCDs then have a transmission contrast ratio of 1:8.

Fixedly attached to arms of frame 54 are generally similar micro-projectors 64A and 64B. Each micro-projector is located and oriented so as to be able to project onto respective combiner 52A and 52B, a scene, and/or a visual indication, in a form suitable for redirection by the combiners to the left or right eye of professional 22. Micro-projectors 64 are active elements, and the projected scenes/indications are provided to the micro-projectors by processor 26. The projection and redirection are configured so that the images seen by the eyes of professional 22, absent any correcting lenses, appear to be at infinity, due to parallel light coming from the combiners and entering the pupils. In some embodiments display 24 comprises correcting lenses 88A, 88B which redirect light from combiners 52A, 52B so that the images appear to be closer than infinity to the professional's eyes. The power D in diopters of the lenses defines the distance d of the images, according to the formula d=1/D, where d is in meters, and D is a negative number. Lenses 88A, 88B are typically located between the professional's eyes and the respective combiners. For simplicity, lenses 88A, 88B are not shown in other figures of the present application.

At least one image capturing device 68 is attached to frame 54. In the disclosed embodiment there are two generally similar devices 68A and 68B, respectively aligned to be approximately orthogonal to planar combiners 52A and 52B, so as to be able to capture radiation of respective images of scenes viewed by the left and right eyes of professional 22. Typically, devices 68 comprise cameras configured to capture images of scenes in the visible spectrum. The cameras may use rolling shutters, in which cases latency (of projection via micro-projectors 64) may be reduced by processing rows of images rather than complete frames of images. In some embodiments devices 68 may also capture non-visible portions of images, such as portions in the infra-red spectrum. The operation of devices 68 is controlled by processor 26.

In some embodiments of the present invention, assembly 24 comprises a sensor 72 which is configured to capture non-visible images of elements of a scene in front of assembly 24. Typically sensor 72 uses a projector 73 configured to project radiation in the non-visible spectrum detected by the sensor, and has a bandpass filter configured to block visible radiation, such as that projected by surgical lighting. Typically, sensor 72 and projector 73 operate in the near infra-red spectrum.

In some embodiments, assembly 24 comprises a manual and/or electronic control 74 which may be operated by professional 22 to move elements of the assembly in and out of the field of view of the professional. Additionally or alternatively, there may be a button or switch 78 which enables the professional to power active elements of assembly 24, such as the capturing devices and the micro-projectors. In some embodiments switch 78 may be a foot switch. Further additionally or alternatively, assembly 24 may be configured so that it can tilt downwards about a horizontal axis, at an angle up to 40° from the horizontal, so that the professional can look through the assembly when looking down.

Additionally, assembly 24 may comprise a sensor 76, such as an accelerometer, which is configured to measure an inclination of the assembly with respect to the direction of gravity, so measuring the angle of the head of the professional with respect to the vertical. Processor 26 may be configured to use readings from sensor 76 to move elements of assembly 24 in and out of the field of view of the professional, and/or to control whether micro-projectors 64 project images.

Figure 2B:
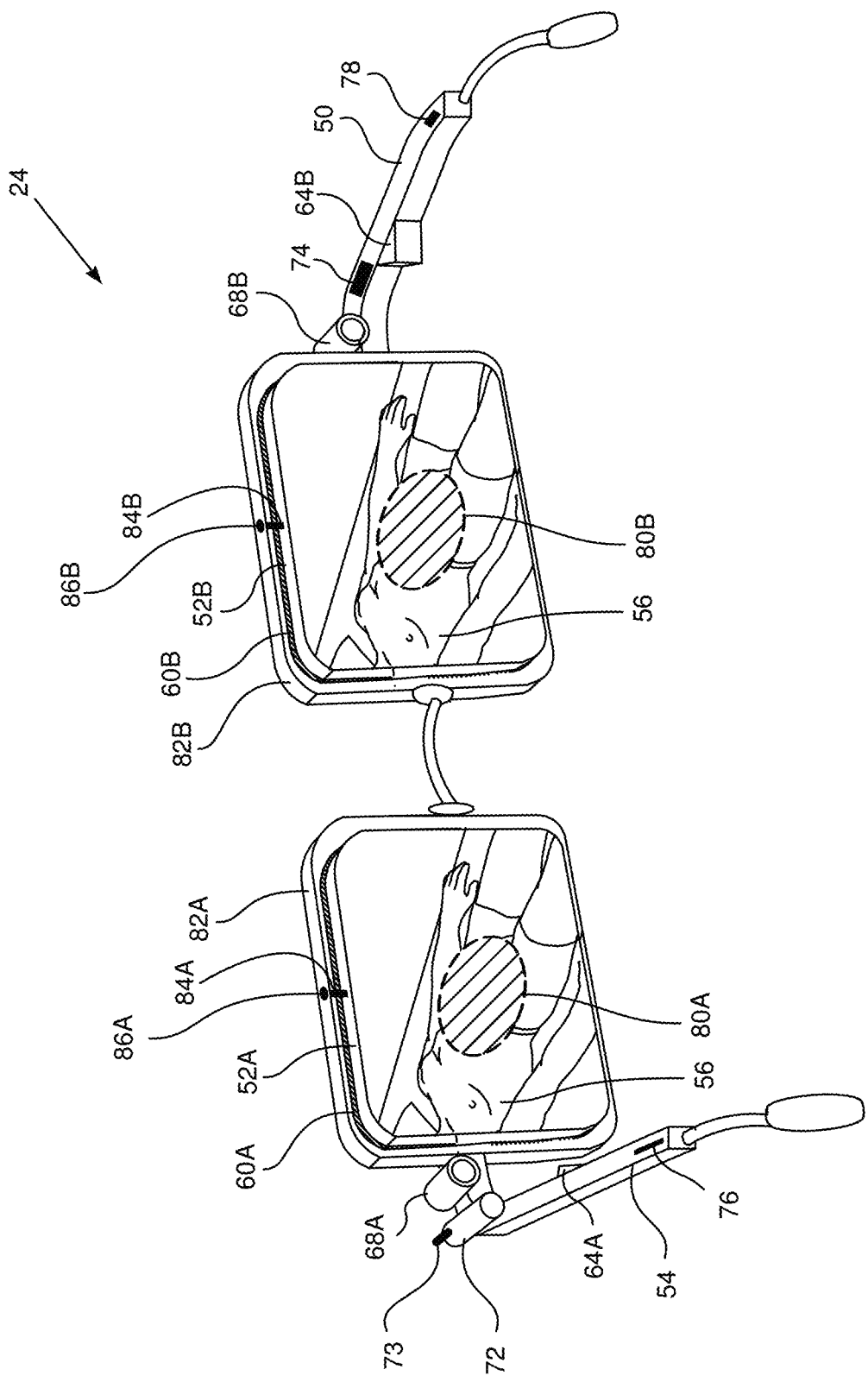

FIG. 2B schematically illustrates the appearance of assembly 24 when processor 26 activates screens 60A and 60B. As described above, each screen 60 comprises an array of pixels, and the opacity of each pixel in an individual screen may be set by processor 26. In screen 60A the processor has rendered a circular array 80A of the pixels of the screen opaque, while the remaining pixels of the screen are rendered transparent. The opacity of array 80A means that from the point of view of the left eye of professional 22, circular array 80A acts as a mask occluding corresponding features of portion 56 of the patient, so that array 80A is also referred to herein as occluding mask 80A.

Similarly in screen 60B processor 26 has rendered a circular array 80B of the pixels of the screen opaque, while the remaining pixels of the screen are rendered transparent. As for array 80A, array 80B occludes sections of portion 56 from the view of the right eye of professional 22. Thus array 80B is also referred to herein as occluding mask 80B.

Figure 2C:
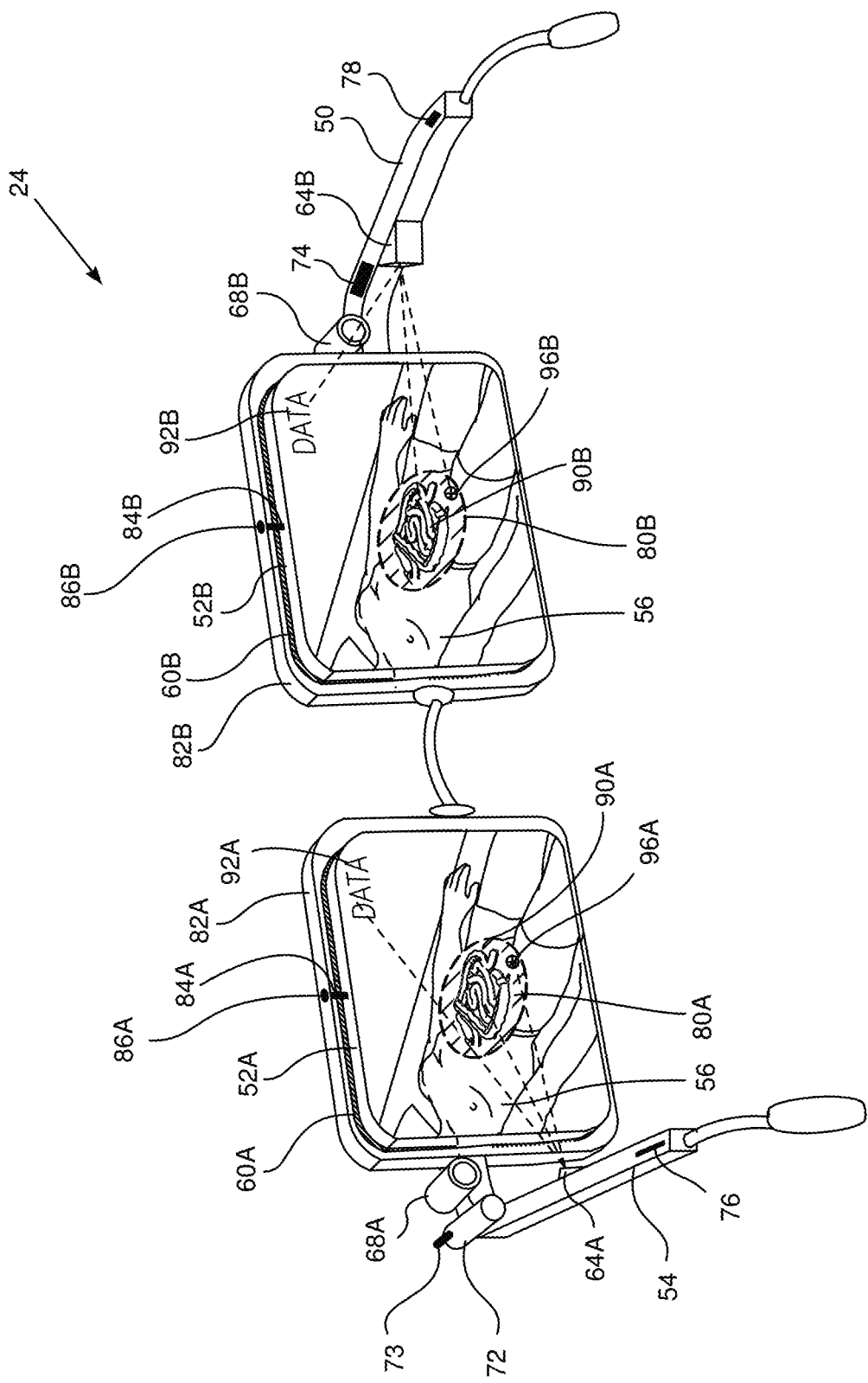

FIG. 2C schematically illustrates the appearance of assembly 24 when processor 26 activates screens 60 and micro-projectors 64A and 64B. Screens 60 are activated to provide occluding masks 80A and 80B, as described above with respect to FIG. 2B. Micro-projector 64A projects a prerecorded ultrasound image 90A of the patient's abdomen so as to overlay the image on mask 80A, and micro-projector 64B projects an image 90B of the abdomen so as to overlay it on mask 80B. Typically, although not necessarily, images 90A and 90B are the same. In some cases, for example if the images have been acquired in a stereoscopic manner or for correct 3D perception, images 90A and 90B may be slightly different, typically being slightly displaced horizontally with respect to each other. Micro-projectors 64 are configured to position images 90A and 90B on their respective masks so that, as seen by professional 22 and with −2 diopter lenses 88A, 88B present, the images are in focus at approximately 50 cm and appear to be at the location of the patient's abdomen.

In addition to projecting images 90, micro-projectors 64 also project alphanumeric data 92A and 92B onto the non-occluded region of screens 60, as well as markers 96A and 96B onto masks 80A and 80B. Images 90, data 92, and markers 96 are typically stored in database 40, and are provided from the database to micro-projectors 64 by processor 26.

In a mentoring situation images 90, the contents of data 92, and the position of markers 96 are typically under control of a tutor interacting with processor 26 while mentoring professional 22. In some cases the locations of masks 80 may also be provided to processor 26 by the tutor, although typically the locations of the masks depend upon gaze directions 32 of the professional. In a non-mentoring situation, i.e. where professional 22 alone operates system 20, locations of masks 80 are typically automatically set by processor 26, as is described below. Also in a non-mentoring situation, images 90, data 92, and markers 96 may be controlled by professional 22. It will be understood that images 90, data 92 and markers 96 are examples of non-video related visual elements that are seen by professional 22, and that the provision of such elements corresponds to an optic-based augmented reality situation implemented in system 20.

Figure 2D:
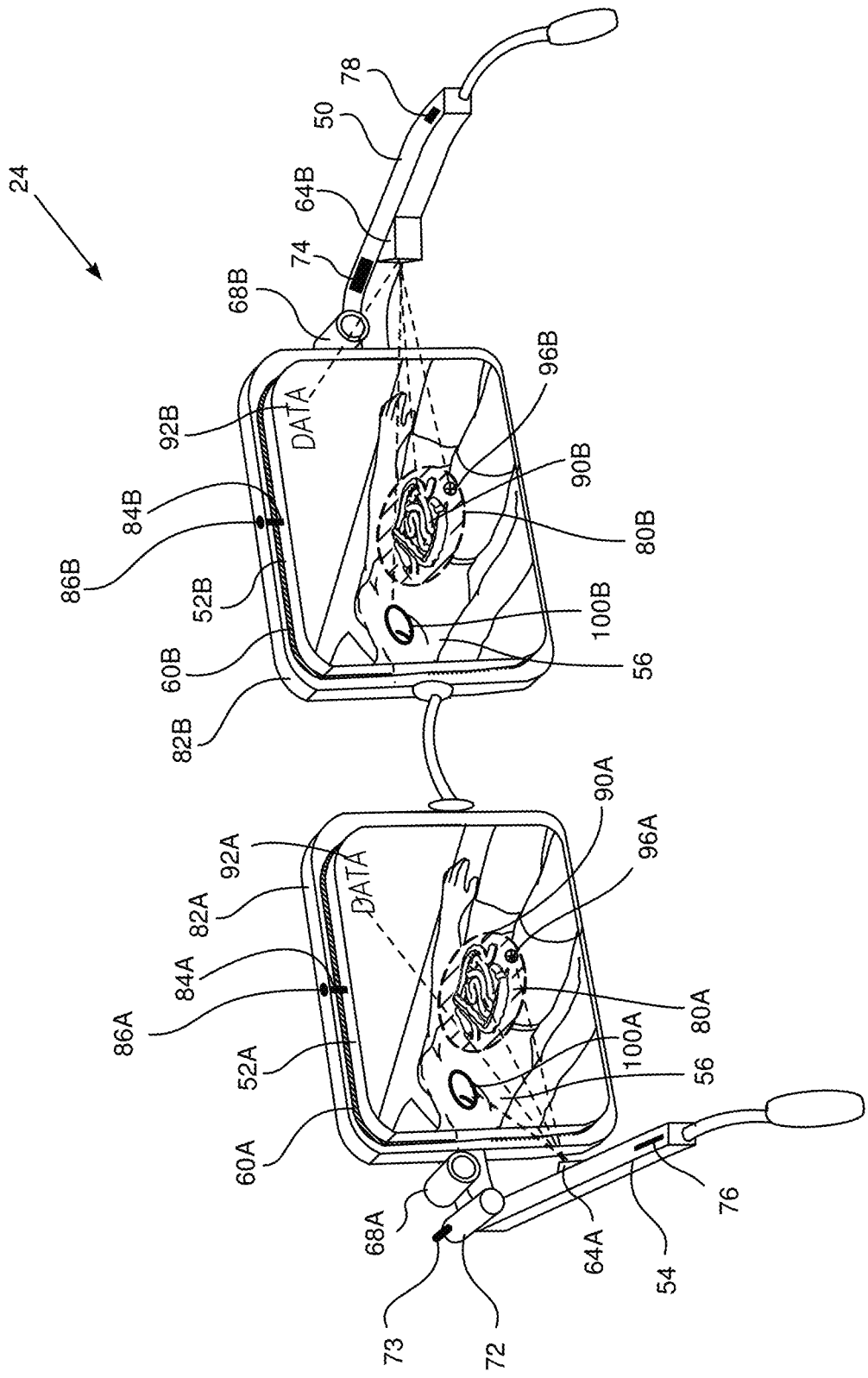

FIG. 2D schematically illustrates the appearance of assembly 24 when processor 26 activates screens 60 and micro-projectors 64, and in addition incorporates a video-based augmented reality feature into the operation of the assembly. Screens 60 and micro-projectors 64 are assumed to be activated as described above for FIG. 2C, so that masks 80, images 90, data 92 and markers 96 are in the field of view of professional 22. By way of example, the figure has been drawn to illustrate a mentoring situation, where the tutor of professional 22 wants to point to a feature of the chest of patient 30, herein assumed to comprise an unusual movement of the chest.

To point to the feature, the tutor interacts with processor 26 so that the processor enhances and emphasizes portions 100A, 100B of the video images acquired by capturing devices 68, the portions corresponding to the region of the chest where the unusual movement is occurring. Microprojectors 64A, 64B then project portions 100A, 100B onto combiners 52A, 52B. It will be understood that the enhancement of portions 100A, 100B and their projection on the respective combiners is in real-time. The enhancement may take a number of forms. For example, portions 100A, 100B may comprise a wireframe image of the region of the chest having unusual movement, and/or a false-color image of the region. Other suitable methods of real-time enhancement will be apparent to those having ordinary skill in the art, and all such methods are assumed to be within the scope of the present invention.

Figure 2E:
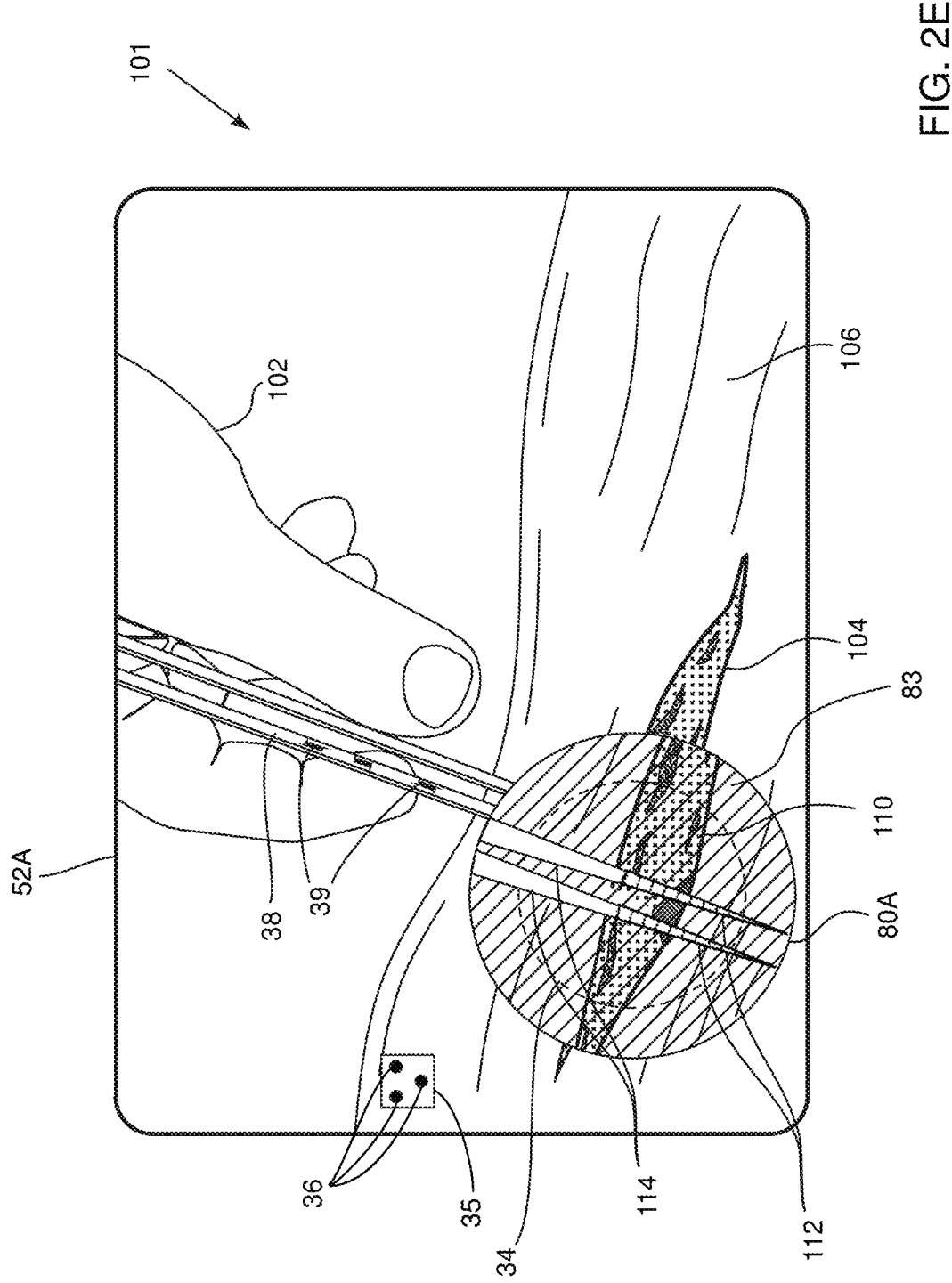

FIG. 2E schematically illustrates an overall scene 101 as seen by professional 22, during an invasive surgical procedure being performed by the professional. For simplicity, FIG. 2E illustrates the scene as it is presented on combiner 52A, and it will be understood that a substantially similar scene is presented to the professional on combiner 52B. The figure illustrates a hand 102 of professional 22 holding device 38, herein assumed to comprise a pair of tweezers, at a proximal end of the device. One or more device identifying elements 39, typically reflectors and/or radiators, are attached to the tweezers, so that processor 26 is able to identify and track device 38 using images acquired by capturing devices 68.

The professional has made an incision 104 in a portion 106 of patient 30, and ROI 34, defined by marker elements 36, is assumed to be at the location of the incision. In addition, the professional has inserted a lower portion of the distal end of device 38 into the patient so that the lower portion is no longer visible.

Processor 26 has formed mask 80A on combiner 52A so as to occlude ROI 34, and the portion of incision 104 comprised in the ROI. Mask 80A also includes a margin 83, typically corresponding to a margin of approximately 1-5 cm at the ROI. Thus, all elements of the scene outside mask 80A, comprising hand 102 and the proximal end of device 38, are directly visible through combiner 52A by the professional. However, elements of the scene within mask 80A, including a portion of incision 104 and an upper portion of the distal end of device 38 that is outside the patient, are not visible to the professional, since they are occluded by the mask.

Processor 26 overlays on mask 80A a captured image 110 of the ROI and the region corresponding to margin 83, which includes the portion of incision 104 occluded by the mask and which also includes a video image 114 of the upper portion of the distal end of device 38 (outside the patient) that has been captured by image capturing device 68. In addition, the processor overlays on the occlusion mask a stored image 112 corresponding to the lower portion of the distal end of device 38 (within the patient). Stored image 112 is a virtual elongation of image 114 and is retrieved from database 40. The section of the distal end corresponding to image 112 is not visible to capturing device 68.

The processor registers the two overlaid images, image 110 and image 112, with each other, and the registration is possible since by tracking device 38 the processor is aware of the location of the device distal end with respect to the captured image. Thus, there is no misalignment between stored image 112, corresponding to the lower portion of the distal end, and image 114 of the upper portion of the distal end, which is included in captured image 110.

However, there is typically misalignment between the two registered overlaid images 110, 112 and the directly visible portion of scene 101, including the directly visible portion of incision 104, as is illustrated in the figure. The misalignment occurs because while the captured image of the ROI is close to that seen by the professional (in the absence of the occlusion mask), it is not exactly in registration with the viewed scene. The inventors have found that a misalignment of up to 2 cm, in a scene that is 50 cm from the eye of the professional, is acceptable.

Figures 3A, 3B:
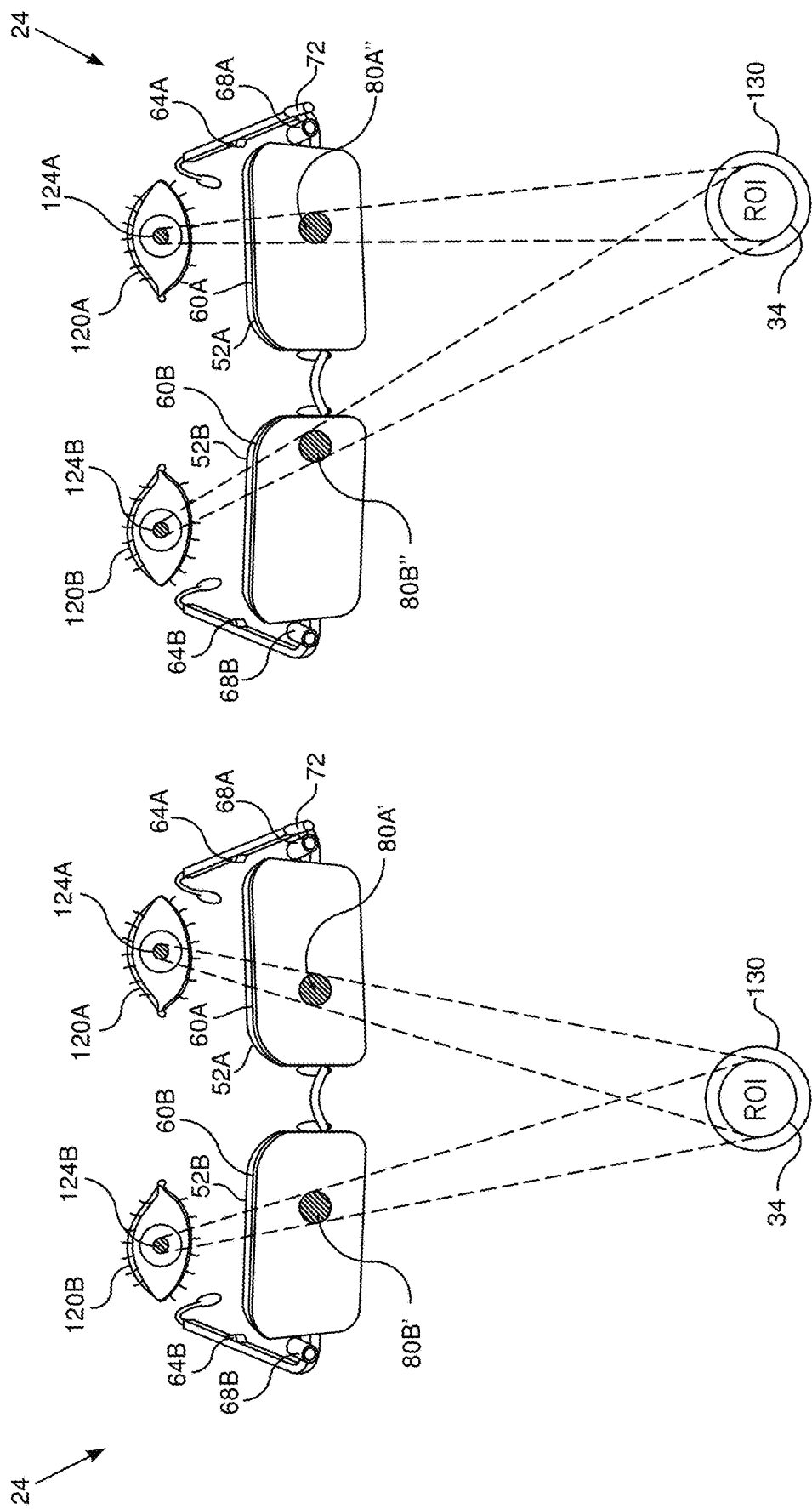
FIGS. 3A, 3B, and 3C are schematic diagrams illustrating the assembly in different orientations with respect to a region of interest.
Figure 3C:
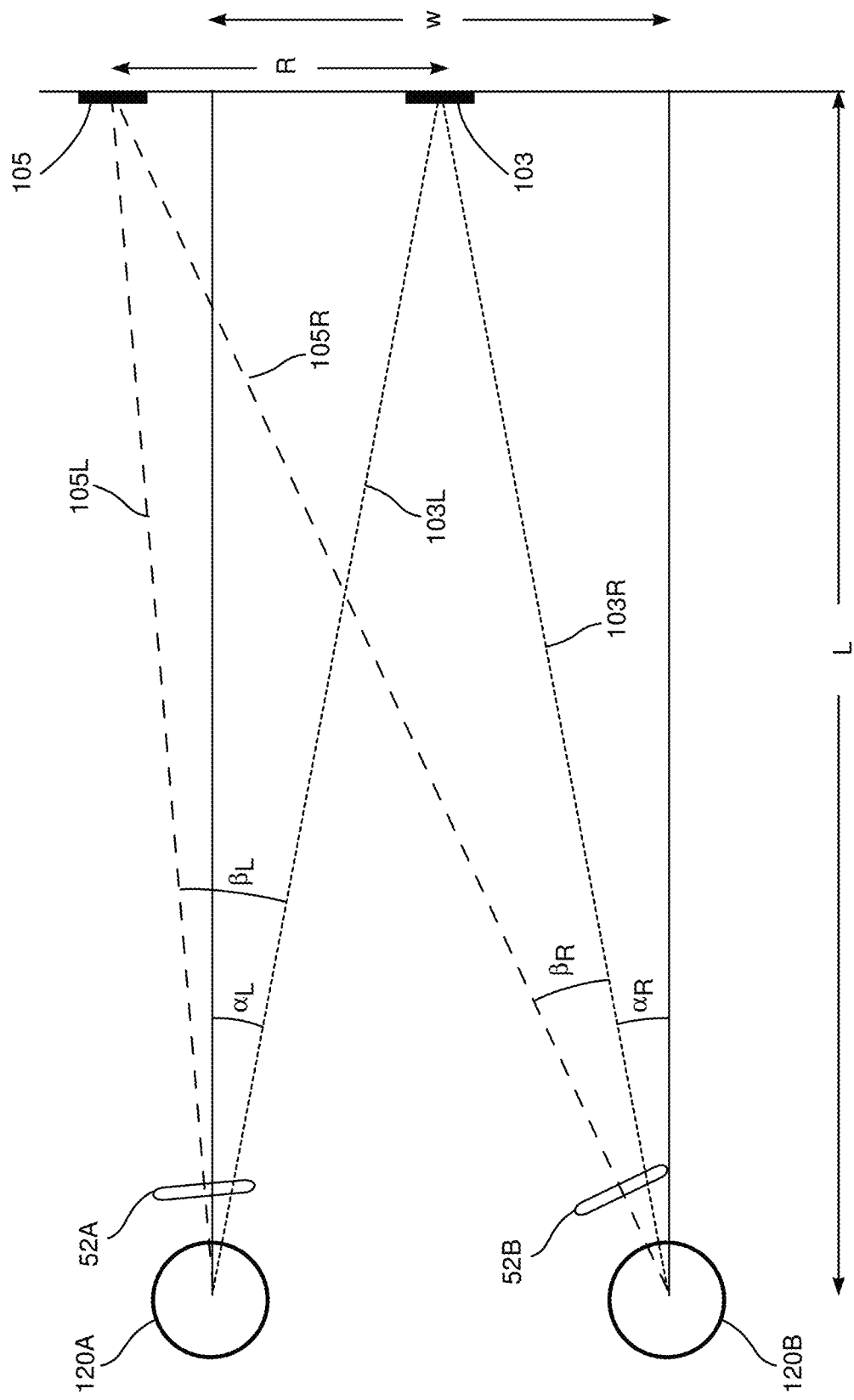
Figure 3D:
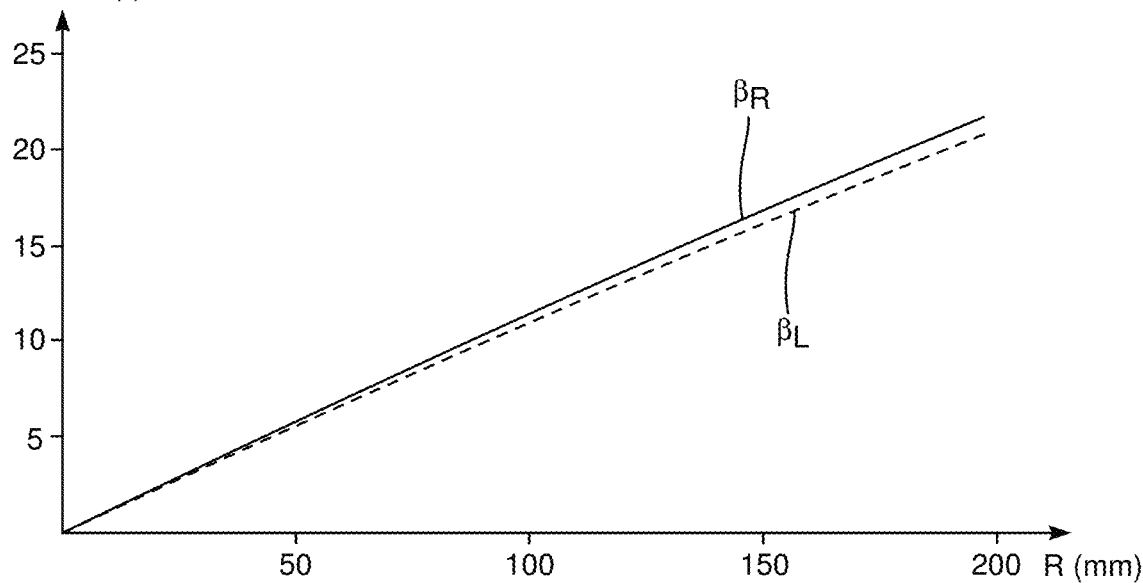
FIGS. 3D and 3E are graphs derived from the different orientations, according to an embodiment of the present invention.
Figure 3E:
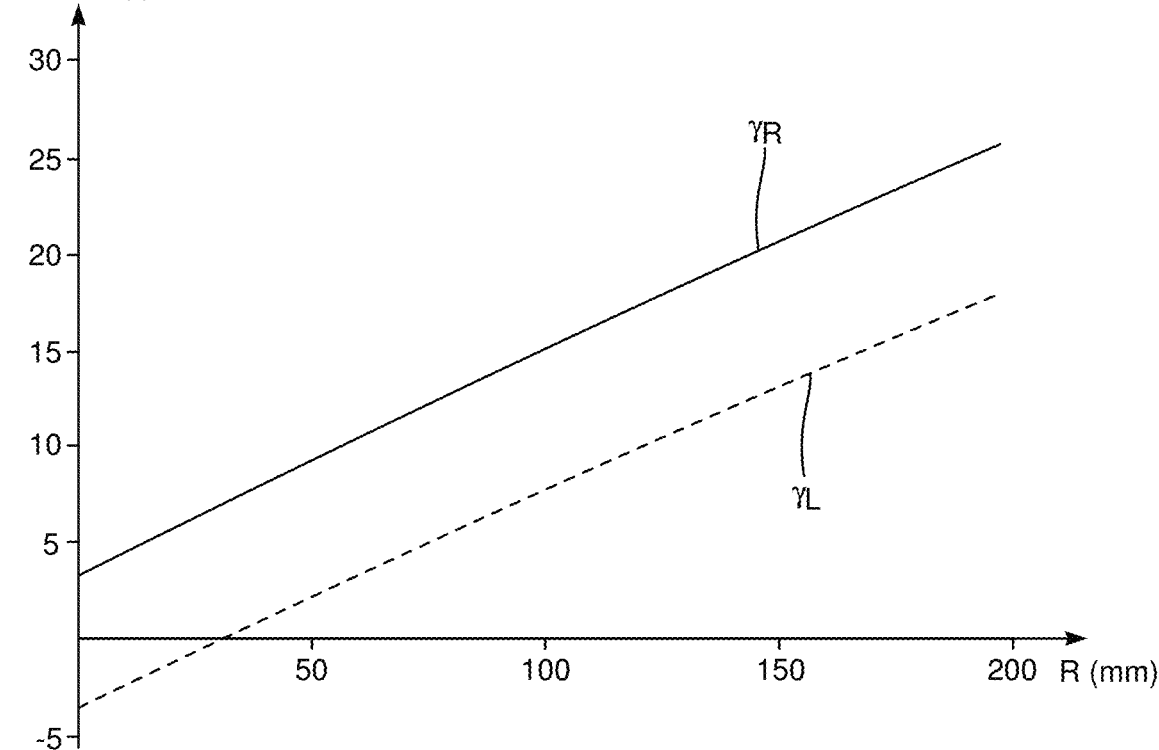

FIGS. 3A and 3B are schematic diagrams illustrating assembly 24 in different orientations with respect to ROI 34, FIG. 3C is a schematic diagram illustrating angles of the assembly for the different orientations, and FIGS. 3D, 3E are graphs of the angles, according to an embodiment of the present invention. For simplicity, combiner frames 82 are not shown in the diagrams. In FIGS. 3A and 3B processor 26 has positioned masks 80 so that they act to occlude ROI 34 from eyes 120A, 120B of professional 22, specifically from pupils 124A, 124B of the professional's eyes. FIG. 3A illustrates a situation where ROI 34 is approximately directly in front of professional 22. In this case the processor forms mask 80A' to be on a straight line with pupil 124A and ROI 34, while simultaneously forming mask 80B' to be on a straight line with pupil 124B and the region of interest.

FIG. 3B illustrates a situation where ROI 34 is not directly in front of professional 22, but is towards one side of the professional. As for the situation of FIG. 3A the processor forms mask 80A" to be on a straight line with pupil 124A and ROI 34, and forms mask 80B" to be on a straight line with pupil 124B and the region of interest. In all cases masks 80 act as occlusion masks, and, as is illustrated by the differences in the positions of the masks, the processor changes the locations of the masks to account for changes in orientation of the region of interest with respect to assembly 24.

A ring 130 surrounding ROI 34 is described in more detail below.

FIG. 3C schematically illustrates the two situations of FIGS. 3A and 3B, when ROI 34 is at a distance L from eyes 120A, 120B of the professional. Eyes 120A and 120B are separated by a distance w. For the situation of FIG. 3A, where the region of interest is directly in front of the professional, ROI 34 is at a location 103. For the situation of FIG. 3B, ROI 34 is to the left of the professional, at a location 104 that is a distance R from location 103.

For the first situation, where professional 22 is looking at location 103, the directions of gaze, $\alpha_R$, $\alpha_L$ of the professional are shown by lines 103R and 103L. $\alpha_R$, $\alpha_L$ are angles that are measured with respect to lines orthogonal to a line connecting eyes 120A, 120B, and their values are given by the following equations:

$$\alpha_L = -\arctan\left(\frac{w}{2L}\right), \alpha_R = +\arctan\left(\frac{w}{2L}\right) \tag{A}$$

For the first situation processor 26 rotates combiners 52A and 52B (for clarity the combiners are not shown in the figure for the first situation), within their respective frames 80A and 80B, so that they are orthogonal to lines 103L and 103R. Thus the orientation of the combiners to their frames is given by equations (A).

For the second situation, where professional 22 is looking at location 105, the directions of gaze of the professional are shown by lines 105L and 105R. These directions are respectively changed from the "straight ahead" directions by $\beta_L$, $\beta_R$. The values of $\beta_L$, $\beta_R$ are given by equations (B):

$$\beta_L = a\cos\left(\frac{\sqrt{\left(\frac{w}{2}\right)^2 + L^2} - \frac{R}{\sqrt{1 + \frac{4L^2}{w^2}}}}{\sqrt{\left(R - \frac{w}{2}\right)^2 + L^2}}\right) \quad \text{(B)}$$

$$\beta_R = a\cos\left(\frac{\sqrt{\left(\frac{w}{2}\right)^2 + L^2} + \frac{R}{\sqrt{1 + \frac{4L^2}{w^2}}}}{\sqrt{\left(R + \frac{w}{2}\right)^2 + L^2}}\right)$$

For the second situation processor 26 rotates combiners 52A and 52B, within their respective frames 80A and 80B, so that they are orthogonal to lines 105L and 105R. Thus the orientation of the combiners to their frames is given by equations (B), and these orientations are illustrated in the figure.

FIG. 3D is a graph of angles $\beta_L$, $\beta_R$ vs. R for values of L=512 mm, w=60 mm FIG. 3E is a graph of absolute angles $\gamma_L$, $\gamma_R$, of the angles made by combiners 52A, 52B with their frames where $$\gamma_L = \beta_L + \alpha_L, \gamma_R = \beta_R + \alpha_R \quad \text{(C)}$$

From the above equations, as well as from the graphs, it is apparent that the angles made by combiners 52A, 52B with their respective frames are different, as professional 26 gazes at a region of interest. In addition, if the professional changes his/her gaze, the changes of the combiner angles to maintain orthogonality with the gaze directions are also different.

It will be understood that calculations based on equations herein, including equations (A), (B), and (C), assume that combiners 52A, 52B transmit rays that are orthogonal to the combiners. Those having ordinary skill in the art will be able to adapt the calculations, mutatis mutandis, for situations where the combiners transmit non-orthogonal rays.

Figure 4:
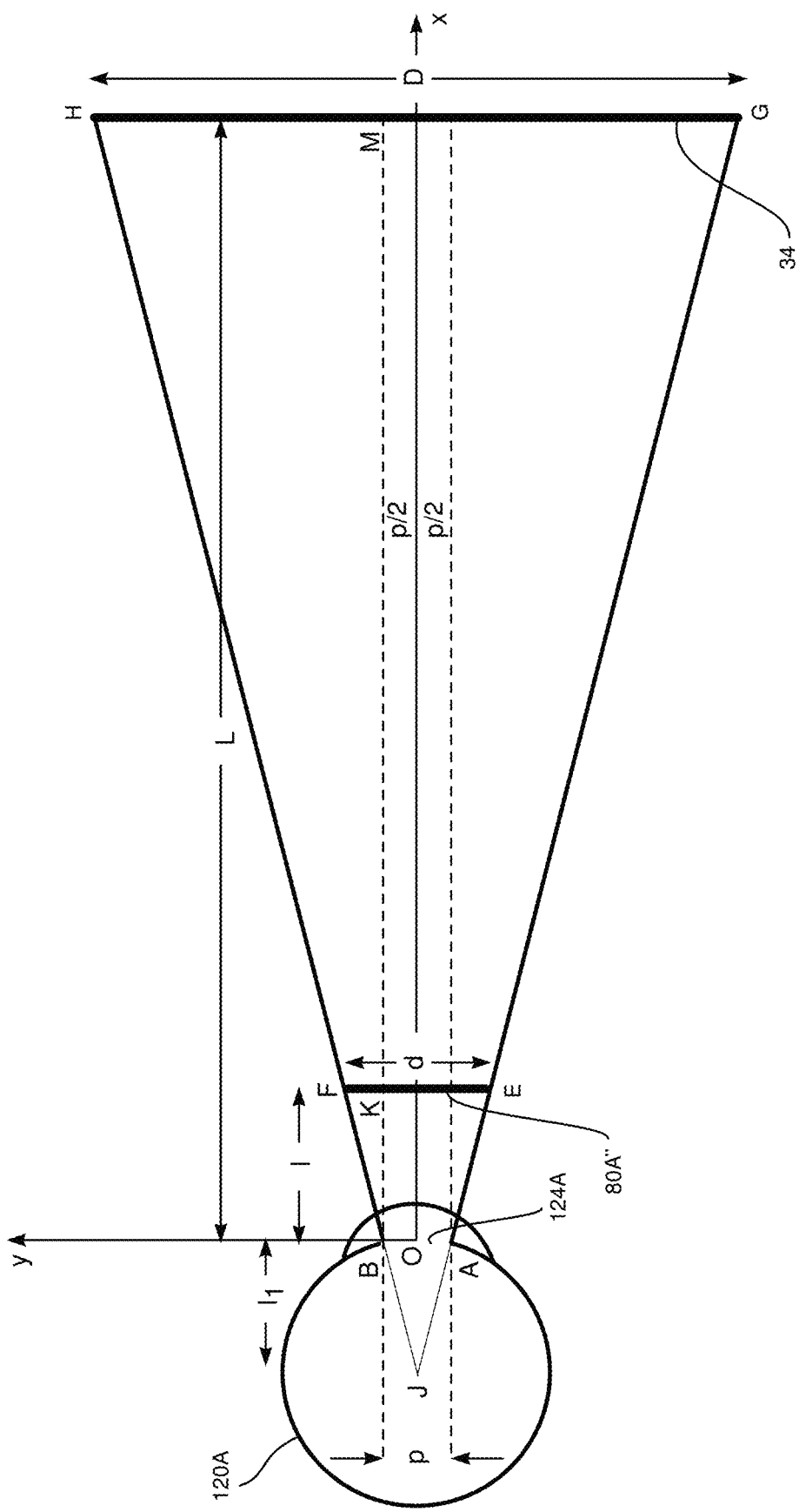
FIG. 4 is a schematic diagram illustrating derivation of the dimensions of an occlusion mask, according to an embodiment of the present invention.

FIG. 4 is a schematic diagram illustrating derivation of the dimensions of occlusion mask 80, according to an embodiment of the present invention. FIG. 4 is derived from a section of FIG. 3B, specifically the section illustrating eye 120A, with its pupil 124A, being occluded by mask 80A" while the eye is gazing at ROI 34. FIG. 4 illustrates a cross-section of the eye, the occlusion mask, and the region of interest. The figure has been drawn on xy axes with an origin O of the axes at the center of pupil 124 and the directions of the x and y axes being respectively orthogonal to and in the plane of the pupil. Mask 80A" and ROI 34 are assumed to be orthogonal to, and to be symmetrically disposed with respect to, the x-axis. Pupil 124 is assumed to be substantially circular. For simplicity, mask 80A" and ROI 34 are also assumed to be substantially circular. However, those having ordinary skill in the art will be able to adapt the following description, mutatis mutandis, for regions of interest and occlusion masks that are non-circular, so that the scope of the present invention is assumed to comprise both circular and non-circular regions of interests and masks.

The diagram has been drawn assuming that mask 80A" just completely occludes ROI 34. Thus a ray HB, from an upper edge H of ROI 34 to an upper edge B of pupil 124A touches an upper edge F of mask 80A". Similarly, a ray GA, from a lower edge G of ROI 34 to a lower edge A of pupil 124A touches a lower edge E of mask 80A". Rays HB and GA are assumed to cross at an imaginary point J. A line from upper pupil edge B parallel to the x-axis cuts mask 80A" at K and ROI 34 at M.

In the description below:
p is the apparent diameter of pupil 124A, as measured externally to eye 120A, corresponding to AB; and
d is the diameter of mask 80A", corresponding to EF; d=$d_1$ for a realistic case of p>0, d=$d_0$ is the diameter of the mask for a theoretical "pinhole" case of p=0.

In addition,
D is the diameter of ROI 34 (which is occluded by mask 80A"), corresponding to GH;
L is the distance from pupil 124A to ROI 34;
$l_1$ is the distance from pupil 124A to point J; and
l is the distance from pupil 124A to mask 80A".
In FIG. 4 $\triangle JFE ||| \triangle JHG$, so that $$\frac{d}{D} = \frac{l + l_1}{L + l_1} \quad (1)$$

From equation (1), $$d = \frac{l + l_1}{L + l_1} \cdot D \quad (2)$$

If $l_1$=0, (for the theoretical case of p=0), then $$d = d_0 = \frac{l}{L} \cdot D \quad (3)$$

If $l_1$>0, for the realistic case of p>0, then $$d = d_1 = \frac{l + l_1}{L + l_1} \cdot D \quad (4)$$

$$\triangle BFK ||| \triangle BHM, \text{ so that } \frac{FK}{BK} = \frac{FM}{BM} \quad (5)$$

For p>0 (so d=$d_1$) and substituting values of $d_1$, p, l, and L for FK, BK, FM, and BM in equation (5) gives:

$$\frac{\frac{d_1}{2} - \frac{p}{2}}{l} = \frac{\frac{D}{2} - \frac{p}{2}}{L} \quad (6)$$

Equation (6) rearranges to:

$$d_1 = \frac{l(D - p)}{L} + p \quad (7)$$

Equation (7) gives dimensions of mask 80A", i.e., its diameter $d_1$, in terms of the diameter D of ROI 34, the distance l of the mask from the pupil, the diameter of the pupil, and the distance L of the ROI from the pupil.

For typical values of l=2 cm, L=50 cm, p=0.3 cm, and D=15 cm the diameter of mask 80A" to just give complete occlusion is, from equation (7), approximately 0.9 cm. For the same values but with p=0.15, the mask diameter is approximately 0.7 cm.

While, as described above, mask 80A" completely occludes ROI 34, there are regions outside ROI 34 that are partly occluded by the mask. The partial occlusion follows from the finite, non-zero diameter of the pupil of eye, in the example described here pupil 124A, and is described in more detail with reference to FIG. 5 below.

Figure 5:
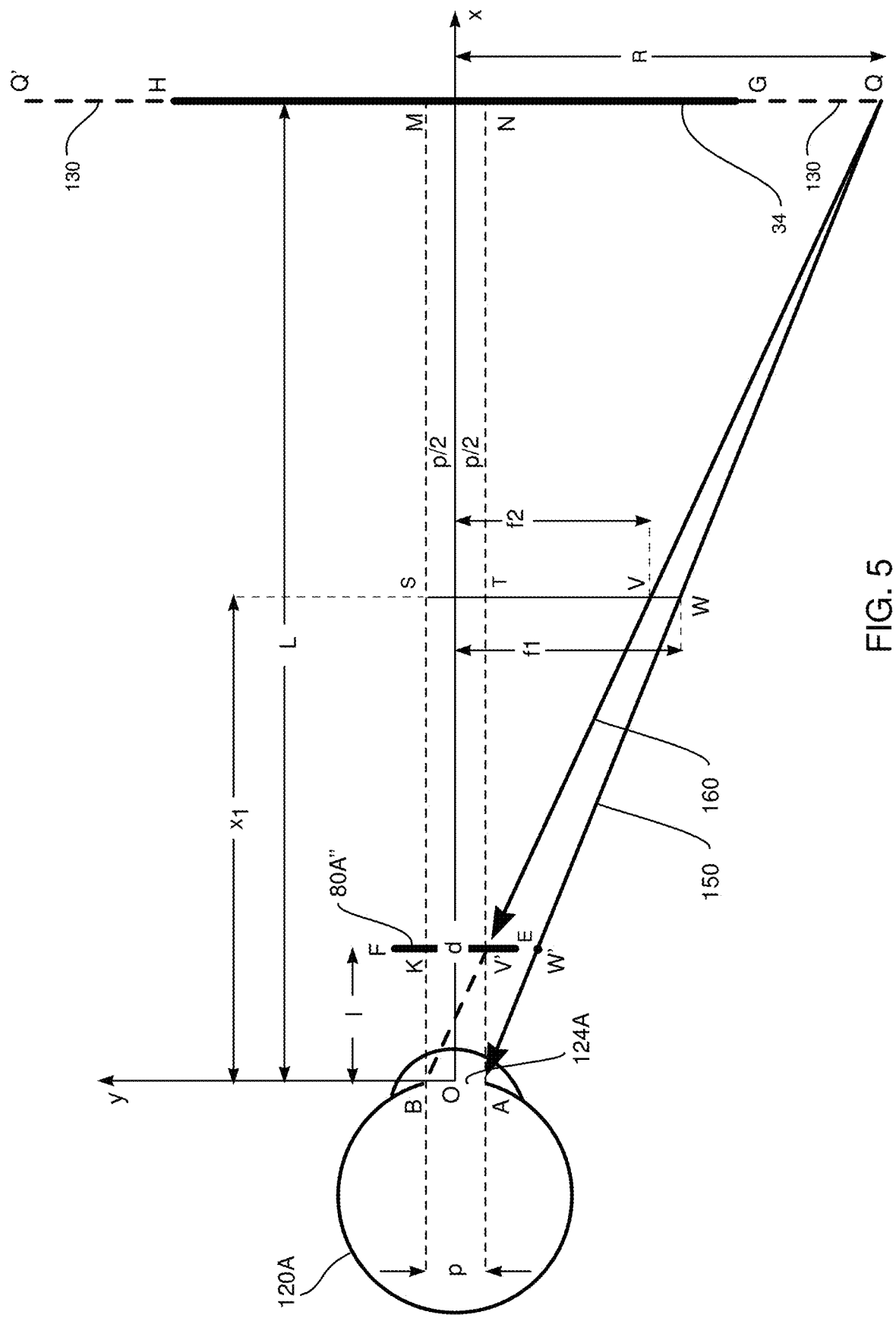
FIG. 5 is a schematic diagram illustrating partial occlusion of an area around the region of interest, according to an embodiment of the present invention.

FIG. 5 is a schematic diagram illustrating partial occlusion of an area around ROI 34, by mask 80A", according to an embodiment of the present invention. FIG. 5 is based upon FIG. 4, but for clarity some of the elements of FIG. 4 are omitted in FIG. 5, while other elements are added in. Thus, a line through point A, parallel to the x-axis, cuts ROI 34 at N. A point Q, lying in the same plane as ROI 34, and at a distance R from the x-axis, is assumed to project two rays—a lower ray 150 which touches lower edge A of the pupil, and an upper ray which, but for the presence of mask 80A", would touch upper edge B of the pupil. Point Q is thus partly occluded by mask 80A".

In FIG. 5 at a distance $x_1$ from the pupil lower ray 150 is assumed to be a distance $f1(x_1)$ from the x-axis, and upper ray 160 is assumed to be a distance $f2(x_1)$ from the x-axis. A line parallel to the y-axis, at $x_1$, cuts BM at S, AN at T, upper ray 160 at V and lower ray 150 at W. Upper ray 160 cuts mask 80A" at V', and lower ray 150 cuts a plane containing the mask at W'.

At mask 80A" the distances of lower ray 150 and of upper ray 160 from the x-axis are respectively $f1(l)$ and $f2(l)$, and the width of the beam between the upper and lower rays is:

$$f1(l) - f2(l) \tag{8}$$

From the diagram,
partial occlusion occurs if:

$$f1(l) > \frac{d}{2} \text{ and } f2(l) < \frac{d}{2} \tag{9}$$

no occlusion occurs if:

$$f2(l) \geq \frac{d}{2} \tag{10}$$

and full occlusion, corresponding to the situation illustrated by FIG. 4, occurs if:

$$f1(l) \leq \frac{d}{2} \tag{11}$$

From expressions (8) and (9), and inspection of FIG. 5, an equation for the fraction $F_{2D}$ of occlusion occurring is:

$$F_{2D} = \frac{\frac{d}{2} - f2(l)}{f1(l) - f2(l)} \tag{12}$$

(The subscript 2D indicates that the fraction considered here is for the two-dimensional case illustrated in FIGS. 4 and 5. A fraction for the three-dimensional case is referred to below.)

Since $\triangle ATW \| \triangle ANQ$ $$f1(l) = \frac{1}{L}\left(R - \frac{p}{2}\right) + \frac{p}{2} \tag{13}$$

Since $\triangle BSV \| \triangle BMQ$ $$f2(l) = \frac{1}{L}\left(R + \frac{p}{2}\right) - \frac{p}{2} \tag{14}$$

From equations (13 and (14) the diameter of the cone cross-section from Q at mask 80A", which is f1(1)-f2(1), is given by:

$$f1(l) - f2(l) = V'W' = p\left(1 - \frac{1}{L}\right) \tag{15}$$

Substituting equations (14) and (15) into equation (12) gives the following expression for $F_{2D}$:

$$F_{2D} = \frac{V'E}{V'W'} = \frac{\frac{d}{2} - \frac{1}{L}\left(R + \frac{p}{2}\right) + \frac{p}{2}}{p\left(1 - \frac{1}{L}\right)} \tag{16}$$

Inspection of equation (16) indicates that the fraction of occlusion at point Q is a function of pupil diameter p, and also decreases linearly as R increases.

HG is a cross-section of circular ROI 34, so that it will be understood that GQ is a cross-section of a circular, partially occluded circular ring 130 surrounding ROI 34. As illustrated in FIG. 5, there is a point Q', having the same distance R as Q from the x-axis (but on the opposite side of the axis), and in the same plane as ROI 34, so that HQ' is also a cross-section of ring 130.

The rays from point Q define a cone of rays emanating from Q, and this cone cuts mask 80A" in a circle having a diameter VW, the diameter being given by equation (15). The cutting of mask 80A" by the cone of rays from Q is described with reference to FIG. 6 below.

Figure 6:
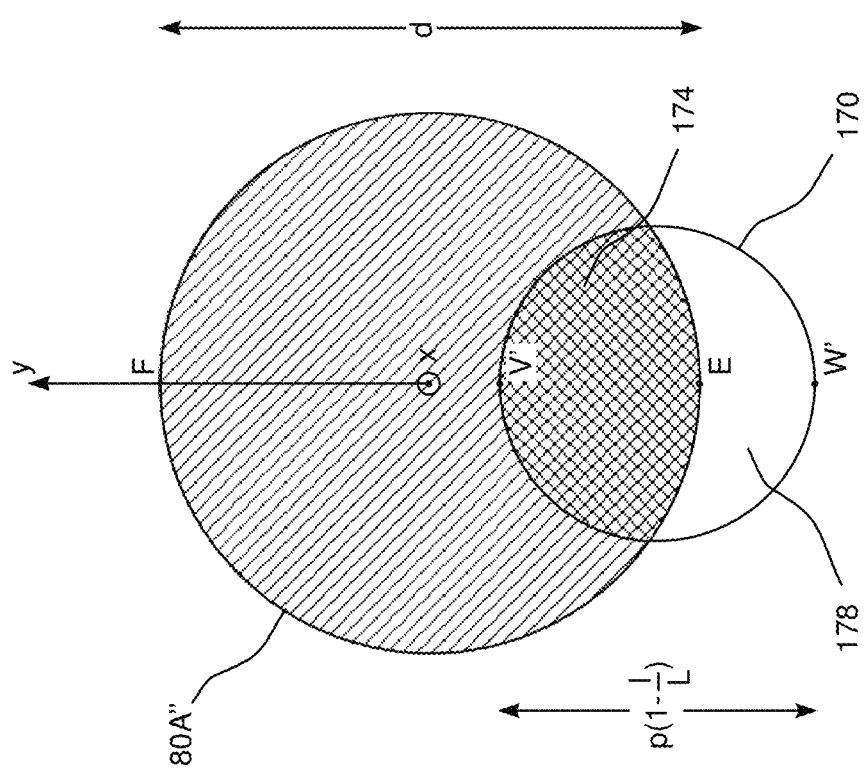
FIG. 6 illustrates an occlusion mask, according to an embodiment of the present invention.

FIG. 6 illustrates mask 80A" drawn in a plane orthogonal to the x-axis, according to an embodiment of the present invention. A circle 170, which has a diameter given by equation (15), is the circle cutting the plane containing mask 80A". A portion 174 of this circle is occluded by circular mask 80A", and a portion 178 is transmitted. The expression for the two-dimensional fraction of occlusion $F_{2D}$ given by equation (16) corresponds to analysis along a line FV'EW'.

There is a corresponding equation for a three-dimensional fraction of occlusion $F_{3D}$, given by the following expression:

$$F_{3D} = \frac{A}{A_L} \tag{17}$$

where A is the area of portion 174, and $A_L$ is the area of circle 170.

$F_{3D}$ may also be written as:

$$F_{3D} = \frac{A}{A_L} = \frac{\alpha_1 \frac{D_L^2}{4} + \alpha_2 \frac{d^2}{4} - M \frac{D_L}{2}\sin(\alpha_1)}{\pi \frac{D_L^2}{4}} \tag{18}$$

$$= \frac{1}{\pi p^2\left(1 - \frac{l}{L}\right)^2}\left(\mathrm{acos}\left(\frac{p^2\left(1 - \frac{l}{L}\right)^2 + 4\left(R\frac{l}{L}\right)^2 - d^2}{4R\frac{l}{L}p\left(1 - \frac{l}{L}\right)}\right)p^2\left(1 - \frac{l}{L}\right)^2 + $$

-continued $$\mathrm{acos}\left(\frac{d^2 + 4\left(R\frac{l}{L}\right)^2 - p^2\left(1-\frac{1}{L}\right)^2}{4R\frac{l}{L}d}\right)d^2 -$$

$$2R\frac{l}{L}p\left(1-\frac{l}{L}\right)\sin\left(\mathrm{acos}\left(\frac{p^2\left(1-\frac{l}{L}\right)^2 + 4\left(R\frac{l}{L}\right)^2 - d^2}{4R\frac{l}{L}p\left(1-\frac{l}{L}\right)}\right)\right)$$

From equation (18), $F_{3D}$ is a function of pupil diameter p, and the equation provides numerical values of $F_{3D}$ for selected values of d, R, p, l, and L.

Figure 7:
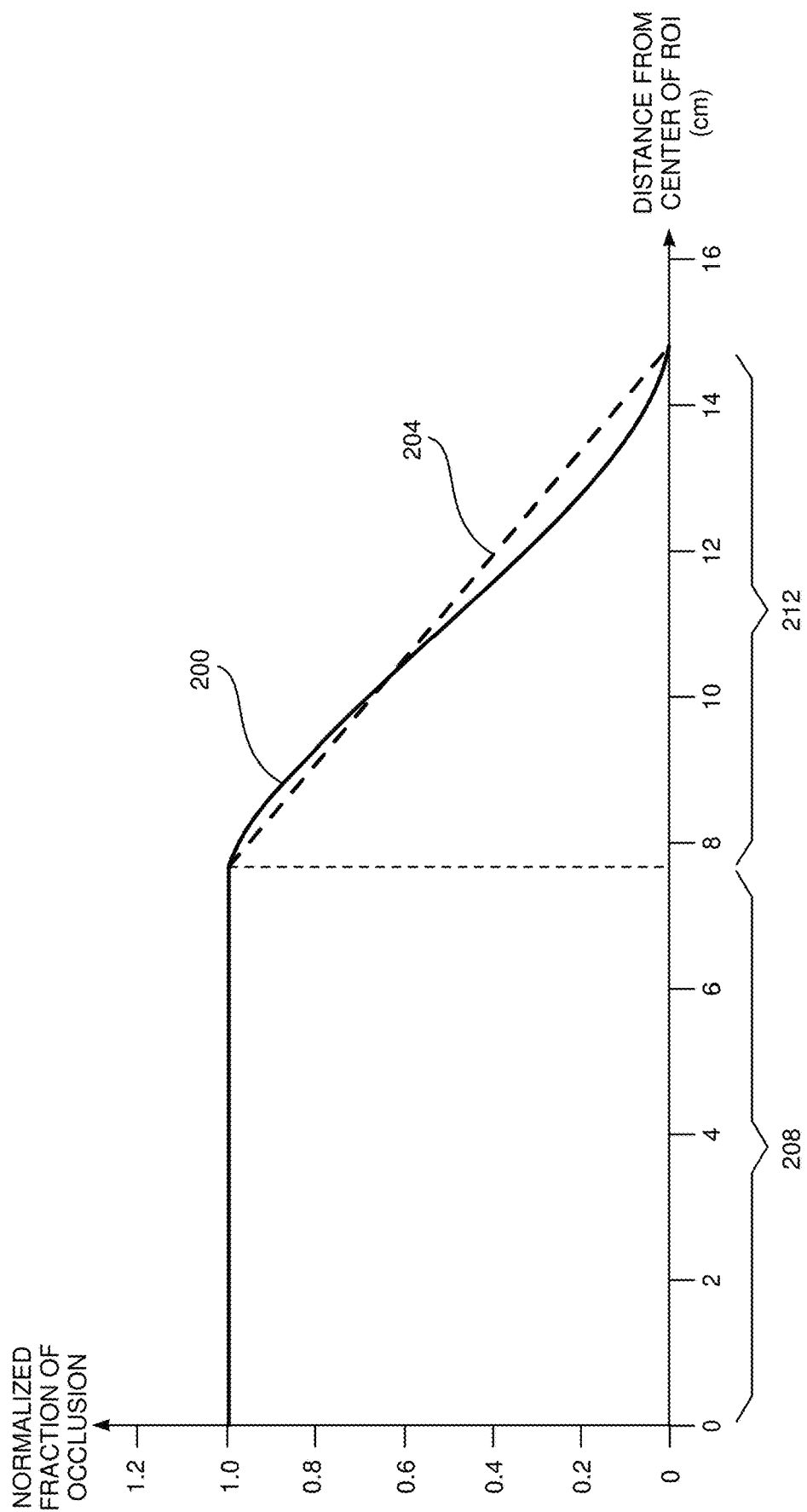
FIG. 7 illustrates graphs of occlusion vs. distance, according to an embodiment of the present invention.

FIG. 7 illustrates graphs of occlusion vs. distance, according to an embodiment of the present invention. The graphs have been drawn assuming the following values:

L=50 cm l=2 cm

P=0.3 cm

D=15 cm

From equation (7) the diameter of the occlusion mask to fully occlude an ROI with diameter D of 15 cm is d=0.888 cm. The graphs of FIG. 7 have been drawn with d set at 0.894 cm.

From equation (15) the diameter of circle 170 is 0.288 cm, so that the value of the area $A_L$ of the circle is 0.065144 cm².

A solid line graph 200 illustrates the full and partial occlusion vs. distance (from the center of the ROI) for the three-dimensional case comprising equation (18). The measurements of occlusion have been normalized, so that for an LCD screen a full occlusion of 95% is normalized to 1, and a full transparency (of 60% occlusion) is normalized to 0. A broken line graph 204 illustrates the full and partial occlusion vs. distance for the two-dimensional case comprising equation (16). As is apparent from both graphs, there is full occlusion, for a mask of diameter d=0.894 cm, for a region 208 up to approximately 8 cm from the center of the ROI, and partial occlusion in a region 212 from approximately 8 cm to approximately 15 cm. The fraction of partial occlusion decreases monotonically in region 212.

Figure 8:
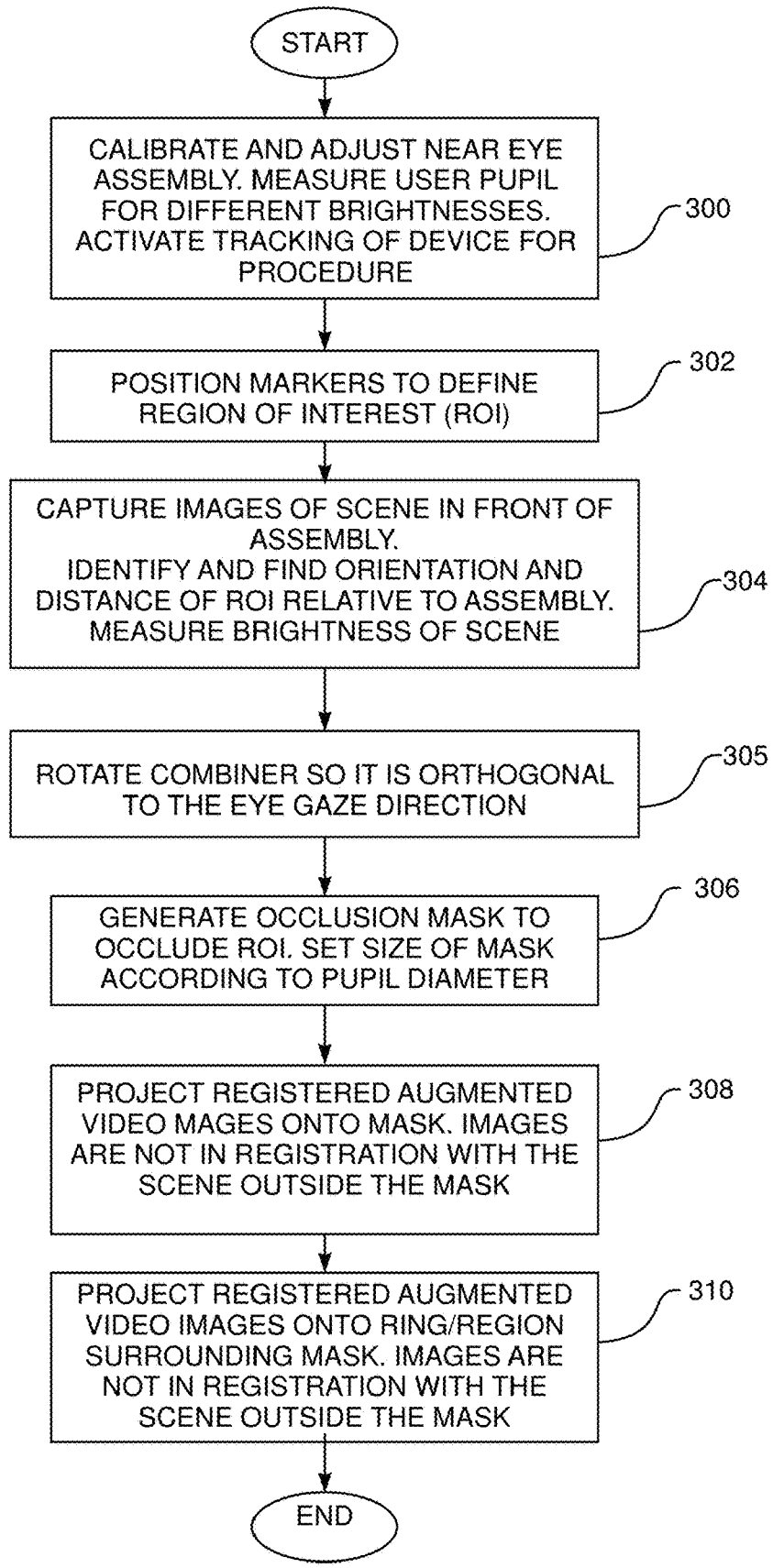
FIG. 8 is a flowchart of steps performed in operation of the augmented reality system, according to an embodiment of the present invention.

FIG. 8 is a flowchart of steps performed in operation of system 20, according to an embodiment of the present invention. The steps are assumed to be performed by processor 26 and, as necessary, professional 22 for use in a procedure on patient 30 performed by the professional using device 38 (FIG. 1). In an initial calibration step 300, frame 54 is adjusted to center combiners 52 with respect to the eyes of the professional. The sizes of the combiners and the distances of the combiners from the eyes of the professional are also measured and recorded by the processor (the use of the measurements is described further below). In step 300 assembly 24 is calibrated, i.e. optical elements of the assembly are registered with each other. Thus, devices 68 are oriented on frame 54 to capture generally similar images from the region in front of combiners 52. If sensor 72 is present it is also aligned to capture a corresponding non-visible image from the region.

Processor 26 also orients the images from micro-projectors 64, by registering the images projected by the micro-projectors onto combiners 52 with the scene viewed by professional 22 through the combiners. The registration may be accomplished by the professional viewing a scene through combiners 52, together with an image of the same scene as it is captured by devices 60 and projected by the micro-projectors onto the combiners. The professional then adjusts the orientation of the micro-projectors and/or the capturing devices so that the projected image and the viewed scene coincide.

Typically the registration and adjustment of the micro-projectors and the capturing devices is performed for different regions of combiners 52, such as the left and right peripheral regions, the upper and lower peripheral regions, and a central region. In addition, the registration and adjustment may be performed for different scenes according to the distance of the scene from the combiner, such as a scene of relatively near elements, typically up to 1 m from the combiner, and a scene of relatively far elements, typically greater than 1 m from the combiner. The registrations and adjustments of the micro-projectors and the capturing devices are typically different for the different regions of the combiners, as well as for scenes at different distances from the combiners. Processor 26 stores the different registration data acquired during the calibration step for use when the professional is using assembly 24.

During the calibration step the sizes of the pupils of the eyes of professional 22 are measured. In one embodiment professional 22 gazes at a circular object of a known diameter and at a known distance from the professional, and processor 26 presents an occlusion mask on screens 60 to the professional. The professional then adjusts a diameter of the occlusion mask until complete occlusion of the object is achieved. As is apparent from equation (7), the diameter of the completely occluding mask provides a value for the pupil diameter, since $d_1$, l, L and D (terms in equation (7)) are all known.

Alternatively or additionally, the professional may look into a mirror while image capturing devices 60 acquire images of the reflected scene, in this case the professional wearing assembly 24. Processor 26 analyzes the acquired images, by processes that are well known in the art, to identify the pupils of the professional as well as the outlines of combiners 52. The processor then compares the diameters of the pupils with the known dimensions of the combiners, so as to determine values for the diameters.

The measurements of the pupil diameters are taken for different ambient light brightnesses, and the ambient brightness values may be determined from the signal levels of the images acquired by devices 68. Processor 26 stores the values of the pupil diameters, and the corresponding brightness levels.

As stated above, processor 26 is configured to track device 38, using the one or more identifying elements 39 (FIG. 1). In calibration step 300 the processor initiates tracking of device 38, and professional 22 confirms that the tracking is acceptable.

In an ROI defining step 302, ROI acquisition marker 35 (FIG. 1) is positioned on patient 30, so as to define a region of interest of the patient selected by the professional, herein assumed to be ROI 34. As explained above, marker elements 36 of marker 35 define the position of ROI 34, and the size of the ROI may be defined by the professional. Typically there are at least three marker elements 36, although more may be used, and characteristics of the elements, such as their color and/or shape, are selected so that they may be easily distinguished from patient 30. If assembly 24 comprises sensor 72 with an infra-red projector, marker elements 36 may be configured as retro-reflectors which selectively reflect only infra-red radiation.

In an imaging step 304, image capturing devices 68 acquire images of the scene in front of assembly 24. Sensor 72, if present, also captures a corresponding image of the scene. Processor 26 analyzes the images to identify marker elements 36, and from the identified elements determines the orientation of ROI 34 with respect to assembly 24, and also the distance of the ROI from the assembly. Even if sensor 72 is not present, it will be understood that having two devices 68 acquiring respective images of the scene simplifies the analysis needed to be performed by the processor to identify elements 36. In addition, having two capturing devices 68 reduces the number of elements 36 required to accurately determine the orientation and distance of the ROI with respect to assembly 24, compared to the number required if only one capturing device 68 is used. With two capturing devices 68 the inventors have found it is sufficient to have one marker with three marker elements to accurately locate the ROI with respect to assembly 24. If sensor 72 is present, its image alone may be sufficient to identify elements 36, although typically processor 26 uses the images from devices 68 to improve the accuracy of the orientation and distance measures of the ROI determined by the sensor.

Processor 26 also analyzes the images acquired by devices 68 in order to determine a measure of the brightness of the scene in front of assembly 24.

In a frame orientation step 305, the processor rotates combiners 52A and 52B with respect to their respective frames so that the combiners are orthogonal to the gaze directions of the professional towards the ROI. The processor uses equations (A), (B) and/or (C) to determine the angles of rotation of the combiners.

In a masking step 306, the processor generates circular occlusion masks 80 in screens 60. The processor, using the orientation of the ROI measured in step 304 and the central adjustment of combiners 52 in step 300, determines positions for the masks that will occlude ROI 34. From the brightness measured in step 304, and from the correspondence between pupil size and brightness stored in initial step 300, the processor estimates a value of the pupil diameter of the professional.

In one embodiment the processor sets the diameter of masks 80 according to equation (7), i.e., inter alia, according to the professional's pupil size, so that the masks fully occlude ROI 34. In this case partially occluded ring 130 surrounds ROI 34, the fraction of partial occlusion within the ring being given by equations (12) and (18).

In some embodiments the processor determines sections of the scene corresponding to partially occluded ring 130, and as acquired by devices 68. The processor then configures micro-projectors 64 to overlay video of the acquired sections onto the partially occluded ring, so as to compensate for the partial occlusion. Typically, processor configures the intensity of the projected video to be the inverse of the fraction of the occlusion.

In an alternative embodiment, rather than setting the diameter of the masks to be according to equation (7), the processor sets the diameter to be reduced from the value determined by the equation. The reduction is typically determined by professional 22. In one embodiment the diameter is set to be 90% of the value determined by equation (7).

In a further alternative embodiment, the processor, using instructions from professional 22, sets the diameter of the masks to be larger than the diameter of equation (7). In one embodiment the diameter is set to be 110% of the value determined by equation (7).

In a mask projection step 308 processor 26 uses micro-projectors 64 to project augmented video onto occlusion masks 80. In the case of the augmented video including two or more types of images being projected onto the masks, processor 26 registers the images with each other. However, the images are not necessarily registered, and are typically misaligned, with the scene surrounding and outside the masks. Thus, as exemplified by FIG. 2E and the description of the figure, a video image 114 of the upper portion of the distal end of device 38, together with a stored image 112 corresponding to the lower portion of the distal end, are registered together and are projected onto masks 80. As is also illustrated in FIG. 2E, the images on masks 80 are typically misaligned with the visible scene outside the masks.

In a further projection step 310, processor 26 uses micro-projectors 64 to project augmented video onto the partially occluded ring surrounding the masks, and/or the non-occluded section of combiners 52. As in step 308, multiple image types are registered together, but are typically misaligned with the visible scene of the non-occluded section.

Typical images that are projected in steps 308 and 310 include, but are not limited to, those described above with respect to FIGS. 2C, 2D, and 2E, and the choice and positioning of the images is typically under the overall control of professional 22. In a mentoring situation, at least some of the images are typically under control of a mentor of professional 22.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A system for facilitating an augmented reality assisted medical procedure on a patient, the system comprising:
    a region of interest marker comprising marker elements configured as retro-reflectors that selectively reflect infra-red radiation, the region of interest marker configured to be positioned at a region of interest of the patient associated with the medical procedure;
    one or more device identifying elements configured to be attached to a surgical device; and
    an augmented reality assembly comprising a retaining structure configured to be mounted on a head of a medical professional, wherein the retaining structure comprises:
        one or more processors configured to access a database having one or more stored images;
        a camera configured to operate in an infra-red spectrum and to capture images of the one or more device identifying elements and the marker elements of the region of interest marker;
        two optical combiners mounted on the retaining structure, each one of the two optical combiners and positioned so as to be in front of a respective one of the eyes of the medical professional,
        wherein the two optical combiners are configured to be rotated about a horizontal axis such that they can tilt downwards at an angle of up to 40 degrees from horizontal,
        wherein each optical combiner comprises a pixelated variable transparency screen that is configured to at least partially transmit elements of a scene through the optical combiner so that a portion of the region of interest is directly visible through the optical combiner; and two micro-projectors mounted on the retaining structure, each micro-projector located and oriented so as to be able to project selected images from the database onto a respective optical combiner, wherein the one or more processors are configured to control opacity of each of the pixels of the pixelated variable transparency screen, and wherein the one or more processors are further configured to align the projection of the selected images with the region of interest based on the captured images of the one or more device identifying elements and the marker elements of the region of interest marker.

2. The system of claim 1, wherein the retaining structure comprises a spectacle frame.

3. The system of claim 1, wherein the retaining structure comprises a helmet.

4. The system of claim 1, further comprising two lenses, each of the two lenses being positioned between a respective one of the two optical combiners and a respective one of the eyes of the medical professional, wherein each of the two lenses redirects light from a respective optical combiner so that the projection of the selected images appears to be closer than infinity to the eyes of the medical professional.

5. The system of claim 4, wherein the selected images are adapted to be in focus at approximately 50 cm.

6. The system of claim 1, wherein the screen is formed of an array of liquid crystal pixels.

7. The system of claim 6, wherein the array is a rectangular array.

8. The system of claim 1, wherein the one or more processors are configured to render at least a section of the screen at least partially opaque.

9. The system of claim 8, wherein the section is a circular section.

10. The system of claim 1, wherein any misalignment between the projection of the selected images and the region of interest is less than 2 cm.

11. The system of claim 1, wherein the optical combiners are of a waveguide type.

12. A system for facilitating an augmented reality assisted medical procedure on a patient, the system comprising:

a region of interest marker comprising marker elements configured as retro-reflectors that selectively reflect infra-red radiation, the region of interest marker configured to be positioned at a region of interest of the patient associated with the medical procedure;

one or more device identifying elements configured to be attached to a medical device; and an augmented reality assembly comprising a retaining structure configured to be mounted on a head of a medical professional, wherein the retaining structure comprises:

one or more processors configured to access a database having one or more stored images;

a camera configured to operate in an infra-red spectrum and to capture images of the one or more device identifying elements and the marker elements of the region of interest marker;

two optical combiners mounted on the retaining structure, each one of the two optical combiners and positioned so as to be in front of a respective one of the eyes of the medical professional, wherein the two optical combiners are configured to be rotated about a horizontal axis such that they can tilt downwards at an angle of up to 40 degrees from horizontal, wherein each optical combiner comprises a variable transparency screen that is configured to at least partially transmit elements of a scene through the optical combiner so that a portion of the region of interest is directly visible through the optical combiner; and two micro-projectors mounted on the retaining structure, each micro-projector located and oriented so as to be able to project selected images from the database onto a respective optical combiner, wherein the one or more processors are configured to control opacity of the variable transparency screen, and wherein the one or more processors are further configured to align the projection of the selected images with the region of interest based on the captured images of the one or more device identifying elements and the marker elements of the region of interest marker.

13. The system of claim 12, wherein the retaining structure comprises a spectacle frame.

14. The system of claim 12, wherein the retaining structure comprises a helmet.

15. The system of claim 12, further comprising two lenses, each of the two lenses being positioned between a respective one of the two optical combiners and a respective one of the eyes of the medical professional, wherein each of the two lenses redirects light from a respective optical combiner so that the projection of the selected images appears to be closer than infinity to the eyes of the medical professional.

16. The system of claim 15, wherein the selected images are adapted to be in focus at approximately 50 cm.

17. The system of claim 12, wherein the screen is pixelated.

18. The system of claim 17, wherein the screen is formed of an array of liquid crystal pixels.

19. The system of claim 12, wherein each optical combiner comprises a waveguide configured to transmit light coming from a respective one of the two micro-projectors into the eyes of the medical professional so as to display the selected images from the database as an augmented reality display.

* * * * *

UNITED STATES PATENT AND TRADEMARK OFFICE
CERTIFICATE OF CORRECTION

PATENT NO. : 12,063,345 B2
APPLICATION NO. : 18/365650
DATED : August 13, 2024
INVENTOR(S) : Nessi Benishti et al.

Page 1 of 1

It is certified that error appears in the above-identified patent and that said Letters Patent is hereby corrected as shown below:

On the Title Page

Page 3, Column 1 (U.S. Patent Documents), Line 5, delete "Mswanathan" and insert -- Viswanathan --.

Page 9, Column 2 (U.S. Patent Documents), Line 39, delete "Mlsmeier" and insert -- Vilsmeier --.

Page 11, Column 1 (Other Publications), Line 1, delete "Comibining" and insert -- Combining --.

In the Specification

Column 7, Line 40, after "marker" insert -- 35 --.

Column 13, Line 24, delete "mm" and insert -- mm. --.

Column 14, Line 59, delete "1" and insert -- l --.

Column 16, Line 8, delete "f1(1)-f2(1)," and insert -- f1(l)-f2(l), --.

Column 16, Line 36 (approx.), delete "VW," and insert -- V'W', --.

Signed and Sealed this
Thirty-first Day of December, 2024

Derrick Brent
*Acting Director of the United States Patent and Trademark Office*